United States Patent [19]
Komiya et al.

[11] Patent Number: 5,995,246
[45] Date of Patent: Nov. 30, 1999

[54] LIGHT BEAM SCANNING APPARATUS FOR USE WITH IMAGE FORMING APPARATUS

[75] Inventors: Kenichi Komiya; Koji Tanimoto, both of Kawasaki; Naoaki Ide, Shizuoka; Jun Sakakibara, Tokyo, all of Japan

[73] Assignee: Kabushiki Kaisha Toshiba, Kawasaki, Japan

[21] Appl. No.: 08/867,655

[22] Filed: Jun. 2, 1997

[30] Foreign Application Priority Data

Jun. 3, 1996 [JP] Japan .................................. 8-140330

[51] Int. Cl.$^6$ ................................. H04N 1/04; H01J 3/14
[52] U.S. Cl. ........................ 358/481; 358/475; 250/235
[58] Field of Search ................................... 358/481, 475, 358/482, 483, 494; 250/235

[56] References Cited

U.S. PATENT DOCUMENTS

| | | | |
|---|---|---|---|
| 4,135,212 | 1/1979 | Pugsley et al. | 358/296 |
| 4,445,126 | 4/1984 | Tsukada | 346/108 |
| 4,720,632 | 1/1988 | Kaneko | 250/235 |
| 4,933,549 | 6/1990 | Fujioka et al. | 358/481 |
| 5,140,427 | 8/1992 | Nakane et al. | 358/231 |
| 5,151,586 | 9/1992 | Sato et al. | 358/481 |
| 5,576,852 | 11/1996 | Sawada et al. | 358/481 |
| 5,777,737 | 7/1998 | Priest | 356/350 |

*Primary Examiner*—Joseph Mancuso
*Assistant Examiner*—Hien Truong
*Attorney, Agent, or Firm*—Foley & Lardner

[57] ABSTRACT

In a digital copying mechine using a multi-beam optical system, first light receiving elements of a light beam detector placed on the extension of the surface of a photosensitive drum detects the positions of paths of scanning light beams in the sub-scanning direction. On the basis of the results of this detection, the amount of control for the position of the path of each light beam is calculated. Galvano mirrors, adapted to reflect the light beams onto the surface of the photosensitive drum, are driven accordingly, so that the paths of the light beams are properly positioned in the sub-scanning direction. Second light receiving elements of the light beam detector detect times at which the light beams move across the light beam detector. A sync clock is produced after a delay from when each light beam moves across the light beam detector. The spacing between each second light receiving element is set to an integral multiple of the length of one dot formed by a light beam on the photosensitive drum in the main scanning direction. In synchronism with the sync clocks, pixel clocks and image data are applied to laser oscillators to form an image on the surface of the photosensitive drum. A light beam scanning apparatus is provided which can properly control the positions of lines scanned by the light beams on the photosensitive drum surface and hence can maintain high image quality at all times.

15 Claims, 44 Drawing Sheets

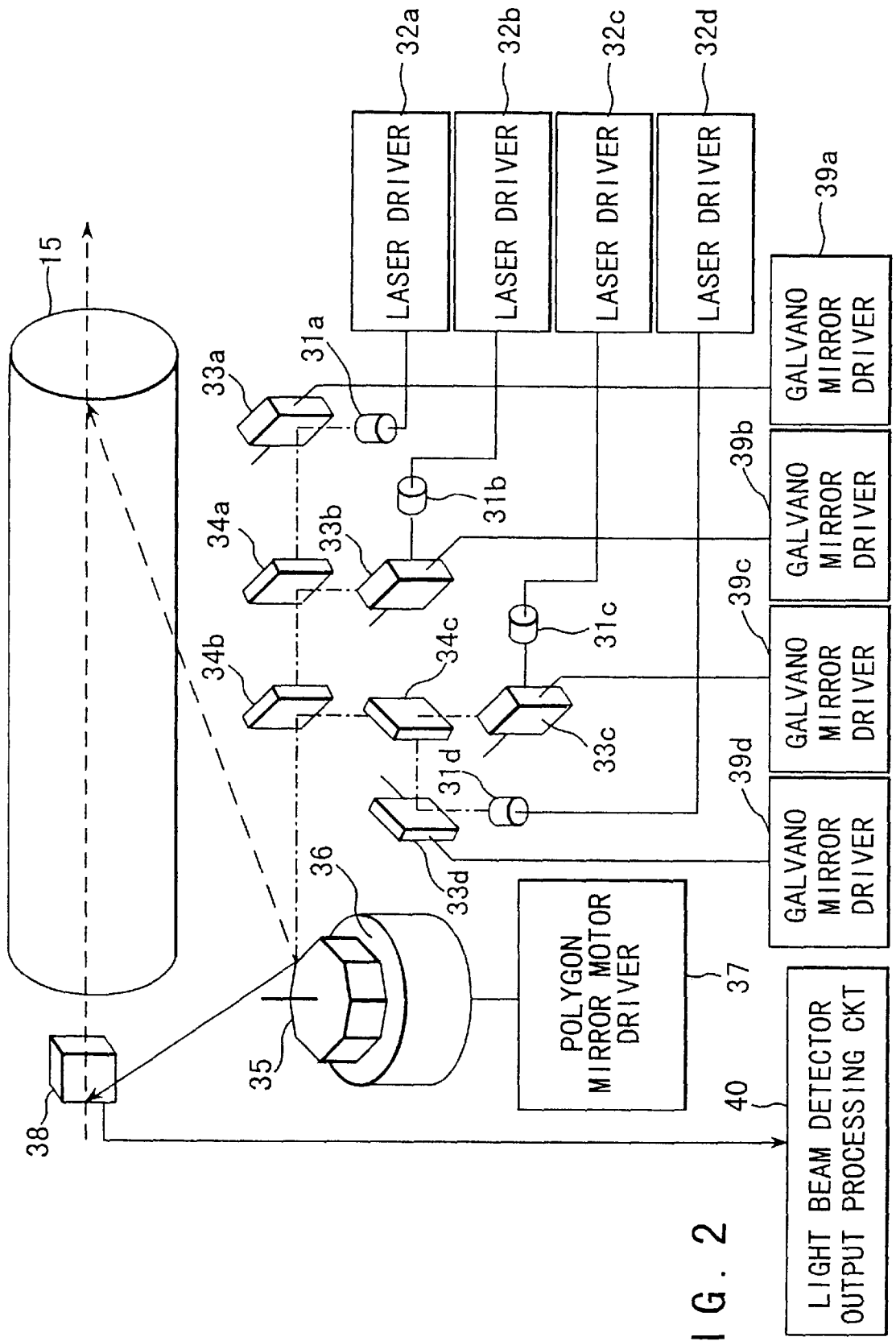
F I G. 2

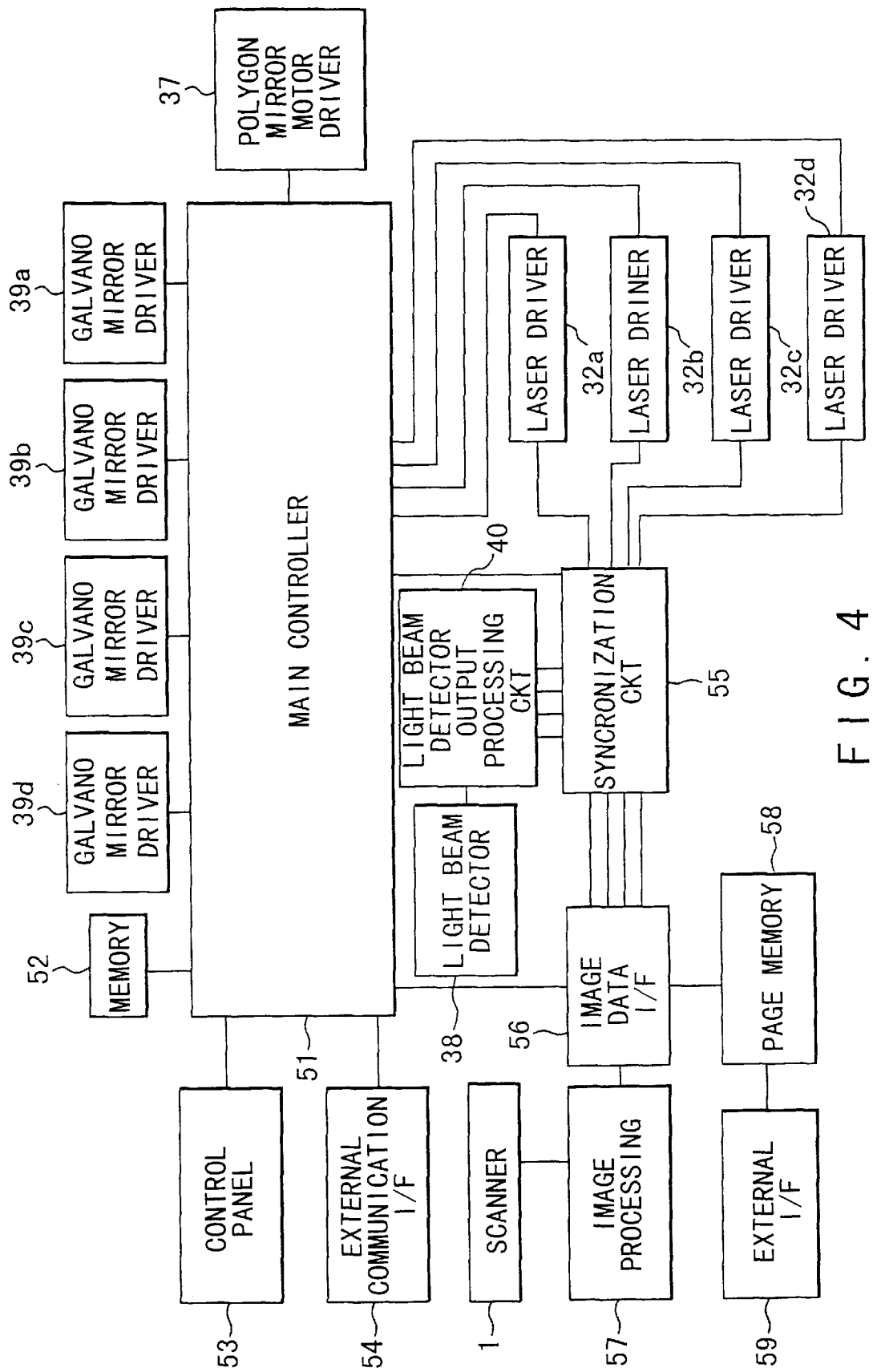
F I G. 4

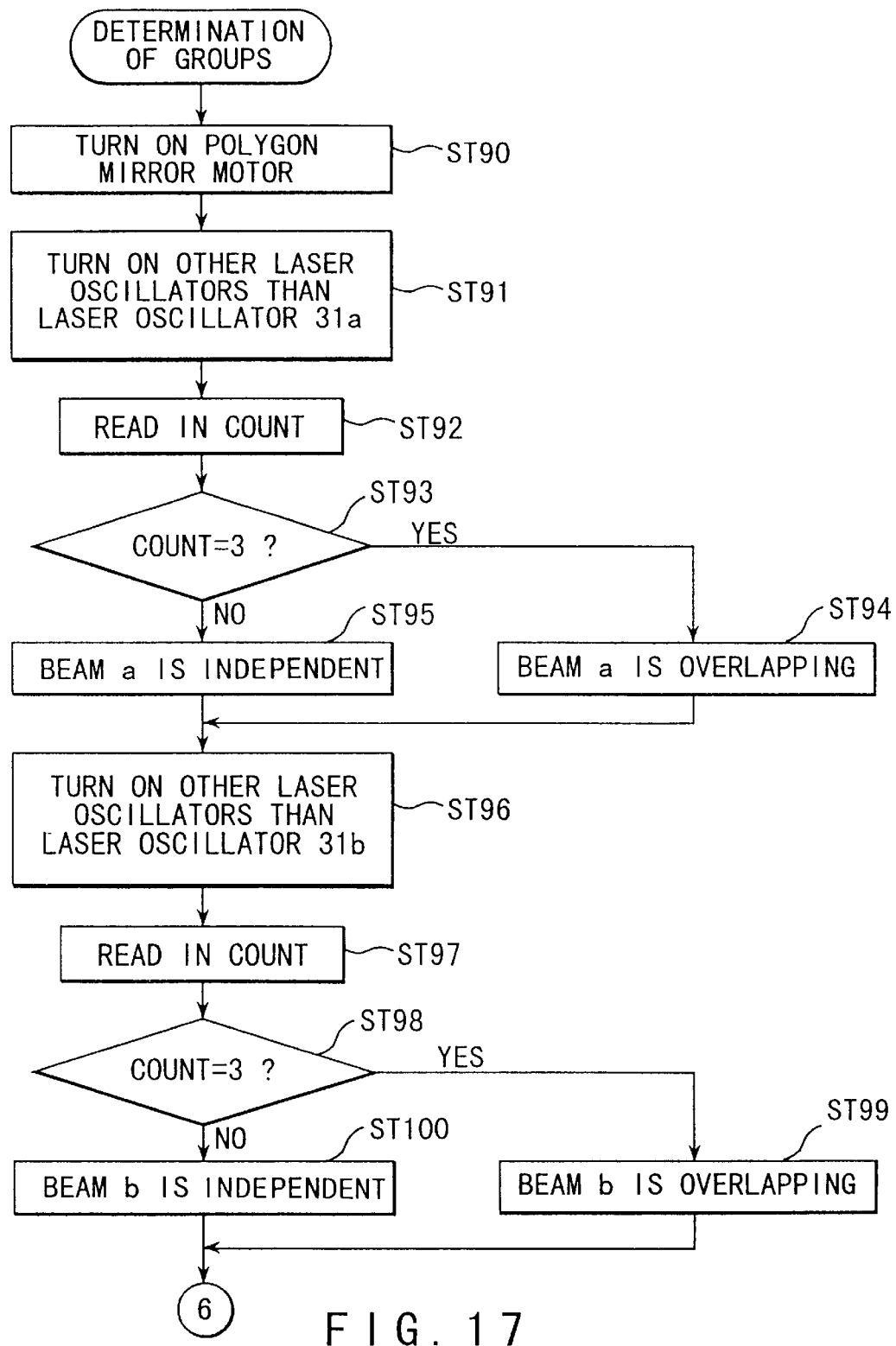
F I G. 17

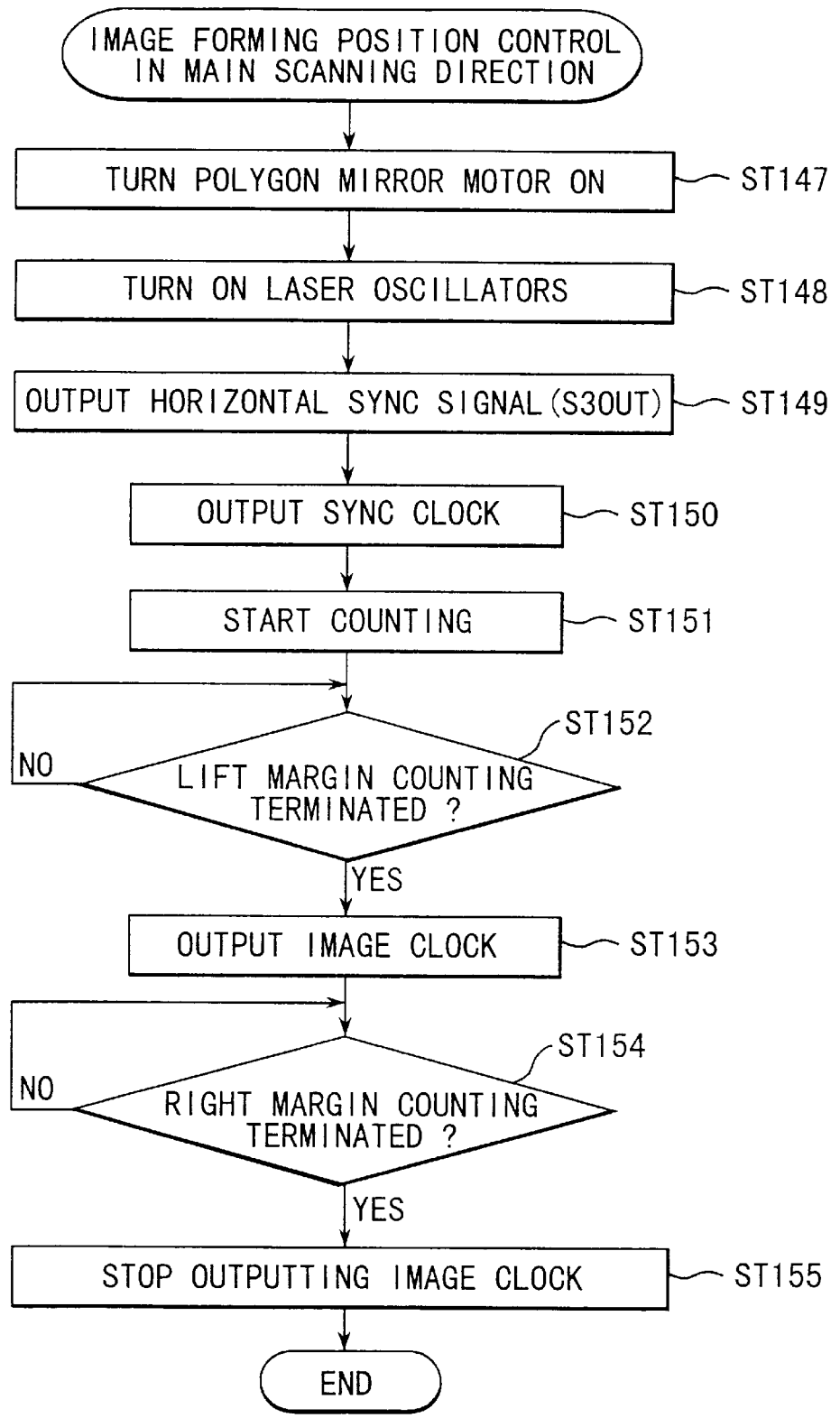
F I G. 22

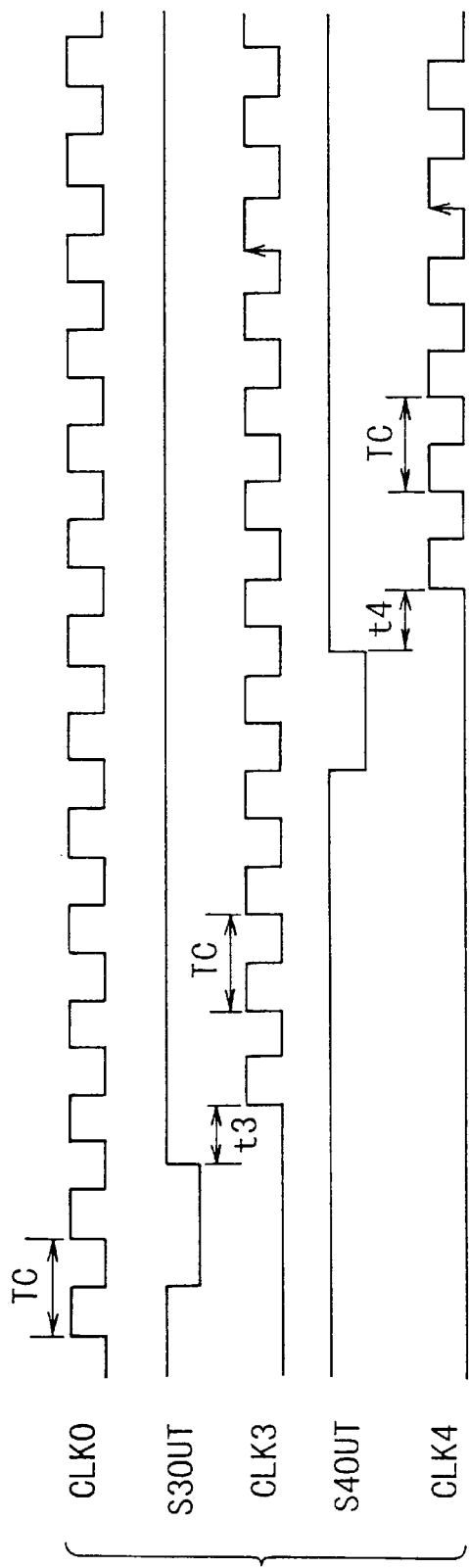
F I G. 24A
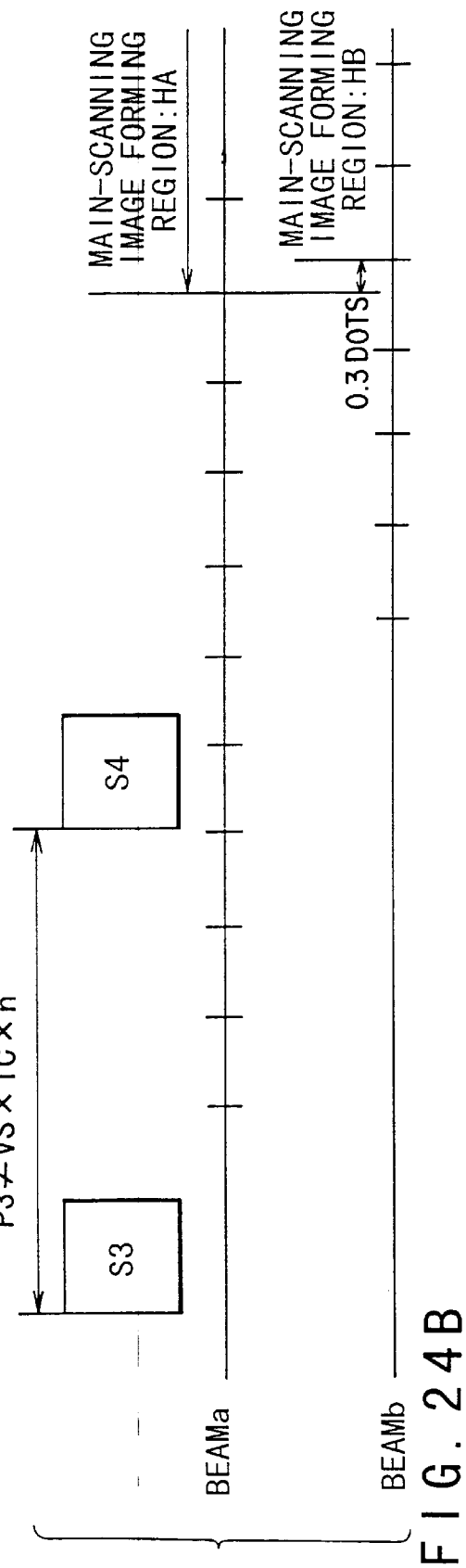
F I G. 24B

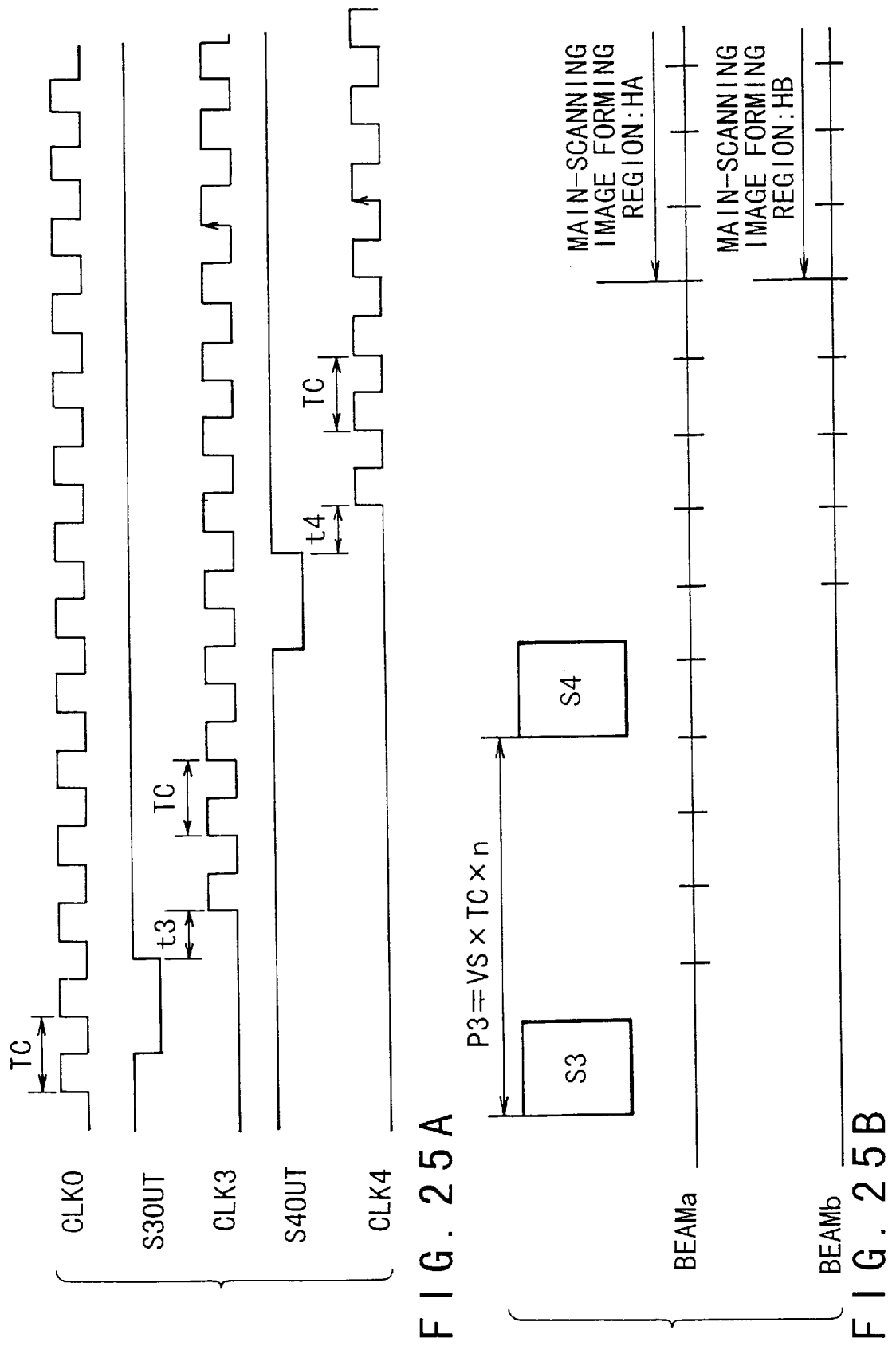

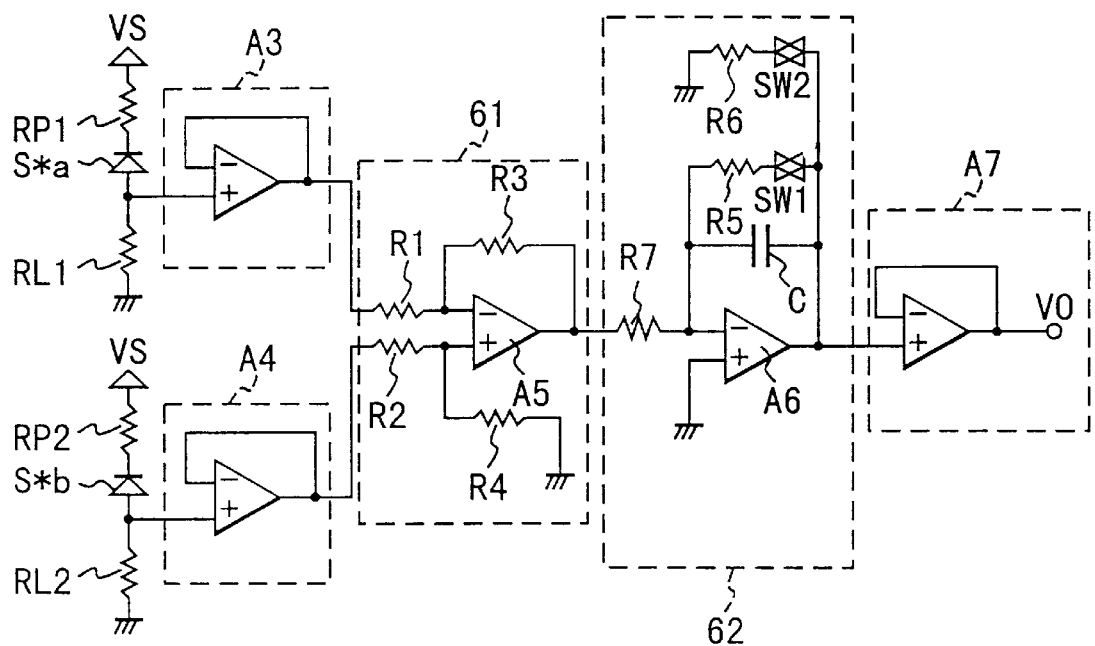
F I G. 31
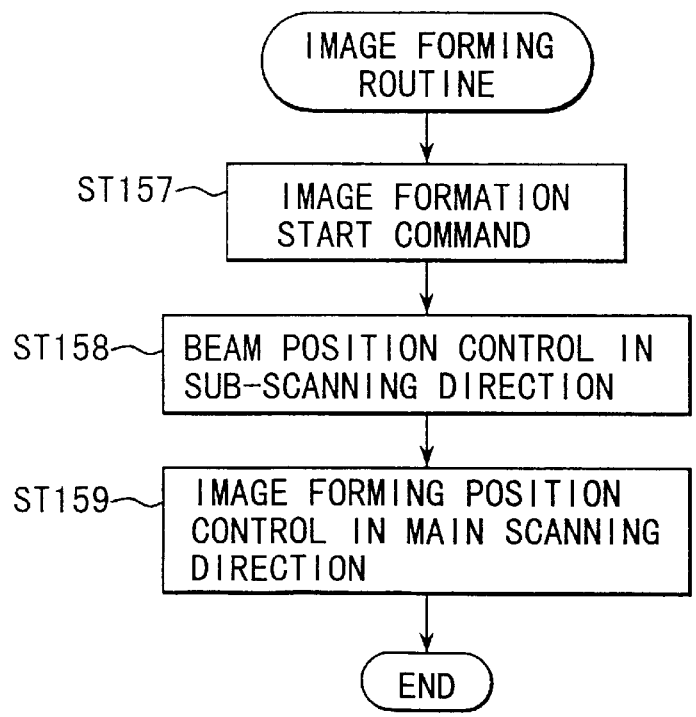
F I G. 32

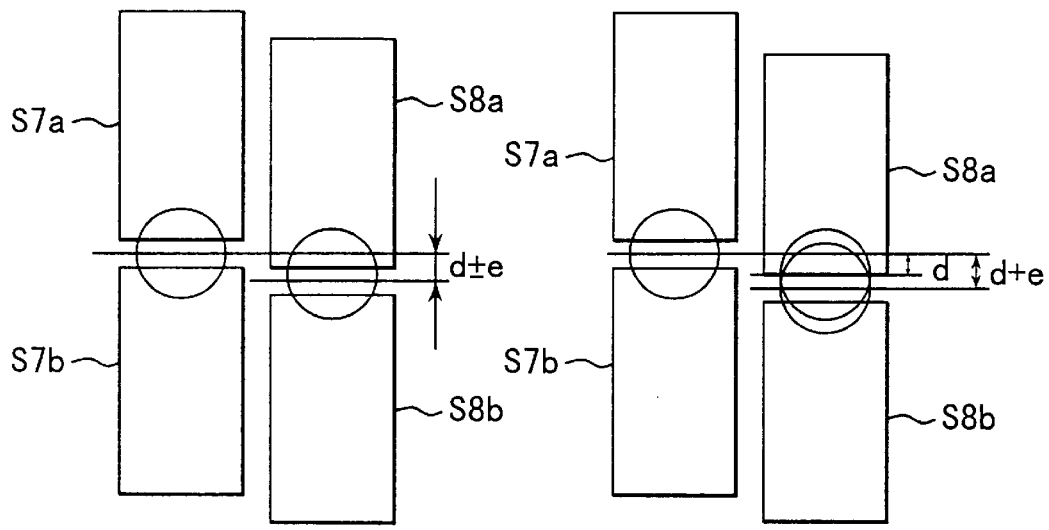
FIG. 37
FIG. 38A
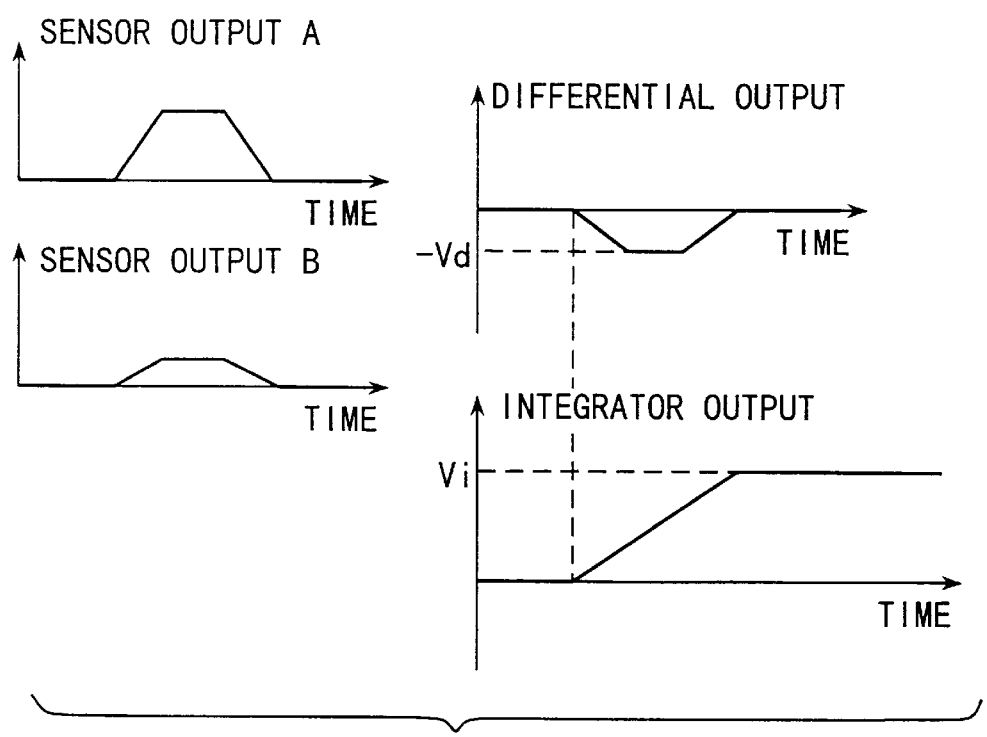
FIG. 38B

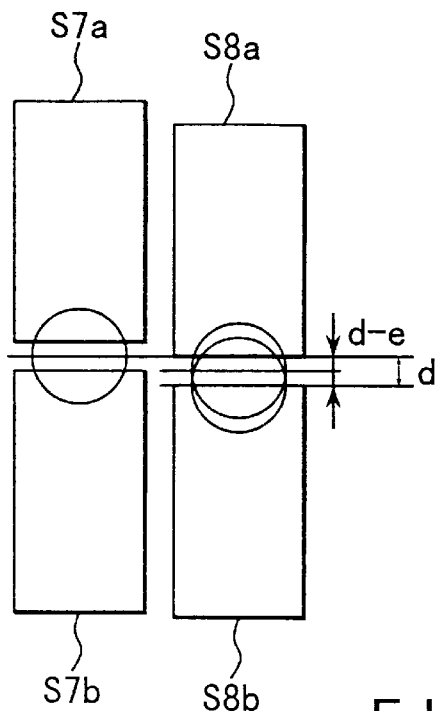
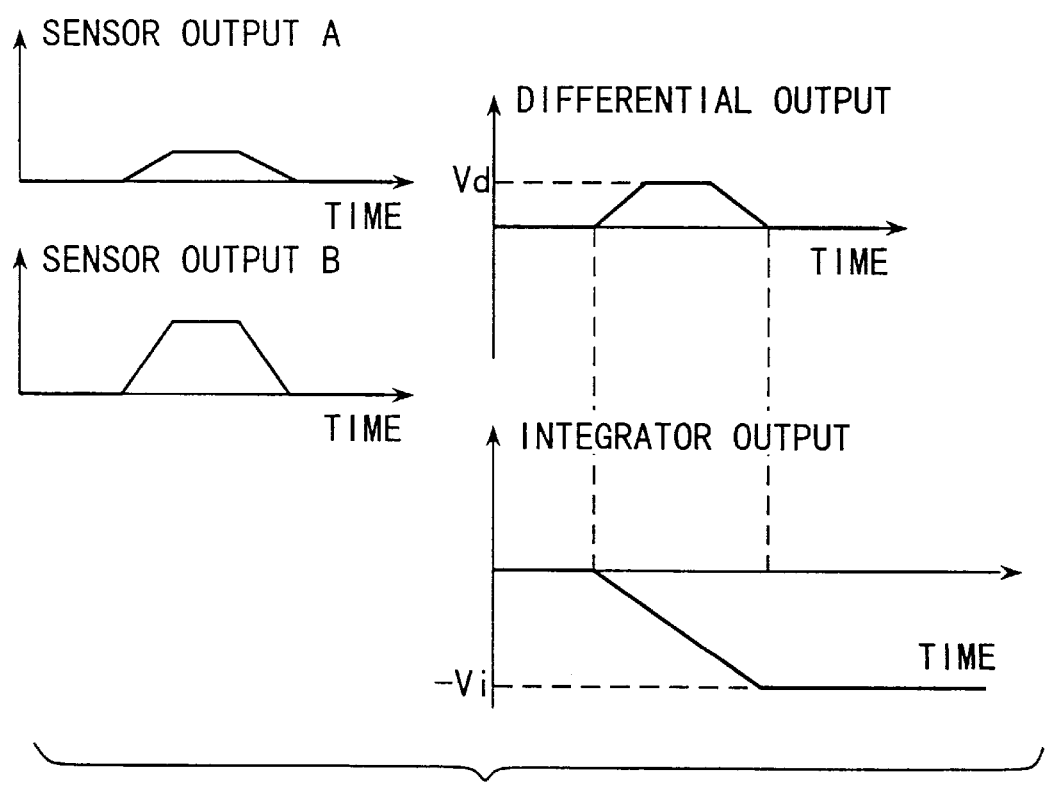
FIG. 39A
FIG. 39B

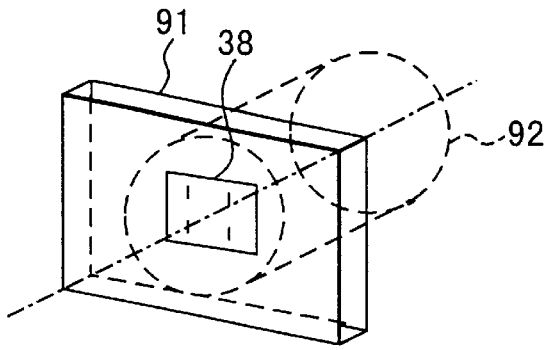
F I G. 4 8
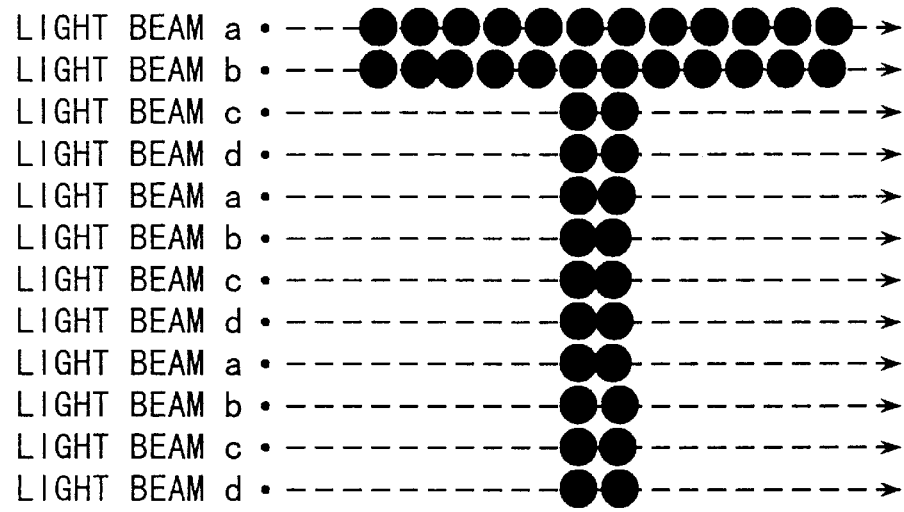
F I G. 4 9 A
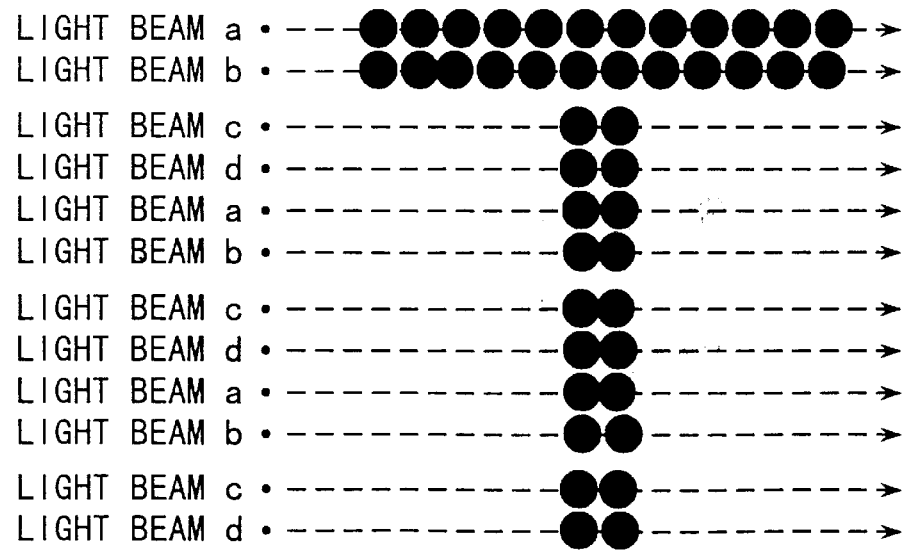
F I G. 4 9 B

LIGHT BEAM SCANNING APPARATUS FOR USE WITH IMAGE FORMING APPARATUS

BACKGROUND OF THE INVENTION

The present invention relates to a light beam scanning device for simultaneously scanning and exposing a single photosensitive drum with a plurality of laser beams, to form a single electrostatic latent image on the photosensitive drum, and an image forming apparatus such as a digital copying machine or a laser printer using the light beam scanning device.

In recent years, various digital copying machines have been developed in which image formation is performed by scanning and exposing with a laser beam and electronic photographing processing.

More recently, in order to obtain a higher image forming speed, developments have been made to a digital copying machine adopting a multi-beam method in which a plurality of laser beams are generated and scanning is simultaneously carried out for a plurality of scanning lines with use of a plurality of beams, in order to improve the image formation speed.

This kind of digital copying machine which adopts such a multi-beam method comprises a plurality of laser oscillators for generating laser beams, a polygon rotation mirror for reflecting the laser beams generated by the plurality of laser oscillators toward a photosensitive drum to scan the photosensitive drum with the laser beams, and an optical unit as a light beam scanning device mainly consisting of a collimator lens and an f-θ lens.

However, in the structure of a conventional optical unit, it is very difficult to obtain an ideal positional relationship between a plurality of light beams on a photosensitive drum (or a surface to be scanned). In order to obtain an ideal positional relationship, respective components as well as assembling thereof require high accuracy, and hence, the cost of the device is increased.

Even if an ideal positional relationship is obtained, the shape of a lens may be changed slightly or the positional relationship between respective components may be changed slightly due to circumferential changes, such as changes in temperature and humidity or time-based changes. Consequently, the positional relationship between light beams changes, and as a result, a high quality image cannot be formed. Therefore, to construct this kind of optical system, it is necessary to adopt a structure and components which are strong against changes as described above. Especially, as for lenses, a glass lens which is strong against circumferential changes and time-based changes is expensive so that the cost of the device is increased.

In the following, defects in an image which are caused when an image is formed with a multi-beam method whose passing positions are erroneously dislocated will be explained with reference to FIGS. 49A and 49B and FIGS. 50A and 50B.

For example, in case where a character of "T" shown in FIG. 49A is formed, an image as shown in FIG. 49B is formed when a passing position of a light beam is erroneously dislocated from a predetermined position. In the example of this figure, the passing position of a light beam b is shifted from its predetermined position so that the distance between light beams a and b is reduced while the distance between light beams b and c is increased, among four light beams a to d used. In other words, the dot interval changes in the sub-scanning direction.

FIG. 50A shows an example of an image in which emission timings of respective light beams are not controlled correctly. As is apparent from this figure, the image forming position in the main scanning direction is dislocated so that a longitudinal line cannot be formed straight. That is the dots shift each other in the main scanning direction.

FIG. 50B shows an image in which neither the passing positions of light beams nor the emission timings are controlled correctly, defects in an image appear both in the sub-scanning direction and in the main scanning direction.

Thus, when an image is formed in a multi-beam method, light beam passing positions in the subscanning direction must be controlled to be arranged at predetermined intervals, and the emission timings of respective light beams must be controlled so as to align the image forming position in the main scanning direction.

BRIEF SUMMARY OF THE INVENTION

The present invention has an object of providing a light beam scanning device and an image forming apparatus which are capable of controlling positions of light beams to predetermined positions on a scanning surface to be scanned and which are therefore capable of continuously maintaining high image quality, even if circumferential changes and time-based changes occur in their optical systems.

It is another object of the present invention to provide a light beam scanner and an image forming apparatus which permit each light beam to be positioned properly on the scanned surface, thereby maintaining high image quality at all times.

In order to achieve the object, according to one aspect of the present invention there is provided a light beam scanning apparatus comprising: a plurality of light beam generating means for generating light beams; scanning means for reflecting the light beams emitted by the light beam generating means onto a surface to be scanned to scan the scanned surface with the light beams; a plurality of light beam detecting means placed on the extension of the scanned surface for detecting times at which the light beams are moved across the light beam detecting means by the scanning means to produce timing signals; allocation means responsive to the timing signals produced by the light beam detecting means for determining the order in which the light beams move across the light beam detecting means and allocating each of the plurality of light beam generating means to a corresponding respective one of the plurality of light beam detecting means on the basis of the result of that determination; synchronization means responsive to the timing signals produced by the light beam detecting means for generating sync clocks each of which corresponds to a respective one of the light beam generating means allocated to the light beam detecting means; and image data supply means for supplying image data to each of the beam generating means in response to a corresponding one of the sync clocks generated by the synchronization means.

The plurality of light beam detecting means are spaced at intervals of a distance that is an integral multiple of the size of one pixel formed by each light beam on the scanned surface. The beam detecting means may comprise a photodiode.

The allocation means allocates each of the light beam generating means to a respective one of the light beam detecting means in the order in which the light beams move across one of the light beam detecting means. The beam generating means are equal in number to the light beam detecting means. The beam generating means may comprise a laser oscillator.

The allocation means determines the order in which the light beams move across the light beam detecting means by turning off at least one of the beam generating means.

The image data supply means is responsive to each of the timing signals to interrupt the beam generation by a corresponding respective one of the light beam generating means. Thus, each light beam detecting means produces a timing signal only when the light beam from the corresponding beam generating means traverses it.

The image data supply means supplies image data to each of the beam generating means after a corresponding one of the sync clocks is counted by a number set for that light beam generating means.

According to another embodiment of the present invention, the apparatus according to claim 1, the apparatus has multiple resolutions, and the plurality of the light beam detecting means are spaced at intervals of a distance that is an integral multiple of the least common multiple of the sizes of pixels formed by a light beam on the scanned surface that correspond to the resolutions.

Thus, the starting points of images formed by the light beam generating means on the scanned surface are aligned in the sub-scanning direction.

According to the present invention, when the light beam scanning apparatus uses multiple light beams, there is no need for special precision and adjustment in setting up the optical system. And moreover, even if changes in the optical system occur due to environmental changes and secular changes, the ideal positional relationship among light beams on the scanned surface can be maintained at all times. Therefore, high-quality images with no dot displacement in the main scanning direction can be obtained at all times.

Moreover, according to the present invention, the positions in the sub-scanning direction where light beams emitted by the plurality of light beam generating means traverse are detected. On the basis of the results of this detection, the path control amounts are calculated and the path positions of the light beams in the sub-scanning direction are adjusted accordingly.

Thereby, the positional relationship among the light beams on the scanned surface can be controlled ideally at all times in both the main scanning direction and the sub-scanning direction. In addition, high-quality images with no dot displacement in the main scanning direction and no pitch displacement in the sub-scanning direction can be obtained at all times.

Furthermore, according to the present invention, the angle of the galvano mirror is corrected so that the error between the path position of each light beam detected by the light beam detector and its ideal path position becomes minimized. This permits the light beam path position detection to be made with high precision.

In addition, according to the present invention, the slant of the light beam main scanning direction relative to the light beam path position detecting means is detected. The slant can be adjusted easily.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 illustrates the arrangement of the optical system and its positional relationship with respect to the photosensitive drum;

FIG. 4 is a block diagram of a control system mainly adapted to control the optical system;

FIGS. 17 and 18 form a flowchart for the overlapping light beam determination and grouping procedure;

FIG. 22 is a flowchart for the image forming position control in the main scanning direction when a single beam of light is used;

FIGS. 24A and 24B are timing charts for use in explanation of the image forming position control in the main scanning direction when the spacing between light receiving patterns for detecting times that light beams traverse them is not an integral multiple of the distance over which the light beam travels in the scanning direction during one cycle period of a sync clock pulse output from a synchronization circuit;

FIGS. 25A and 25B are timing charts for use in explanation of the image forming position control in the main scanning direction when the spacing between light receiving patterns for detecting times that light beams traverse is set to an integral multiple of the distance over which the light beam travels in the scanning direction during one cycle period of sync clock pulses output from the synchronization circuit;

FIG. 31 shows an arrangement of the subscanning circuit in the light beam sensor output processing circuit;

FIG. 32 is a flowchart for the image forming routine;

FIG. 37 is a diagram for use in explanation of an error between the light beam path position detect information from the light bean sensor and the ideal light beam path position;

FIGS. 38A and 38B are diagrams for use in explanation of an error between the light beam path position detect information from the light beam sensor and the ideal light beam path position;

FIGS. 39A and 39B are diagrams for use in explanation of an error between the light beam passage position detect information from the light beam sensor and the ideal light beam path position;

FIG. 48 is a perspective view of the slant adjusting device in the light beam sensor;

FIGS. 49A and 49B are diagrams for use in explanation of an image of poor quality which may be produced when beams of light displaced in position are used to form an image.

DETAILED DESCRIPTION OF THE INVENTION

In the following, an embodiment of the present invention will be explained with reference to the drawings.

Figure 1:
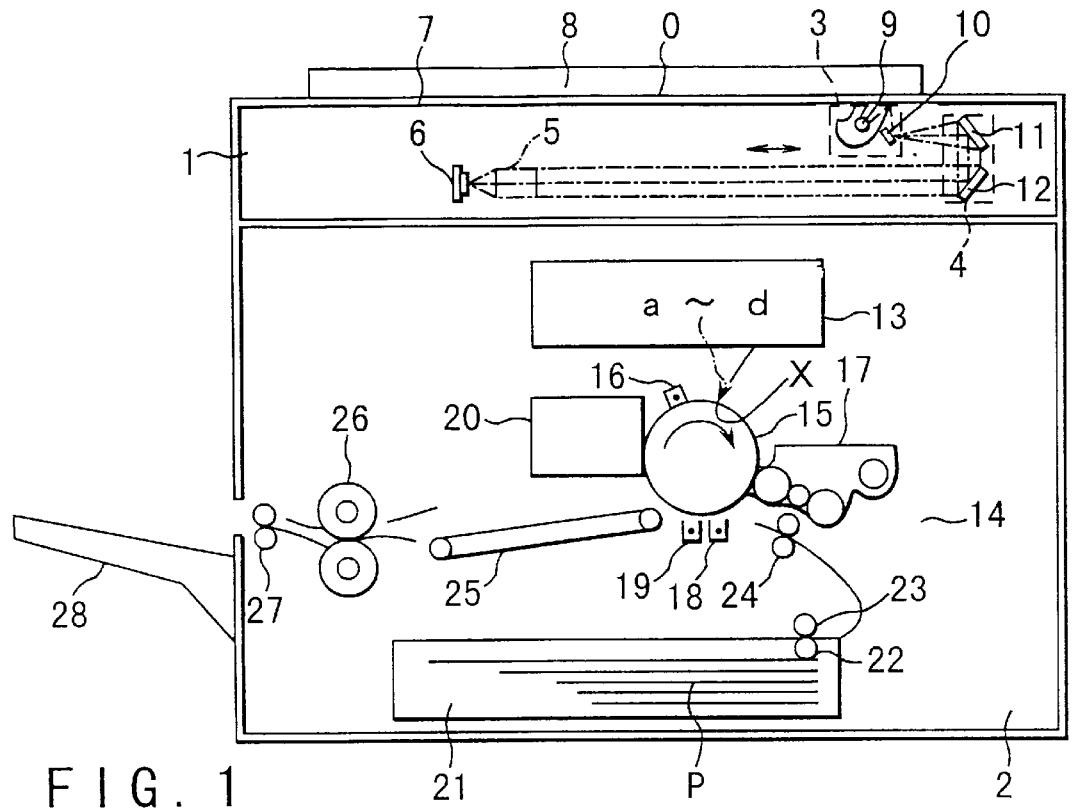
FIG. 1 is a diagrammatic representation of a digital copying machine according to an embodiment of the present invention.

FIG. 1 shows the structure of a digital copying machine as an image forming apparatus which adopts a light beam scanning device according to an embodiment of the present invention. Specifically, this digital copying machine comprises a scanner section 1 and a printer section 2. The scanner section 1 comprises a first carriage 3 and a second carriage 4 which are movable in the arrow direction in the figure, an imaging lens 5, and a photoelectric transfer element 6.

In FIG. 1, an original O is placed on an original mount 7 made of transparent glass such that the original faces downwards. The original O aligned with a mount index which is the center of the shorter edge of the original mount 7 in the right-hand side in the figure is pressed against the original mount 7 by an original fixing cover 8.

The original O is illuminated by a light source 9 and the reflection light therefrom is converged onto a light receiving surface of the photoelectric conversion element 6, by mirrors 10, 11, and 12 and an imaging lens 5. Here, the first carriage 3 equipped with the light source 9 and the mirror 10 and the second carriage 4 mounting the mirrors 11 and 12 are moved with a relative speed of 2:1 such that the length of the light path is maintained to be constant. The first and second carriages 3 and 4 are moved by a carriage drive motor (not shown) from the right-hand side to the left-hand side in synchronization with a read timing signal.

As described above, an image of the original O placed on the original mount 7 is sequentially read in units of lines by a scanner section 1. An output obtained by thus reading the image is converted into digital image signals representing gradation of the image by an image processing section not shown.

The printer section 2 comprises an optical unit 13 and an image forming section 14 adopting an electronic photographing method in which an image can be formed on a paper sheet P as a medium on which an image is formed. Specifically, image signals read out from the original O by the scanner section 1 are processed by an image processing section not shown, and thereafter, are converted into laser beams (which will be referred to as only light beams hereinafter) from semiconductor laser oscillators. The present embodiment adopts a multi-beam optical system using a plurality of (two or more) semiconductor laser oscillators.

Although the structure of the optical unit 13 will be specifically described later, a plurality of semiconductor laser oscillators provided in the unit carry out emission operation in accordance with laser modulation signals outputted from an image processing section not shown. The light beams outputted from the oscillators are reflected by a polygon mirror to form scanning light beams which are outputted to the outside of the unit.

A plurality of light beams outputted from the optical unit 13 are imaged as spotted scanning light beams having a resolution necessary for an exposure position X on a photosensitive drum 15 as an image support member, and thus, scanning and exposing are performed. As a result of this, an electrostatic latent image is formed on the photosensitive drum 15, in accordance with image signals.

In the periphery of the photosensitive drum 15, there are provided an electric charger 16 for electrically charging the surface of the the drum, a developer device 17, a transfer charger 18, a separation charger 19, a cleaner 20, and the likes. The photosensitive drum 15 is driven to rotate at a predetermined circumferential speed by a drive motor (not shown), and is electrically charged by the electric charger 16 provided so as to face the surface of the drum. A plurality of light beams (or scanning light beams) are spotted on an exposure position X on the charged photosensitive drum 15, thereby forming an image.

An electrostatic latent image formed on the photosensitive drum 15 is developed with toner (or developer) supplied from the developer device 17. The photosensitive drum 15 on which a toner image is formed by developing is transferred at a transfer position onto a paper sheet P supplied at a certain timing from a sheet supply system, by the transfer charger 18.

The sheet supply system sequentially supplies paper sheets P in a sheet supply cassette 21 provided at a bottom portion, separated from each other by a sheet supply roller 22 and a separation roller 23. Every paper sheet P is fed to a resist roller 24, and is fed to a transfer position at a predetermined timing. In the downstream side of the transfer charger 18, there are provided a sheet conveyer mechanism 25, a fixing device 26, and delivery rollers 27. Therefore, a paper sheet P on which a toner image has been transferred is fed out onto an external sheet supply tray 28 through the delivery rollers 27, after the toner image is fixed by the fixing device 26.

A cleaner 20 removes toner remaining on the surface of the photosensitive drum 15 from which a toner image has been transferred onto a paper sheet P, and the drum thereby recovers an initial condition in a stand-by condition.

Image forming operation is continuously performed by repeating the processing operation as described above.

As has been explained above, data is read out from an original O placed on an original mount 7 by a scanner section 1, and the data thus read is subjected to a series of processing at a printer section 2. Thereafter, the data is recorded as a toner image on a paper sheet P.

The optical unit 13 will be explained below.

FIG. 2 shows the structure of the optical unit 13 and the positional relationship of the unit 13 with the photosensitive drum 15. The optical unit 13 includes, for example, four semiconductor laser oscillators 31a, 31b, 31c, and 31d, and each of these oscillators performs image formation for one scanning line at the same time, so that high speed image formation is realized without extremely increasing the rotation speed of the polygon mirror.

The laser oscillator 31a is driven by a laser driver 32a. A light beam outputted therefrom passes through a collimator lens not shown and thereafter enters into a galvano mirror 33a. The light beam reflected by the galvano mirror 33a passes through an half-mirrors 34a and 34b and enters into a polygon mirror 35 as a rotational polygonal mirror.

The polygon mirror 35 is rotated at a constant speed by a polygon motor 36 driven by a polygon motor driver 37. In this manner, the light beam reflected by the polygon mirror 35 swings such that scanning is performed in a constant direction at an angle speed depending on the rotation speed of the polygon motor 36. The scanning light beam swung by the polygon mirror 35 passes through an f-θ lens, thereby scanning the light receiving surface of a light beam detector 38 as a light beam passing position detector means and the photosensitive drum 15, owing to the f-θ characteristic of the θ.

The laser oscillator 31b is driven by a laser driver 32b. A light beam outputted therefrom passes through a collimator lens not shown and is thereafter reflected by a galvano mirror 33b and further by an half-mirror 34a. The light beam reflected by the half-mirror 34a passes through an half-mirror 34b and enters into the polygon mirror 35. The route of the light beam after the polygon mirror 35 is the same as that of laser oscillator 31a, i.e., the light beam passes through an f-θ lens not shown, thereby scanning the light receiving surface of the light beam detector 38 and the photosensitive drum 15.

The laser oscillator 31c is driven by a laser driver 32c. A light beam outputted therefrom passes through a collimator lens and is thereafter reflected by a galvano mirror 33c. The light beams further passes through an half-mirror 34c, is reflected by an half-mirror 34b, and then enters into the polygon mirror 35. The route of the light beam after the polygon mirror 35 is the same as those of the laser oscillators 31a and 31b, i.e., the light beam passes through an f-θ lens, thereby scanning the light receiving surface of the light beam detector 38 and the photosensitive drum 15.

The laser oscillator 31d is driven by a laser driver 32d. A light beam outputted therefrom passes through a collimator lens not shown and is thereafter reflected by a galvano mirror 33d. The light beam is further reflected by half-mirrors 34c and 34b, and enters into the polygon mirror 35. The route of the light beam after the polygon mirror 35 is the same as those of the laser oscillators 31a, 31b, and 31c, i.e., the light beam passes through an f-θ lens not shown, thereby scanning the light receiving surface of the light beam detector 38 and the photosensitive drum 15.

Thus, light beams outputted from individual laser oscillators 31a, 31b, 31c, and 31d are synthesized by half-mirrors 34a, 34b, and 34c so that four light beams extend in the direction toward the polygon mirror 35.

Therefore, the photosensitive drum 15 can be simultaneously scanned with four light beams, so that an image can be recorded at a four times higher speed than in a conventional single light beam on condition that the polygon mirror 35 is rotated at an equal rotation speed.

The galvano mirrors 33a, 33b, 33c, and 33d are used to adjust (or control) the positional relationship between light beams in the sub-scanning direction, and are respectively connected to galvano mirror drive circuits 39a, 39b, 39c, and 39d.

The light beam detector 38 serves to detect passing positions and passing timings of four light beams, and is provided near an end portion of the photosensitive drum 15 such that the light receiving surface of the detector 38 is situated at a level equal to the surface of the photosensitive drum 15. On the basis of a detection signal from the light beam detector 38, control of the galvano mirrors 33a, 33b, 33c, and 33d (i.e., control of image forming positions in the sub-scanning direction), control of emission power (i.e., intensity) of the laser oscillators 31a, 31b, 31c, and 31d, as well as control of emission timings (i.e., control of image forming positions in the main scanning direction) are respectively performed in correspondence with the light beams although the details of the control will be described later. The light beam detector 38 is connected to a light beam detector processing circuit 40, in order to generate signals for performing the control as described above.

The beam detector 38 will be described now.

Figure 3:
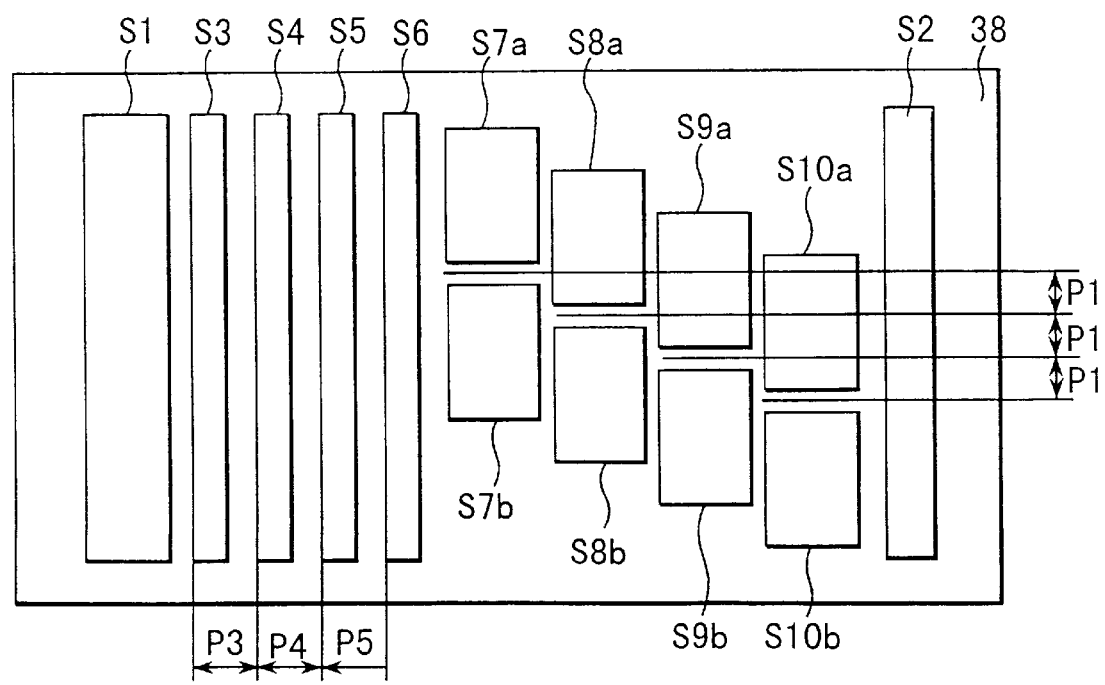
FIG. 3 is a schematic illustration of the light beam sensor.

FIG. 3 schematically illustrates an arrangement of the beam detector 38. As shown, the beam detector comprises light receiving patterns (e.g., photodiodes) S1 to S6 and S7a to S10b as sensor elements. The light receiving patterns are shaped into a rod-like form and arranged in parallel in the direction perpendicular to the main scanning direction. The patterns S3 to S6 are used for image forming position control in the main scanning direction, while the patterns S1, S2 and S7a to S10b are used for light beam path position control in the sub-scanning direction.

Specifically, the light receiving patterns S1 and S2 are ones for obtaining timing signals to time circuit operations and produce an electric signal each time a beam of light moves across them. The light receiving patterns S3 to S6 are ones for detecting times that the four beams of light move across the beam sensor and produce timing signals. The spacing (pitch) between S3 and S4, the spacing between S3 and S4 and the spacing between S5 and S6 are set to P3, P4, and P5, respectively.

The light receiving patterns S7a to S10b are ones for detecting positions of paths of the four beams of light. The two corresponding patterns arranged in the up-and-down direction (i.e., in the sub-scanning direction), i.e., S7a and S7b, S8a and S8b, S9a and S9b, and S10a and S10b, are paired, and the four pairs of patterns are arranged as shown between the patterns S6 and S2. In the sub-scanning direction each pair of patterns is offset from the adjacent one by P1 as shown.

The four pairs of light receiving patterns can be used to detect the positions the corresponding light beams traverse. Specifically, the position the light beam a from the laser oscillator 31a traverses can be detected by making a comparison between the outputs of the respective light receiving patterns S7a and S7b. Likewise, the position the light beam b from the laser oscillator 31b traverses can be detected by making a comparison between the outputs of the light receiving patterns S8a and S8b. The position the light beam c from the laser oscillator 31c traverses can be detected by making a comparison between the outputs of the light receiving patterns S9a and S9b. The position the light beam d from the laser oscillator 31d traverses can be detected by making a comparison between the outputs of the light receiving patterns S10a and S10b.

That is, when the outputs of the light receiving patterns in each pair are at balance, the corresponding light beam traverses the center line of the gap between the patterns. In such a case, it is evident that the spacing between the paths of the adjacent beams (a and b, b and c, c and d) is kept at P1.

In the next, the control system will be explained.

FIG. 4 shows a control system which mainly serves to control a multi-beam optical system. Specifically, a main control section 51 for performing total control includes, for example, a CPU. Connected to the section 51 are a memory 52, a control panel 53, an external communication interface (I/F) 54, laser drivers 32a, 32b, 32c, and 32d, a polygon mirror motor driver 37, a galvano mirror drive circuit 39a, 39b, 39c, and 39d, a light beam detector output processing circuit 40, a synchronization circuit 55, and an image data interface (I/F) 56. The circuit 55 functions also as a pulse generator.

The synchronization circuit 55 is connected with the image data I/F 56 which is connected with an image processing section 57 and a page memory 58. The image processing section 57 is connected with a scanner section 1, and the page memory 58 is connected with an external interface (I/F) 59.

Here, brief explanation will be made to the flow of image data when an image is formed.

At first, in case of copying operation, an image of an original 0 set on the original mount 7 is read out by the scanner section 1 and sent to the image processing section 57. The image processing section 57 performs conventional shading correction, various filtering processing, gradation processing, and gamma correction, on image signals from the scanner 1, and thereafter, the signals are digitized.

The image data from the image processing 57 is sent to the image data I/F 56. The image data I/F 56 serves to distribute the image data to four laser drivers 32a, 32b, 32c, and 32d. The synchronization circuit 55 generates clocks synchronized with the timings at which light beams pass through the light beam detector 38. In synchronization with these clocks, image data is sent in form of laser modulation signals, from the image data I/F 56 to the laser drivers 32a, 32b, 32c, and 32d. In this manner, image data is transmitted in synchronization with scanning by light beams, and as a result, it is possible to achieve image formation attaining synchronization (or correct positions) in the main scanning direction.

Various kinds of clocks are prepared in the synchronization circuit 55, so as to comply with the resolutions of images to be recorded. Among these kinds of clocks, one kind which has a predetermined cycle is selected in accordance with an instruction from the control panel 53 described later or an instruction inputted from outside through the external I/F 59.

The synchronization circuit 55 further includes a sample timer for forcedly making laser oscillators 31a, 31b, 31c, and 31d emit light beams in a non-image region, to control the power of respective light beams, and a logic circuit for making the laser oscillators 31a, 31b, 31c, and 31d emit light beams onto the light beam detector 38, respectively, to obtain image forming timings of the light beams in the order of the light beams.

The control panel 53 is a man-machine interface for starting copying operation or for setting a number of sheets and the likes.

The present digital copying machine does not only perform copying operation, but also forms and outputs image data inputted from outside through the external I/F 59 connected to the page memory 58. In this case, the resolution of images must be set in compliance with the external I/F 59. Then, the resolution can be instructed by the control panel 53. Note that image data inputted from the external I/F 59 is once stored into the page memory 58 and thereafter sent to the synchronization circuit 55 through the image data I/F 56.

When the present copying machine is externally controlled through a network or the like, the external communication I/F 54 operates in place of the control panel 53.

Galvano mirror drive circuits 39a, 39b, 39c, and 39d respectively serve to drive galvano mirrors 33a, 33b, 33c, and 33d, in accordance with an instruction value from the main control section 51. Therefore, the main control section is capable of freely controlling the angles of the galvano mirrors 33a, 33b, 33c, and 33d, through the galvano mirror drive circuits 39a, 39b, 39c, and 39d.

The polygon mirror motor driver 37 is a driver for driving a motor 36 which rotates the polygon mirror, to perform scanning with four light beams described before. The main control section 51 is capable of making the polygon mirror motor driver 37 start and stop rotation and switch the rotation speed. Switching of the rotation speed is carried out to reduce the rotation speed to be lower than a predetermined rotation speed when a passing position of a light beam is checked, or is carried out to switch the resolution.

Laser drivers 32a, 32b, 32c, and 32d do not only function to emit laser light beams in accordance with laser modulation signals from the synchronization circuit 55, synchronized with scanning with light beams, but also function to forcedly make the laser oscillators 31a, 31b, 31c, and 31d emit light beams regardless of image data.

The main control section 51 sets the power with which the laser oscillators 31a, 31b, 31c, and 31d emit light beams, into the laser drives 32a, 32b, 32c, and 32d. Setting of the emission power is changed in accordance with a difference in resolution between images to be recorded and with detection of passing positions of light beams.

The memory 52 serves to store information necessary for control. For example, the optical unit 13 can be rendered capable of immediately forming an image after the power source is turned on, by storing control amounts for galvano mirrors 33a, 33b, 33c, and 33d and the order of arrivals of light beams.

Next, the image forming position control in the main scanning direction (the control of times that the laser oscillators emit light beams) will be described in detail with reference to FIG. 5.

Figure 5:
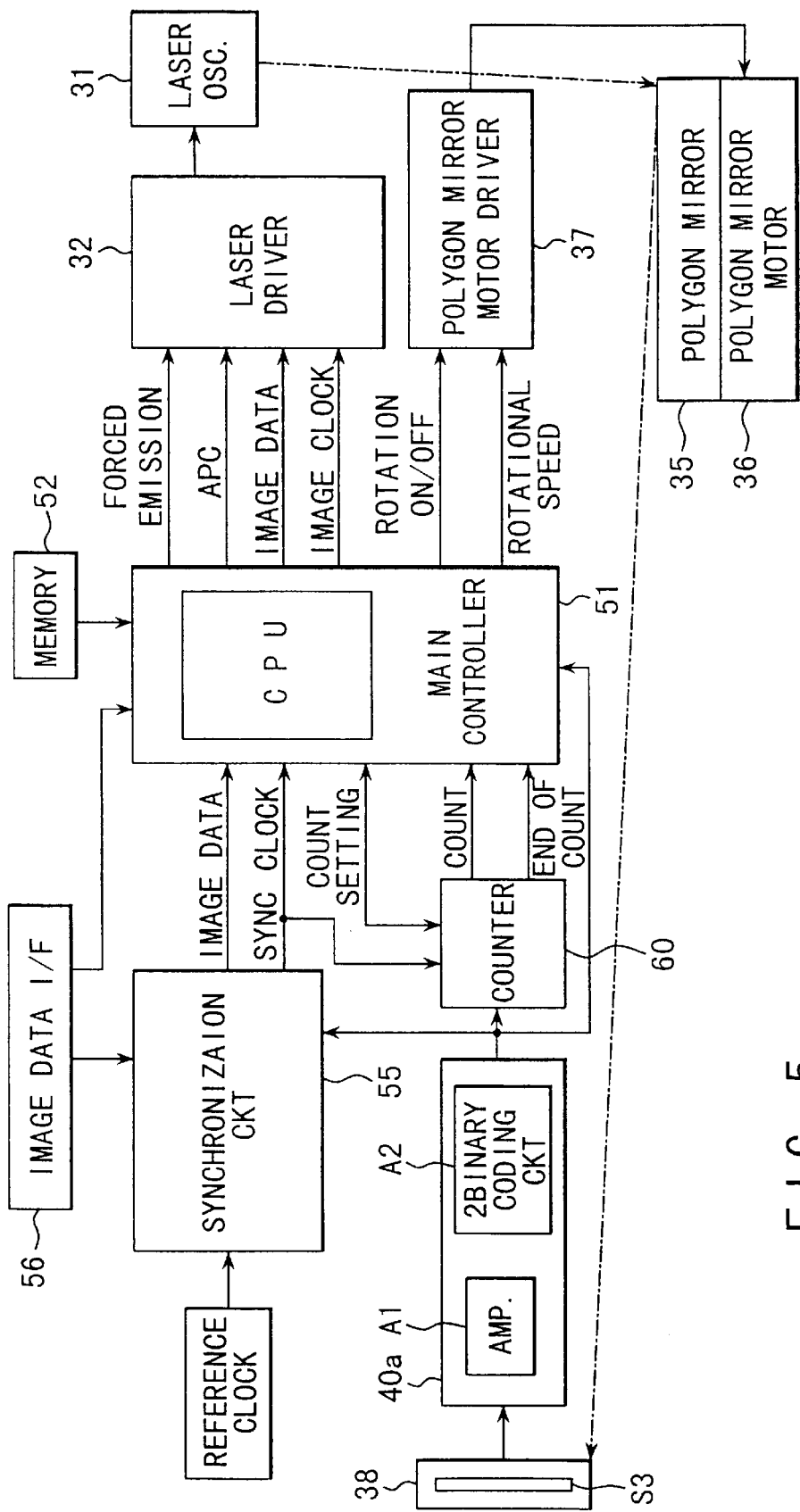
FIG. 5 is a block diagram for use in explanation of image forming position control in the main scanning direction.

FIG. 5 corresponds to a portion of FIG. 4 that is related to the image forming position control in the main scanning direction. Although, in practice, a plurality of systems each of which comprises a laser oscillator 31, a laser driver 32, and a light receiving pattern in the light beam detector 38 are provided, FIG. 5 shows only one of these systems for the purpose of simplifying illustration.

Figure 21:
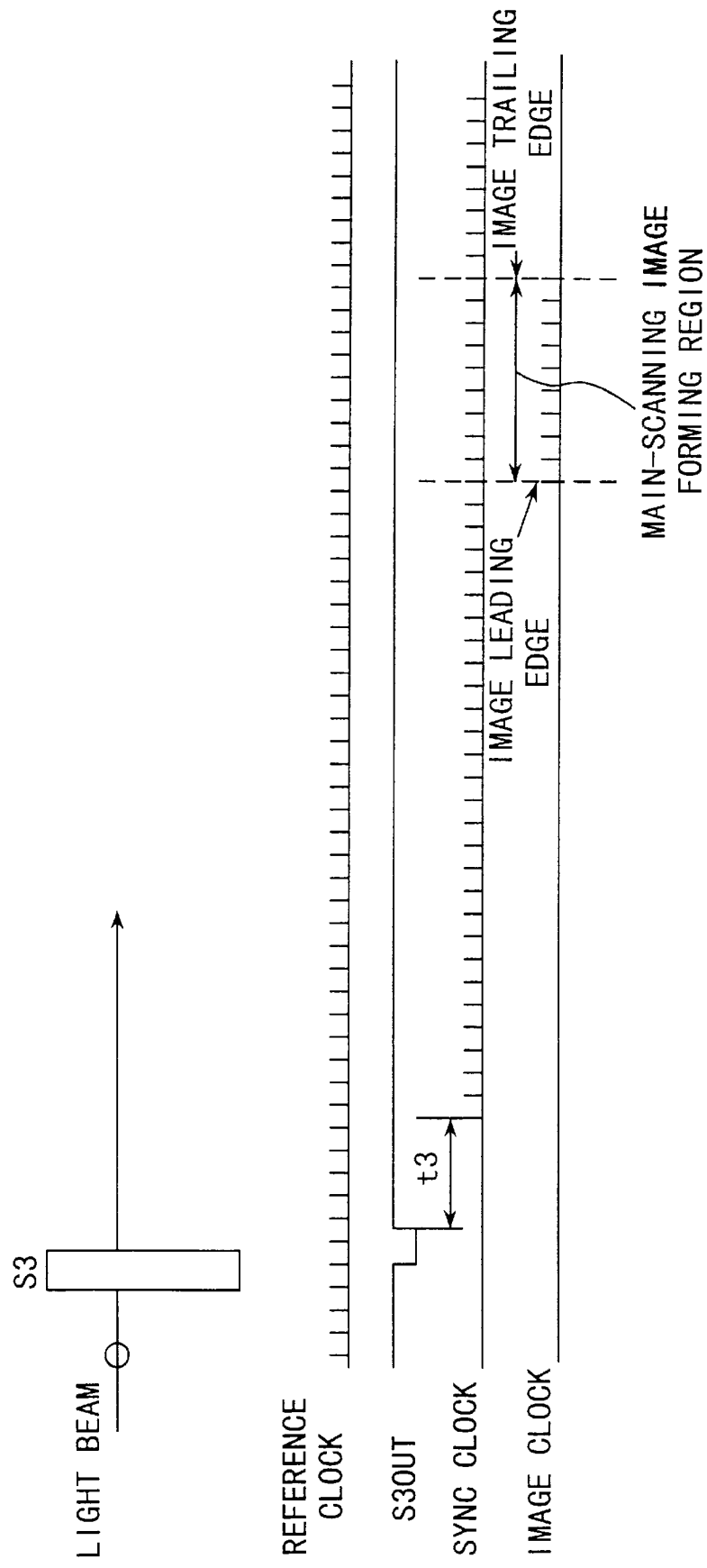
FIG. 21 is a timing diagram for use in explanation of the image forming position control in the main scanning direction when a single beam of light is used.

In the first place, reference is made to FIGS. 5, 21 and 22 to describe the control of timing of emission of a single beam (the image forming position control in the main scanning direction).

The main controller 51 specifies the rotational speed of the polygon mirror 36 and supplies a rotation-on signal to the polygon mirror driver 37. Thus, the polygon mirror 36 rotates at a predetermined rotational speed. After that, the main controller 51 supplies a forced light emission signal to the laser driver 31 to thereby force the laser oscillator 31 to emit a light beam. The resulting light beam is deflected by the polygon mirror 35 to move across the light beam detector 38, which, in turn, outputs a light passage timing detect signal at the time when the light beam traverses the detector.

The light passage timing detect signal is amplified and then subjected to binarization by the main-scanning control circuit 40a in the light beam detector output processing circuit 40 for application to the main controller 51 and the synchronization circuit 55 as a light beam detect signal. Upon receipt of the light beam detect signal, the main controller 51 stops the delivery of the forced light emission signal to the laser driver 22, thereby turning off the laser oscillator 31.

On the other hand, the synchronization circuit 55 outputs reference clock pulses in synchronism with the light beam detect signal. That is, the synchronization circuit produces sync clock pulses in synchronism with the passage of a light beam. The sync clock pulses are clock pulses to which image data makes reference and sent to a counter 60. The counter counts the clock pulses and outputs an end-of-count signal to the main controller 51 when a predetermined count is reached. The main controller 51 determines an image forming region on the basis of the end-of-count signal and outputs the sync clock pulses to the laser driver 32 as pixel clock pulses together with image data. On the basis of the pixel clock pulses and image data, the laser driver 32 activates the laser oscillator 31 to emit a light beam, thereby forming an image.

With multiple light beams, a phase difference occurs between each beam due to the precision of each surface of the polygon mirror 35. That is, each light beam is moved across the light beam detector 38 at a different time. For example, the order in which the light beams arrive at the light beam detector depends on the precision of the angle of the reflecting surfaces of the scanning polygon mirror 35. For this reason, the same method as with a single beam cannot determine the order in which the light beams arrive to perform the image forming position control in the main scanning direction.

The present embodiment therefore makes a decision regarding the order of arrival of light beams in advance prior to image formation, determines a combination of each light beam with that one of the light receiving patterns S3 to S6 of the light beam detector 38 which detects the time at which that light beam traverses, and performs the image forming position control in the main scanning direction. This will be described below in terms of four light beams.

As described previously, four light receiving patterns S3, S4, S5 and S6 are used for image forming position control in the main scanning direction. These light receiving patterns are photosensors (photodiodes) that are arranged in the direction of scanning by the light beams and produce currents the magnitude of which depends on the amounts of light incident on their respective light receiving surfaces. Thus, the light receiving patterns S3 to S6 provide passage time detect signals at times when the light beams traverse them.

Figure 6A:
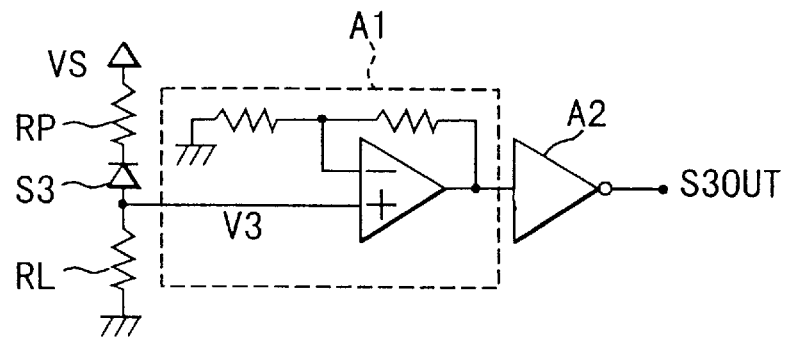
FIGS. 6A through 6D illustrate the arrangements of main scanning circuits in the light beam sensor output processing circuit.
Figure 6B:
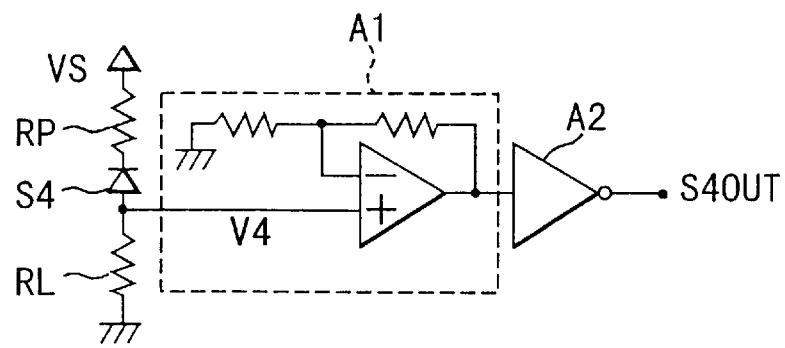
Figure 6C:
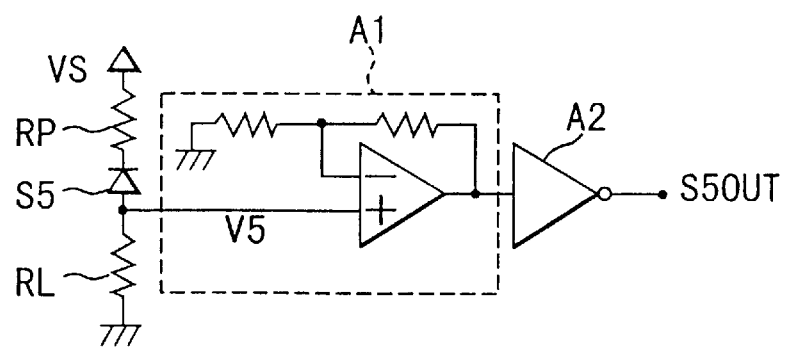
Figure 6D:
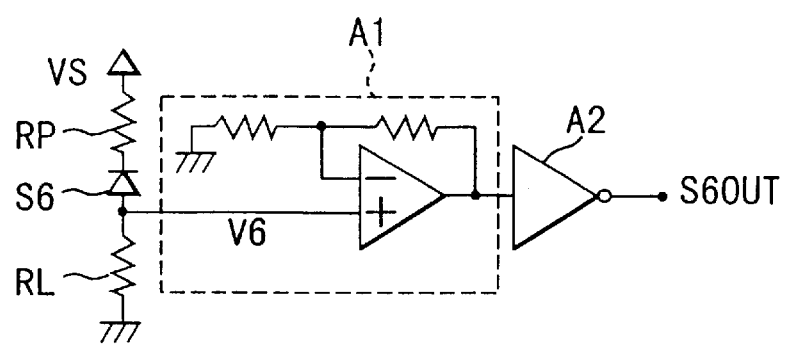

FIGS. 6A, 6B, 6C and 6D show an arrangement of the main-scanning-side circuit 40a of the light beam detector output processing circuit 40. FIG. 6A shows the circuit associated with the light receiving pattern S3, in which a current flowing through the pattern S3 (photodiode) is converted by resistors RP and RL into a voltage V3 that provides a passage time detect signal. The voltage V3 is amplified by a non-inverting amplifier Al and then binary coded by a binarization circuit A2 to provide S3OUT. The S3OUT is sent to the main controller 51, the synchronization circuit 55, and the counter 60 as a light beam detect signal. The same is true of the light receiving patterns S4, S5, and S6.

The main controller 51 uses the light beam detect outputs S3OUT to S6OUT to decide the order of arrival of light beams. The method of decision will be described hereinafter.

Figure 7A:
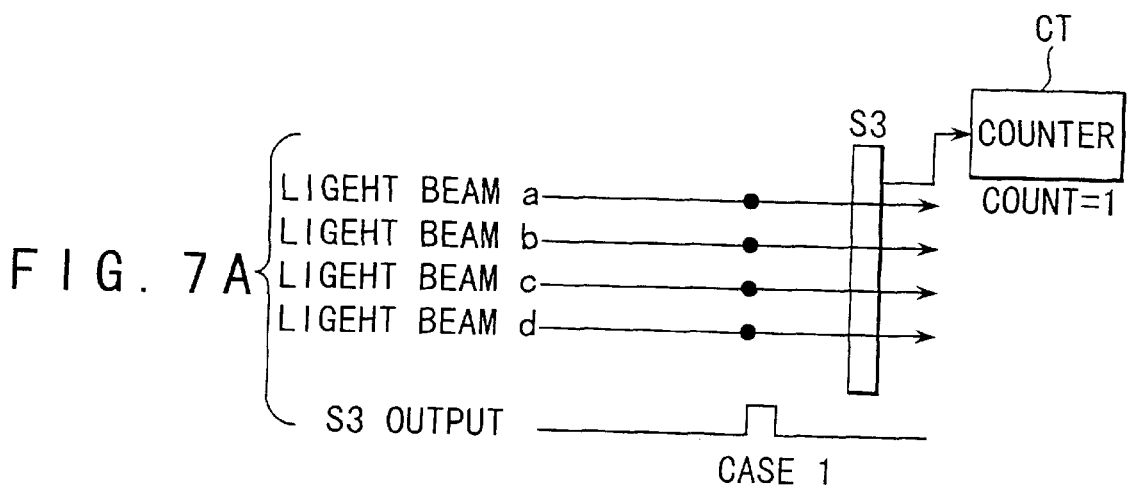
FIGS. 7A, 7B and 7C are diagrams for use in explanation of light beam arrival states.

First, a decision is made in what conditions the four light beams are moved across the light beam detector. The decision is made for the following five conditions:

(1) All the four light beams overlap (the four beams are all in phase; FIG. 7A).

Figure 7B:
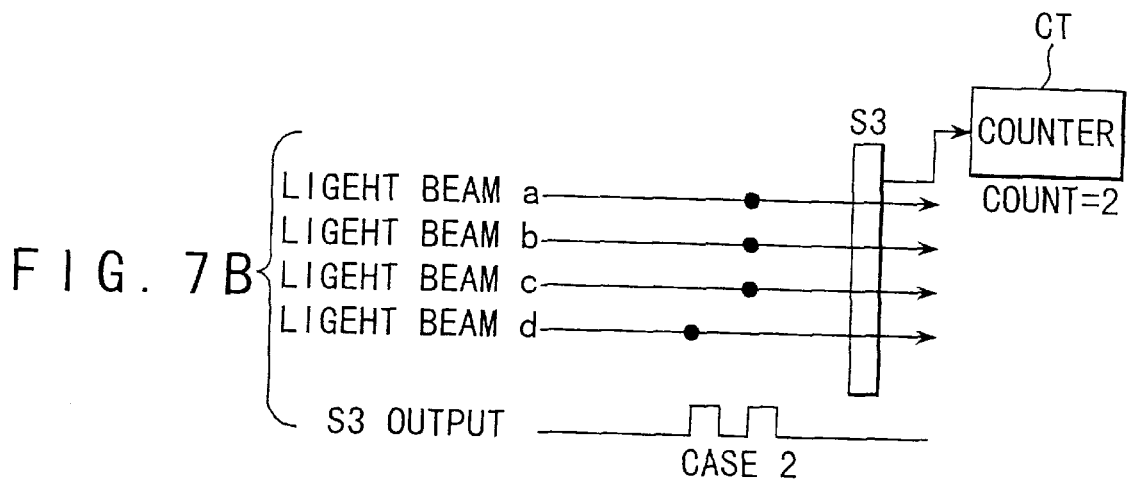

(2) Of the four light beams, only three overlap (only three beams are in phase; FIG. 7B).

Figure 7C:
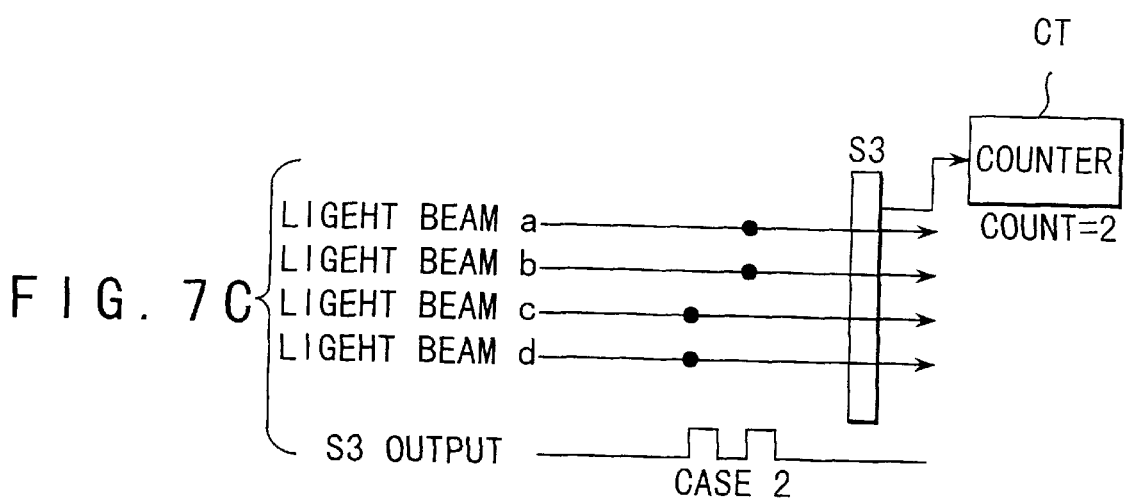

(3) Of the four light beams, each pair of beams overlap (each pair of beams are in phase; FIG. 7C).

Figure 8A:
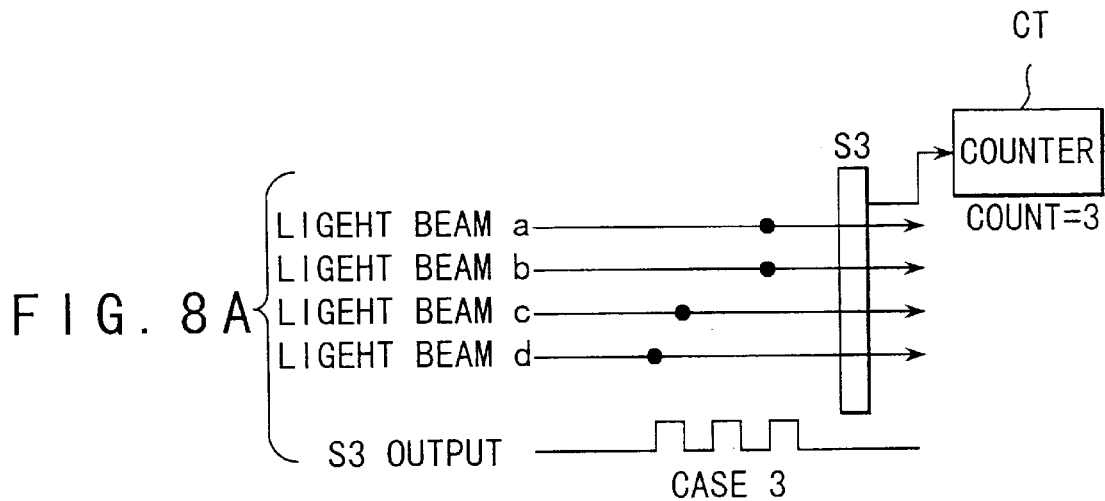
FIGS. 8A and 8B are diagrams for use in explanation of light beam arrival states.

(4) Only two of the four light beams overlap (only two beams are in phase; FIG. 8A).

Figure 8B:
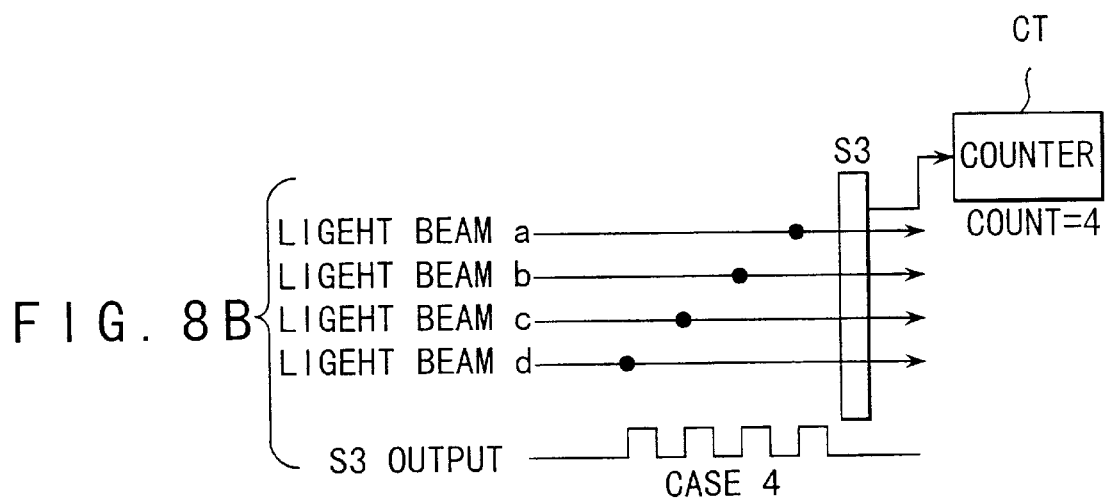

(5) The four light beams do not overlap in time (all the beams are out of phase; FIG. 8B).

Figure 9:
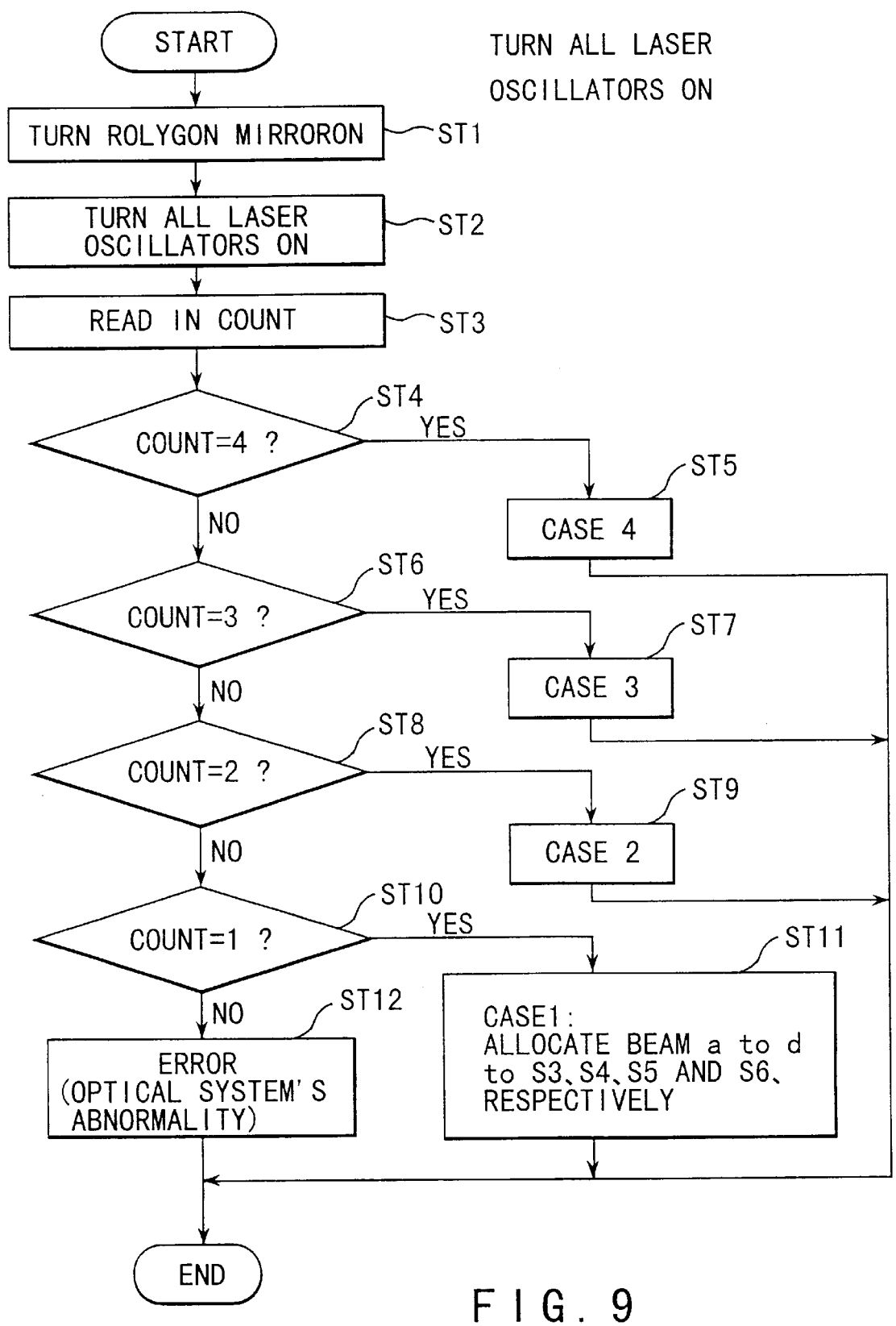
FIG. 9 is a flowchart for the light beam arrival state determination procedure.

Hereinafter, reference will be made to FIG. 9 to describe the procedure of deciding light beam arriving conditions.

The main controller 51 specifies the rotational speed of the polygon mirror motor 36 and enters a rotation-on signal into the polygon mirror motor driver 37. Thereby, the polygon mirror motor 36 rotates at the specified rotational speed (step ST1).

Subsequently, the main controller 51 issues a forced emission signal to the laser drivers 32a to 32d to thereby force each of the laser oscillators 31a to 31d to emit a beam of light (step ST2). The light beams a to d from the laser oscillators 31a to 31d are moved across the light receiving pattern S3 by the polygon mirror 35. Thus, the light receiving pattern S3 provides a passage time detect signal at the time when a corresponding one of the four beams a to d passes.

The passage time detect signal is amplified and binary coded by the circuit 40a of the light beam detector output processing circuit 40 described previously and then entered into the main controller 51, the synchronization circuit 55, and the counter 60 as S3OUTa, S3OUTb, S3OUTc, or S3OUTd.

The light beam detect signals S3OUT are counted by the counter 60. The main controller 51 reads in the count in the counter 60 (step ST3). Counts are classified into the following case 1 to case 4 according to the light beam arriving conditions (see FIGS. 7 and 8):

Case 1 (count=1): the four beams are all in phase.

Case 2 (count=2): each pair of beams are in phase or only three are in phase.

Case 3 (count=3): only two beams are in phase.

Case 4 (count=4): all beams are out of phase.

On the basis of the count in the counter 60, the main controller 51 makes a decision regarding the light beam arriving conditions (steps ST4 to ST12). For example, when the count is unity, that is, for case 1, the four light beams a to d can be handled like a single light beam because they are all in phase.

That is, the allocation of the light beams a to d to the light receiving patterns S3 to S6 is free and each of the light beam detect outputs S3OUT, S4OUT, S5OUT and S6OUT may be allocated to a respective one of the light beams a to d. In step ST11 of FIG. 9, the allocation is such that the light beam a is allocated to the light receiving pattern S3, the beam b to the pattern S4, the beam c to the pattern S5, and the beam d to the pattern S6.

For cases 2, 3 and 4, at least one of the light beams differs in phase and a decision regarding the order in which the light beams arrive, i.e., a decision of which of the four light beams are the first one, the second one, the third one, and the fourth one is further needed.

Figure 10:
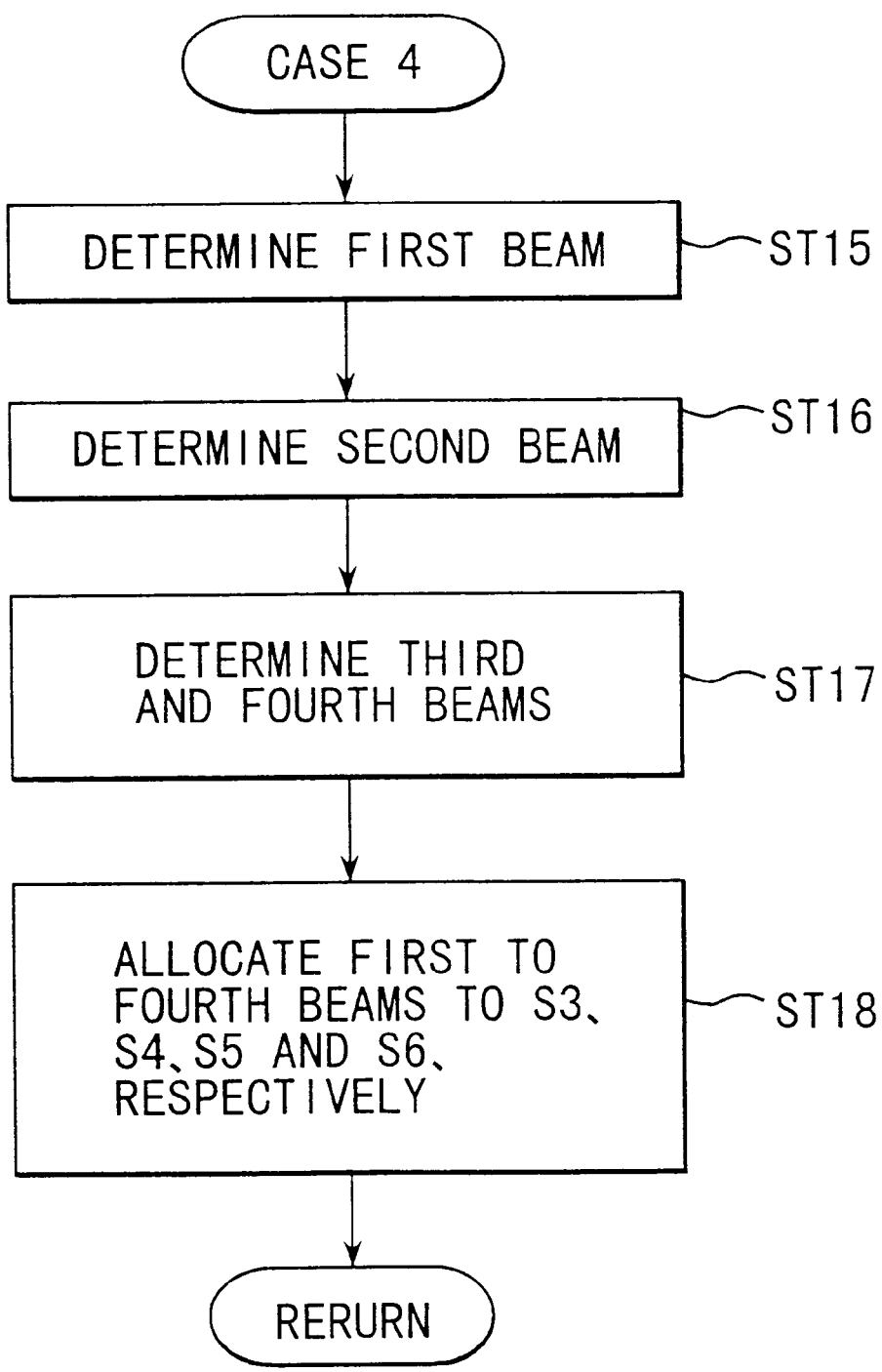
FIG. 10 is a flowchart for the sensor allocation procedure for case 4.

FIG. 10 is a flowchart for the sensor allocation procedure for case 4. The first, second, third and fourth light beams to arrive are decided in sequence (steps ST15 to ST18). Then, the first beam is allocated to the light receiving pattern S3, the second one to the pattern S4, the third one to the pattern S5 and the fourth one to the pattern S6 (step ST18). The light beam decision procedure will be described below in detail.

Figure 11:
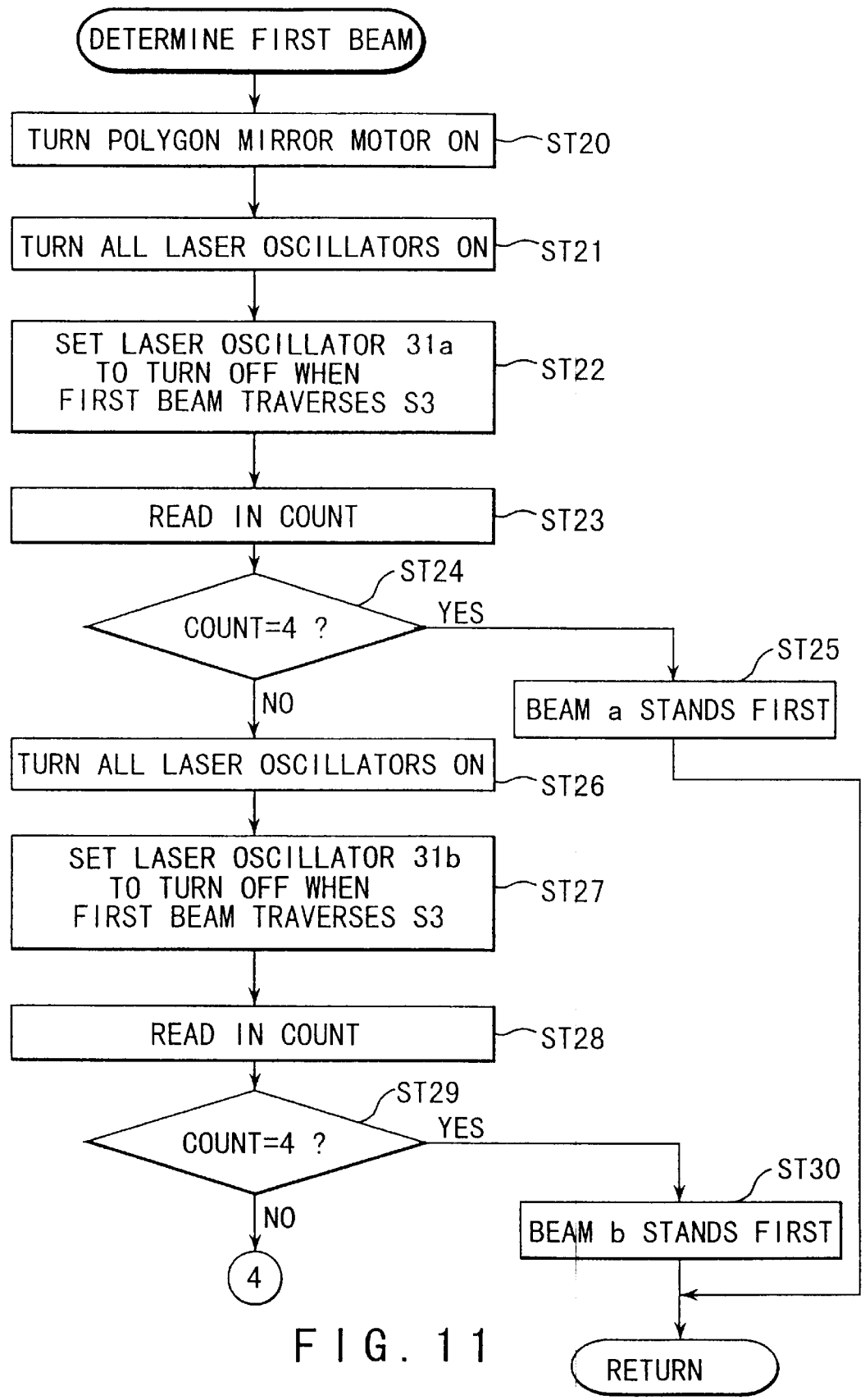
FIGS. 11 and 12 form a flowchart for the first light beam determination procedure.
Figure 12:
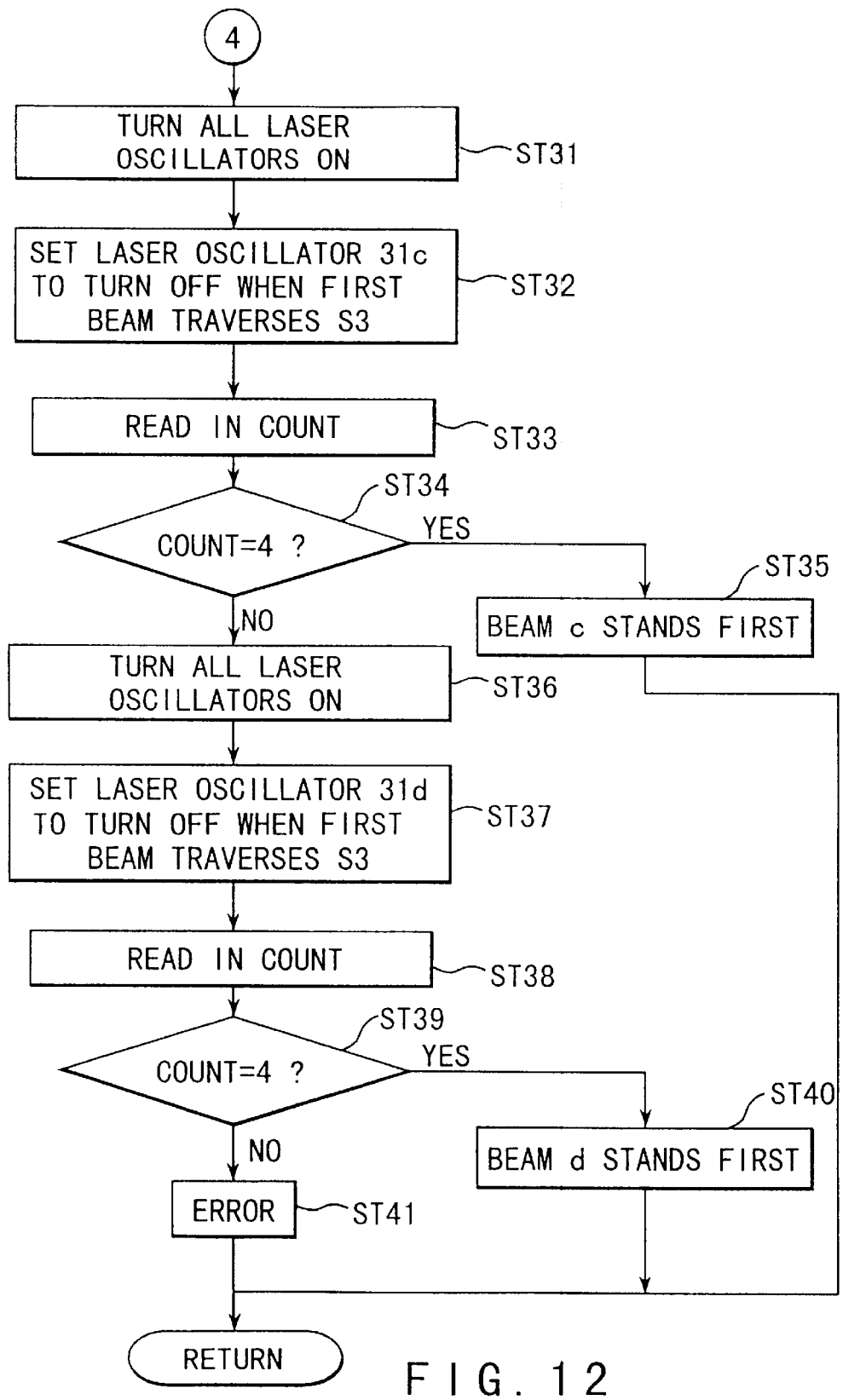

In the first place, the first beam decision procedure will be described with reference to FIGS. 11 and 12 that forms a flowchart. The main controller 51 specifies a rotational speed of the polygon mirror motor 36 and applies a rotation-on signal to the polygon mirror motor driver 37 (step ST20). Thus, the polygon mirror motor 36 starts to rotate at the specified rotational speed.

After that, the main controller 51 inputs a forced emission signal to the laser drivers 32a to 32d to thereby force each of the four laser oscillators 31a to 31d to emit a beam of light (step ST21). Further, the main controller 51 sets the laser oscillator 31a to turn off when the first light beam move across the light receiving pattern S3 to provide a light beam detect output S3OUT (step ST22).

Specifically, the four light beams a to d are emitted by the laser oscillators 31a to 31d and then moved across the light receiving pattern S3 by the polygon mirror 35. The main controller 51 turns off the laser oscillator 31a after the time when the first light beam moves across the light receiving pattern S3 and a light beam detect output S3OUT is output.

The light beam detect output S3OUT is counted by the counter 60, which is read by the main controller 51. When the count in the counter 51 reaches four, the main controller decides that the light beam a is the first one. When the count is not four, it is decided that a light beam other than the beam a is the first one. In this case, a decision is made again.

More specifically, if the light beam a stands first, a light beam detect output S3OUTa is output when the light beam a moves across the pattern S3. Thus, the counter in the counter 60 becomes one and at the same time the laser oscillator 31a is turned off. The counter further counts light beam detect outputs S3OUTb, S3OUTc, and S3OUTd produced when the light beams b, c and d move across the pattern S3, so that the counter in the counter 60 reaches four. Assume here that the light beam a is not the first one. When a light beam other than the beam a (for example, the light beam b) moves across the pattern S3, the light beam detect output S3OUTb is produced. Thus, the counter 60 is incremented by one. At the same time, the laser oscillator 31a is turned off. The counter further counts light beam detect outputs S3OUTc and S3OUTd when the light beams c and d move across the pattern S3. Thus, the counter 60 reaches a count of three.

When the light beam a is not the first one, the main controller 51 makes anew a decision of which of the light beams stands first. For this decision, the main controller 51 simply sets the laser oscillator 31b to turn off at the time when the first beam moves across the light receiving pattern S3.

The main controller 51 applies a forced emission signal to the laser drivers 32a to 32d, thereby forcing the laser oscillators 31a to 31d to emit light beams (step ST26). In addition, the main controller sets the laser oscillator 31b to turn off when the first beam moves across the pattern S3 to thereby produce a light beam detect output S3OUT (step ST27).

The four light beams a to d emitted by the laser oscillators 31a to 31d are deflected by the polygon mirror 35 to move across the light receiving pattern S3. When the first light beam moves across the pattern S3 and a light beam detect output S3OUT is produced, the main controller 51 turns off the laser oscillator 31b.

The light beam detect output S3OUT is counted by the counter 60, which is read by the main controller 51 (step ST28). When the count in the counter 51 reaches four, the main controller decides that the light beam b is the first one (steps ST29 and ST30). When the count does not reach four, it is decided that a light beam other than the beam b is the first one. In this case, a decision is made again.

In making this decision, the main controller 51 sets the laser oscillator 31c to turn off at the time when the first one of the three light beams moves across the light receiving pattern S3. When the counter 60 reaches a count of four, it is decided that the light beam c is the first one (step ST34 and ST35). When the count in the counter 60 is not four, it is decided that a light beam other than the beam c is the first one and a decision is made anew.

When the light beam c is not the first one, the main controller 51 makes anew a decision of which of the light beams leads. In making this decision, the main controller 51 sets the laser oscillator 31*d* to turn off at the time when the first beam moves across the light receiving pattern S3. When the counter 60 reaches a count of four, the light beam d is the first one (steps ST39 and ST40). If not four, an error signal is output (step ST41).

Figure 13:
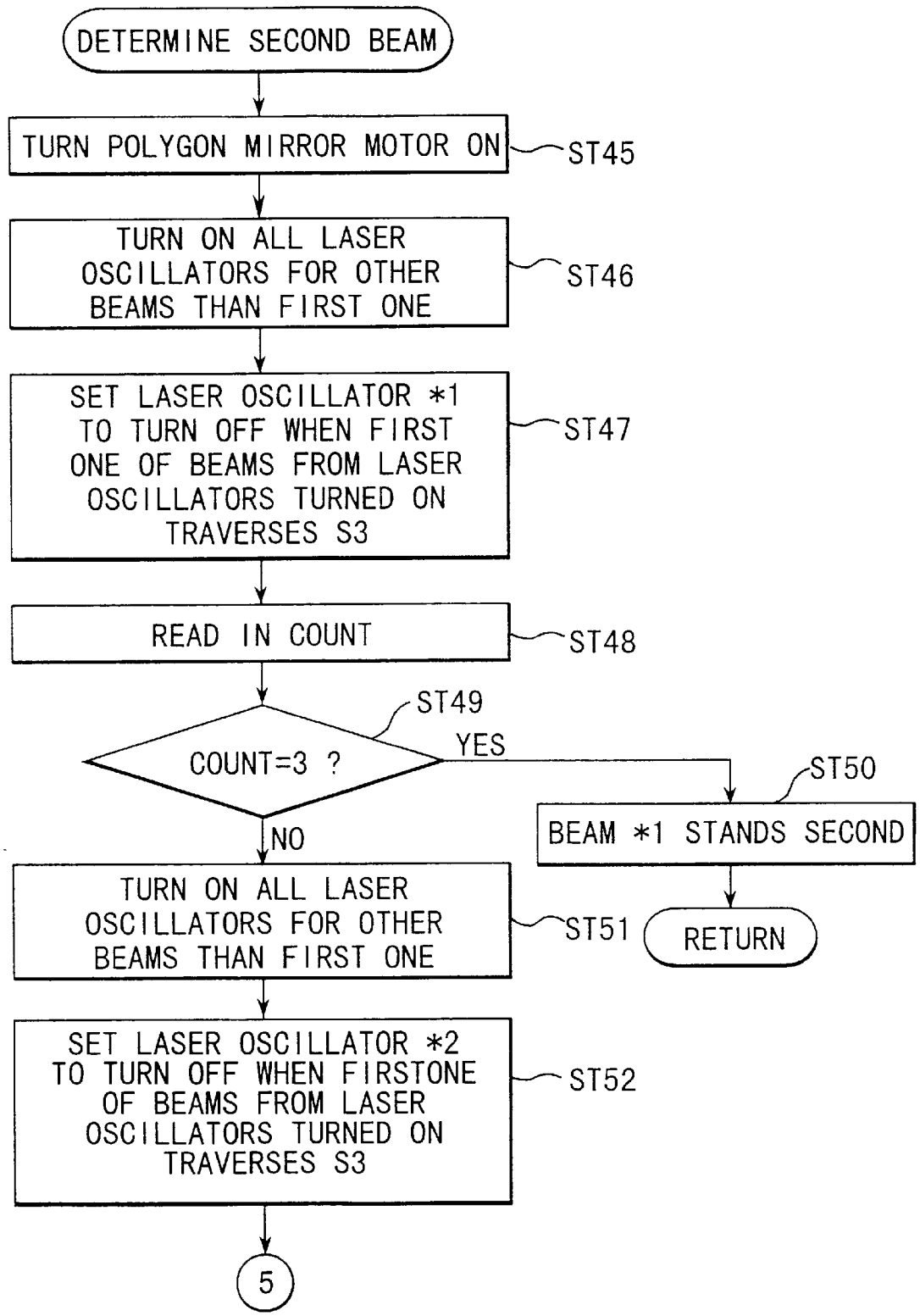
FIGS. 13 and 14 form a flowchart for the second light beam determination procedure.
Figure 14:
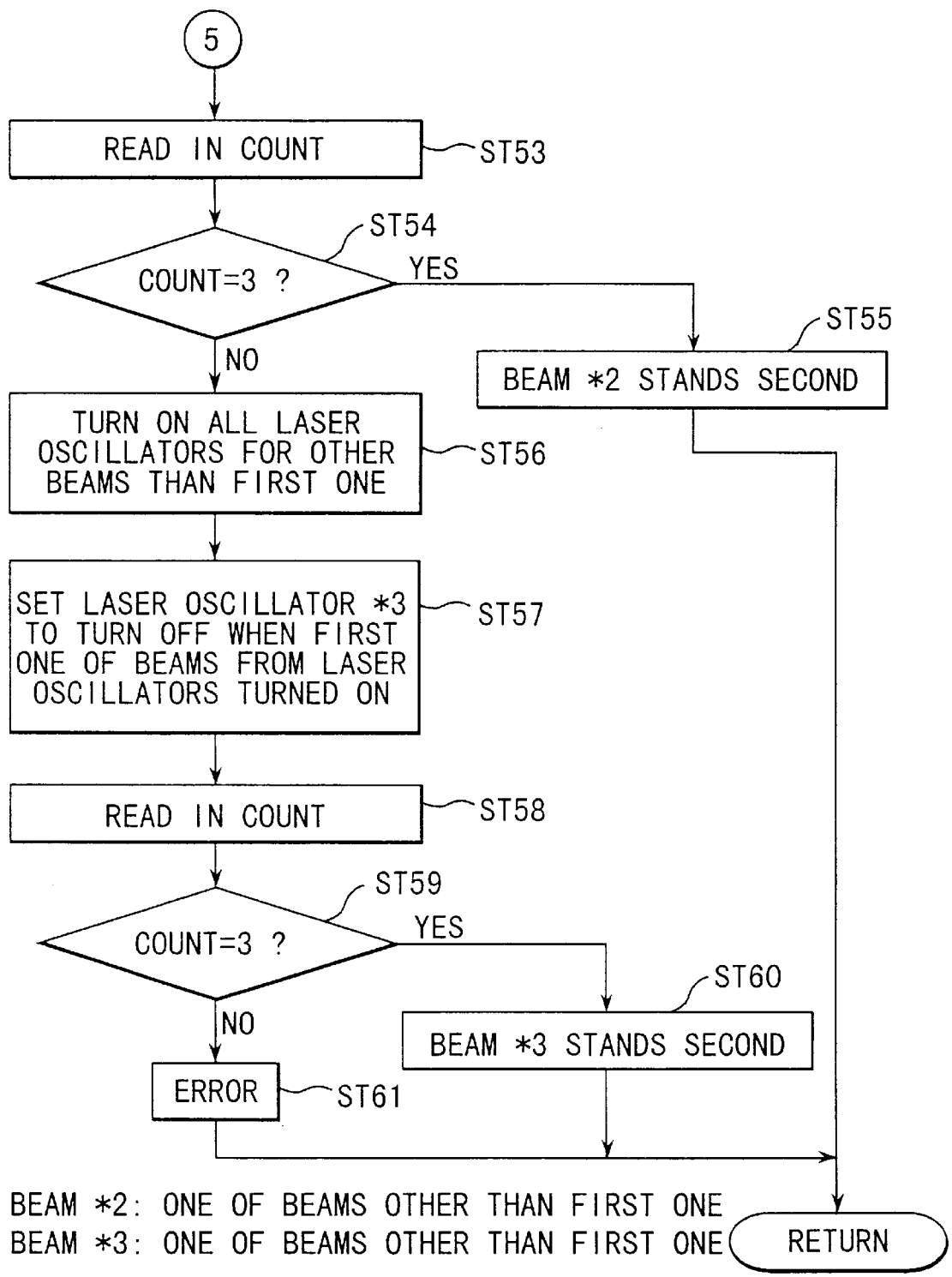

After the first light beam has been decided by the above procedure, a decision is made as to which of the remaining three beams is the second one. The procedure of deciding the second light beam remains unchanged from the procedure of deciding the first light beam except that three light beams other than the first one are taken into consideration. Hereinafter, reference will be made to FIGS. 13 and 14 to describe the procedure of deciding the second light beam. The main controller 51 specifies a rotational speed of the polygon mirror 36 and issues a rotation-on signal to the polygon mirror motor driver 37. Thus, the polygon mirror motor 36 rotates at the specified speed (step ST45).

The main controller 51 subsequently issues a forced emission signal to the three laser drivers corresponding to the three light beams other than the first light beam to thereby force the three corresponding laser oscillators to emit light beams (step ST46). In addition, the main controller 51 sets the laser oscillator *1 to turn off at the time when, of the three light beams, the first light beam moves across the pattern S3 to produce a light beam detect output S3OUT (step ST47). Here, the light beams *1, *2 and *3 other than the first light beam decided previously are defined as follows:

Light beam *1: a light beam numbered one (corresponding to the laser oscillator *1).

Light beam *2: a light beam numbered two (corresponding to the laser oscillator *2).

Light beam *3: a light beam numbered three (corresponding to the laser oscillator *3).

The three light beams *1, *2 and *3 emitted by the three laser oscillators are deflected to move across the light receiving pattern S3. When the first one of the three light beams moves across the pattern S3 and a light beam detect output S3OUT is produced by the pattern S3 (photodiode), the main controller 51 turns off the laser oscillator *1.

The light beam detect output S3OUT is counted by the counter 60, which is read by the main controller 51 (step ST48). When the count in the counter 51 reaches three, the main controller decides that the light beam *1 is the second one (steps ST49 and ST50). When the count does not reach three, it is decided that a light beam other than the beam *1 is the second one. In this case, a decision is made again.

In making this decision, the main controller 51 sets the laser oscillator *2 to turn off at the time when the first one of the three light beams moves across the light receiving pattern S3 (step ST52). When the counter 60 reaches a count of three, it is decided that the light beam *2 is the second one (step ST54 and ST55). When the count in the counter 60 does not reach three, it is decided that a light beam other than the beam *2 is the second one and a decision is made anew.

In making this decision, the main controller 51 sets the laser oscillator *3 to turn off at the time when the first beam moves across the light receiving pattern S3 (step ST57). When the counter 60 reaches a count of three, the light beam *3 is the second one (steps ST59 and ST60). If the count does not reach three, an error signal is output (step ST61).

Figure 15:
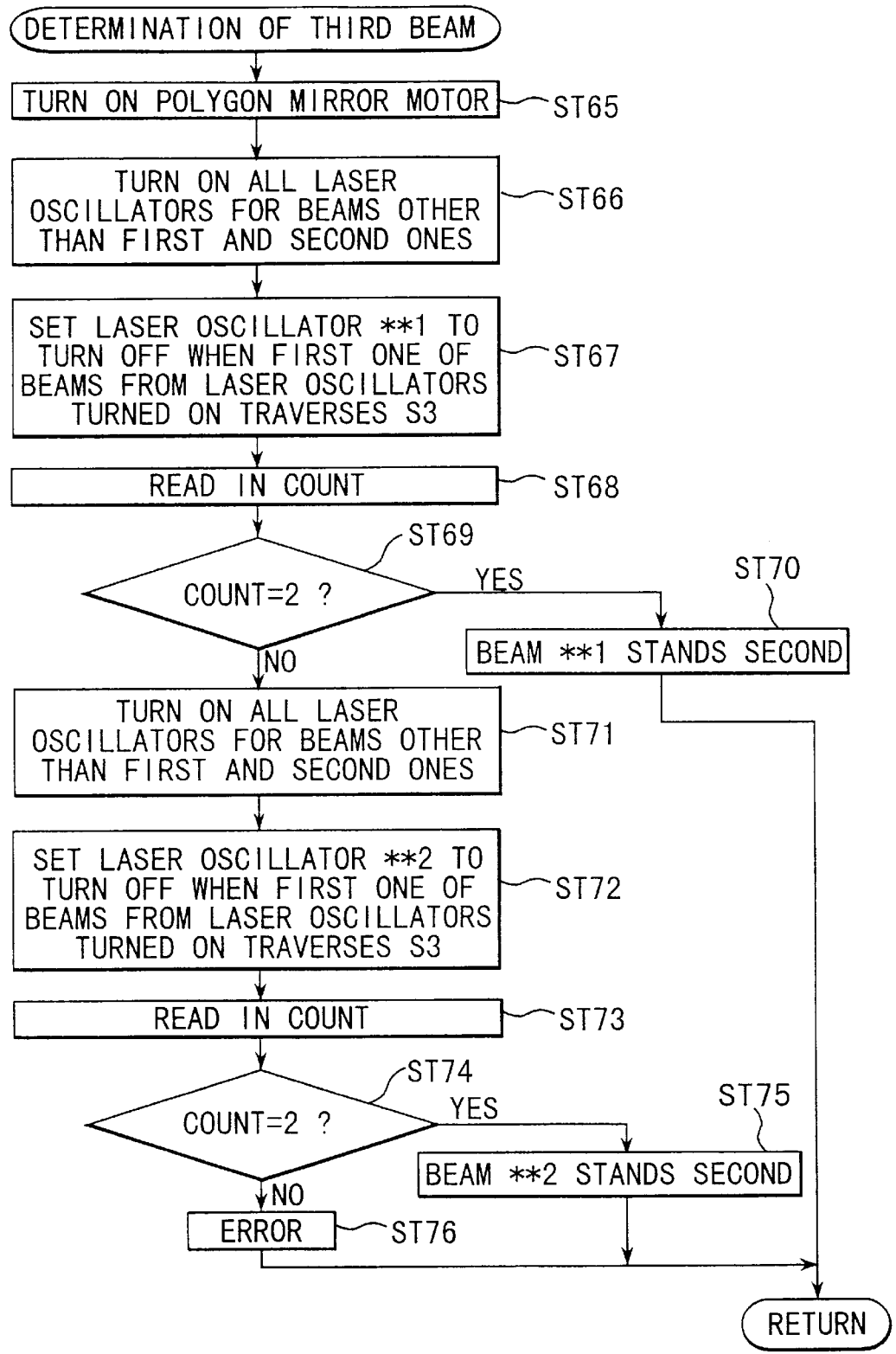
FIG. 15 is a flowchart for the third light beam determination procedure.

After the first and second light beams have been decided by the above procedures, a decision is made as to which of the remaining two beams are the third and fourth ones. Although, in FIG. 15, there is illustrated a flowchart for the procedure of deciding the third light beam, it remains unchanged from the procedure of deciding the second light beam and its description is therefore omitted.

After the decision regarding the order of arrival of the four light beams was made in this manner, the first, second, third and fourth light beams are allocated to the light receiving patterns S3, S4, S5, and S6, respectively, thus terminating the sensor allocation for case 4.

Figure 16:
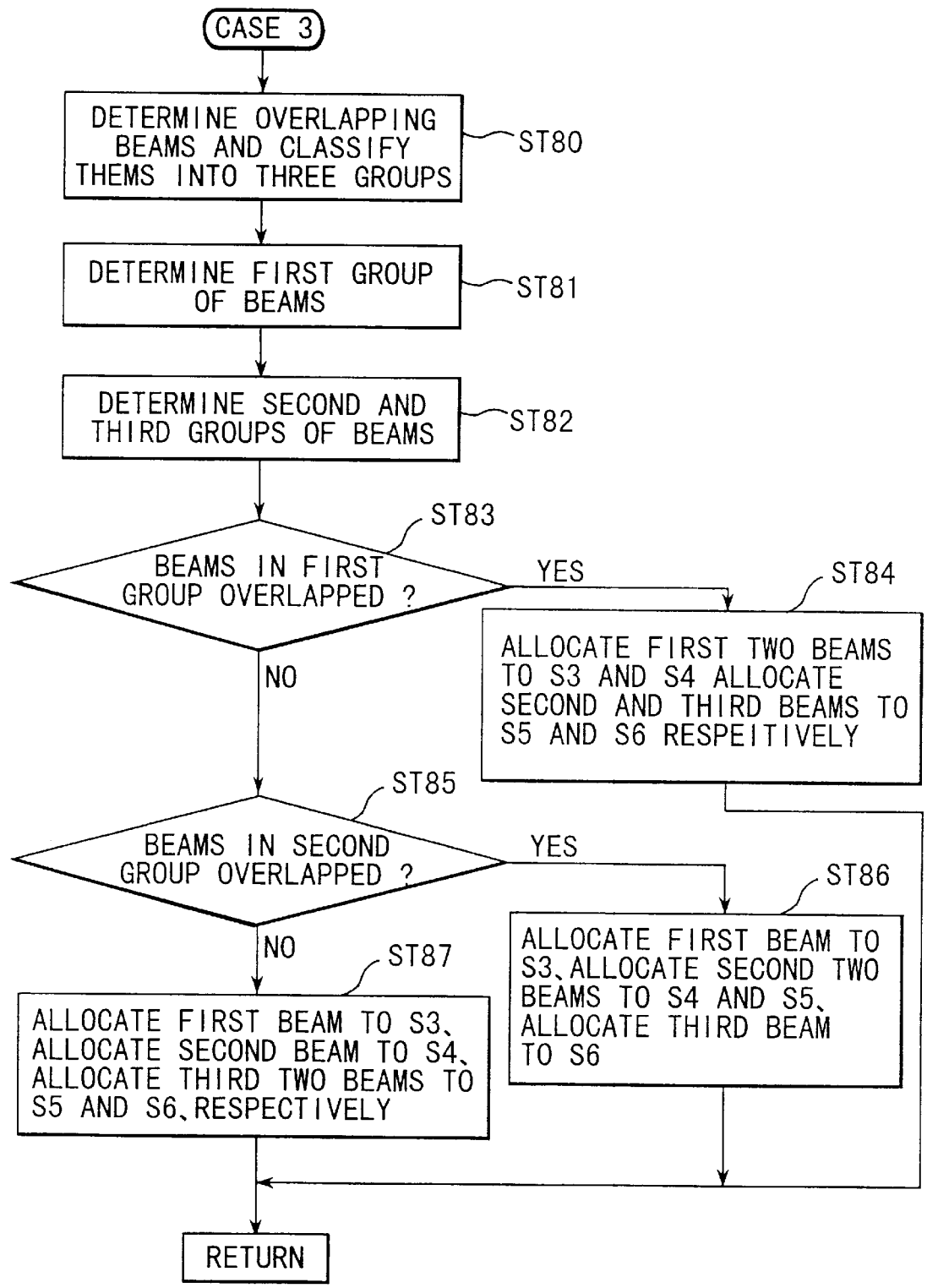
FIG. 16 is a flowchart for the sensor allocation procedure for case 3.

Next, reference will be made to a flowchart shown in FIG. 16 to describe the sensor allocation procedure for case 3 where, of the four light beams a to d, a pair of beams are overlapping in time. First, the two overlapping beams are identified and the four beams are classified into three groups: a group of two overlapping beams, and two groups each consisting of a respective one of the two non-overlapping beams (step ST80). A decision is made next for the order of arrival of the groups (step ST82). When the overlapping beams are in the first group, the allocation is made as follows (step ST84):

The two first light beams: S3, S4

The second light beam : S5

The third light beam : S6

When the overlapping beams are not in the first group, a decision is made as to whether or not the overlapping beams are in the second group. If the decision is that the overlapping beams are in the second group, then the allocation is made (step ST86) as follows:

The first light beam : S3

The second two light beams: S4, S5

The third light beam : S6

When the overlapping light beams are not in the first or second group, the allocation is made (step ST 87) as follows:

The first light beam : S3

The second light beam : S4

The third two light beams: S5, S6

Hereinafter, how to identify each group will be described in detail.

Figure 18:
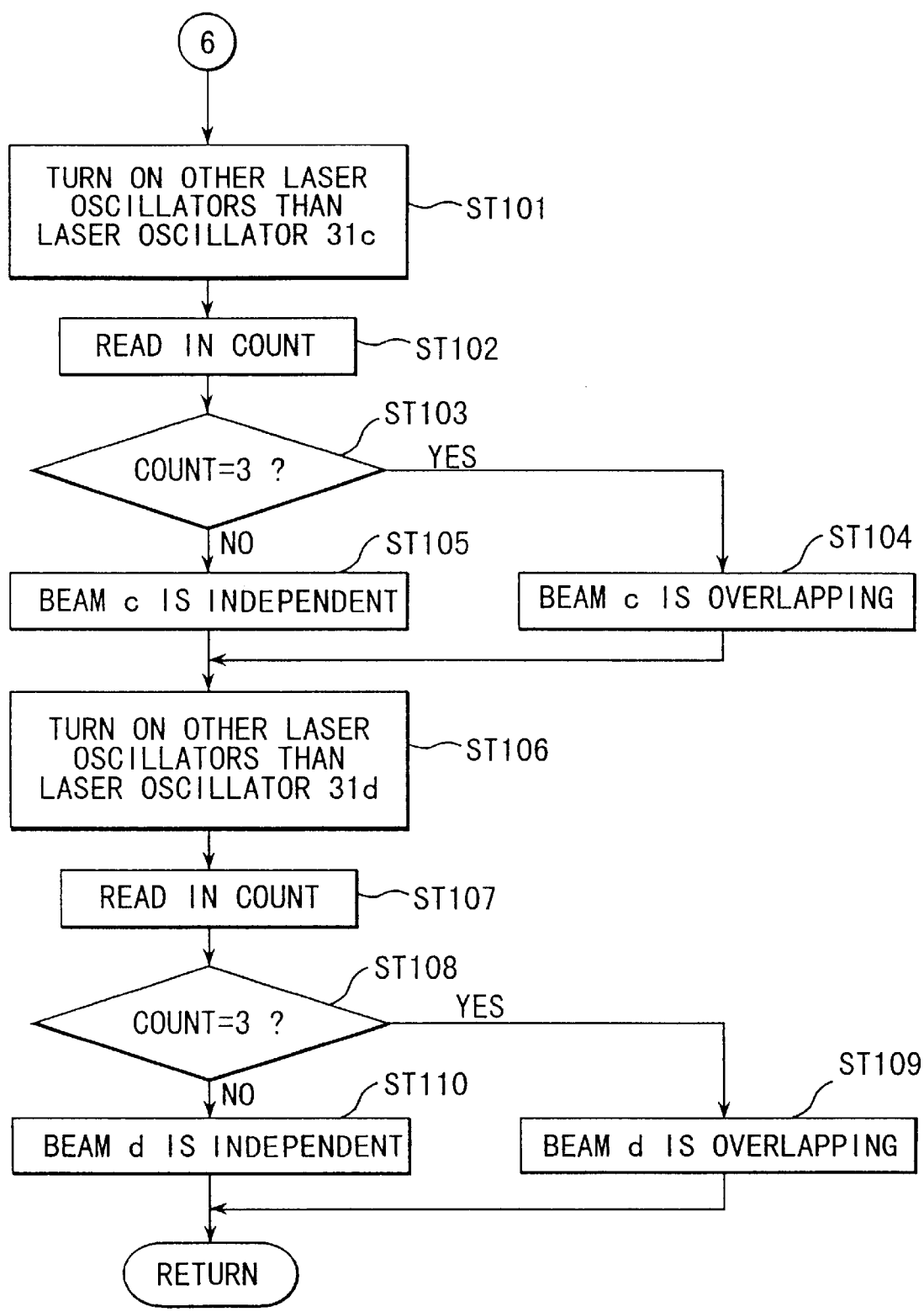

First, the procedure of identifying overlapping light beams and grouping the light beams will be described with reference to FIGS. 17 and 18 that form a flowchart.

The main controller 51 feeds a rotation-on signal to the polygon mirror motor driver 37, so that the polygon mirror motor 36 starts to rotate. The main controller then issues a forced emission signal to three laser drivers 32*b* to 32*d* other than the laser driver 32*a* to thereby force the laser oscillators 31*b* to 31*d* to emit light beams (step ST91).

The light beams b, c and d emitted by the laser oscillators 31*b* to 31*d* are deflected by the polygon mirror 35 to move across the light receiving pattern S3. The pattern S3 produces light beam detect outputs S3OUT which are, in turn, counted by the counter 60.

The main controller 51 reads the count in the counter 60. When the count is three, it is decided that the light beam a overlaps with another light beam. If, on the other hand, the count is not three, it is decided that the light beam a does not overlap with another beam (isolated) (steps ST94 and ST95). With case 3, only two of the four light beams a to d overlap each other. Therefore, when the light beam a overlaps, it is evident that there is no overlap between any two of the remaining three beams b, c and d (each of the three beams is isolated). In response to these light beams b, c and d, the light receiving pattern S3 produces light beam detect outputs S3OUTb, S3OUTc and S3OUTd. The counter 60 counts these outputs and reaches a count of three.

When the light beam a is not overlapping, it is evident that two of the remaining three beams b, c and d overlap each other. In this case, the count in the counter 60 reaches two. Assuming, for example, that the light beams b and c overlap each other, the light beam outputs S3OUTb and S3OUTc will be output simultaneously to form a single output (S3OUTbc). As a result, this output and the output S3OUTd, i.e., a total of two outputs, are produced, providing a count of two.

For the light beams b, c and d as well, the same decision is made to classify the beams into a non-overlapping group and an overlapping group (steps ST96 to ST109).

On termination of grouping, a decision regarding the order of arrival of groups is made. In the overlapping group, either of two beams is selected as the representative. This results in a decision regarding the order of arrival of three light beams. This decision can be made by exactly the same procedure as that described previously in conjunction with FIGS. 13, 14 and 15.

Figure 19:
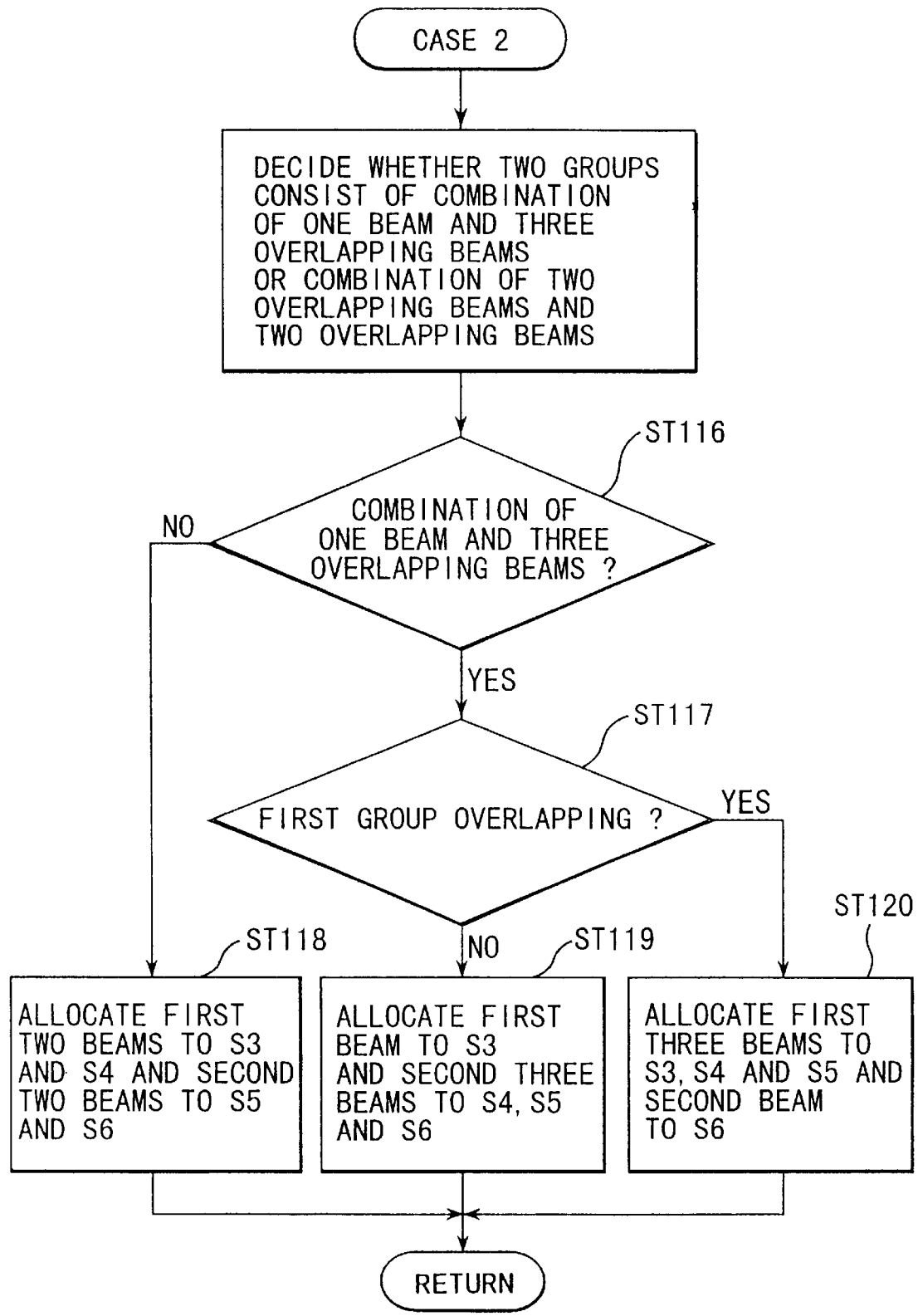
FIG. 19 is a flowchart for the sensor allocation procedure for case 2.

After that, the sensor allocation for case 3 is made in the manner described previously. The sensor allocation procedure for case 2 will be described next with reference to a flowchart of FIG. 19. Case 2 involves a combination in which, of four light beams a to d, each pair of light beams overlap each other and a combination in which three light beams overlap one another and one light beam is isolated. These combinations need be identified first. In the combination of two overlapping beams and two overlapping beams, the order of arrival of the two groups is determined and the sensor allocation is made as follows (step ST118):

The first group (first two light beams) : S3, S4

The second group (second two light beams): S5, S6 In the combination of one isolated light beam and three overlapping light beams, on the other hand, the order of arrival of two groups are likewise determined and, when the first group comprises one isolated light beam, the sensor allocation is made (step ST119) such that:

The first group (one light beam) : S3

The second group (three light beams): S4, S5, S6

When the first group comprises three light beams, the allocation is made (step ST120) such that:

The first group (three light beams) : S3, S4, S5

The second group (one light beam) : S6

Figure 20:
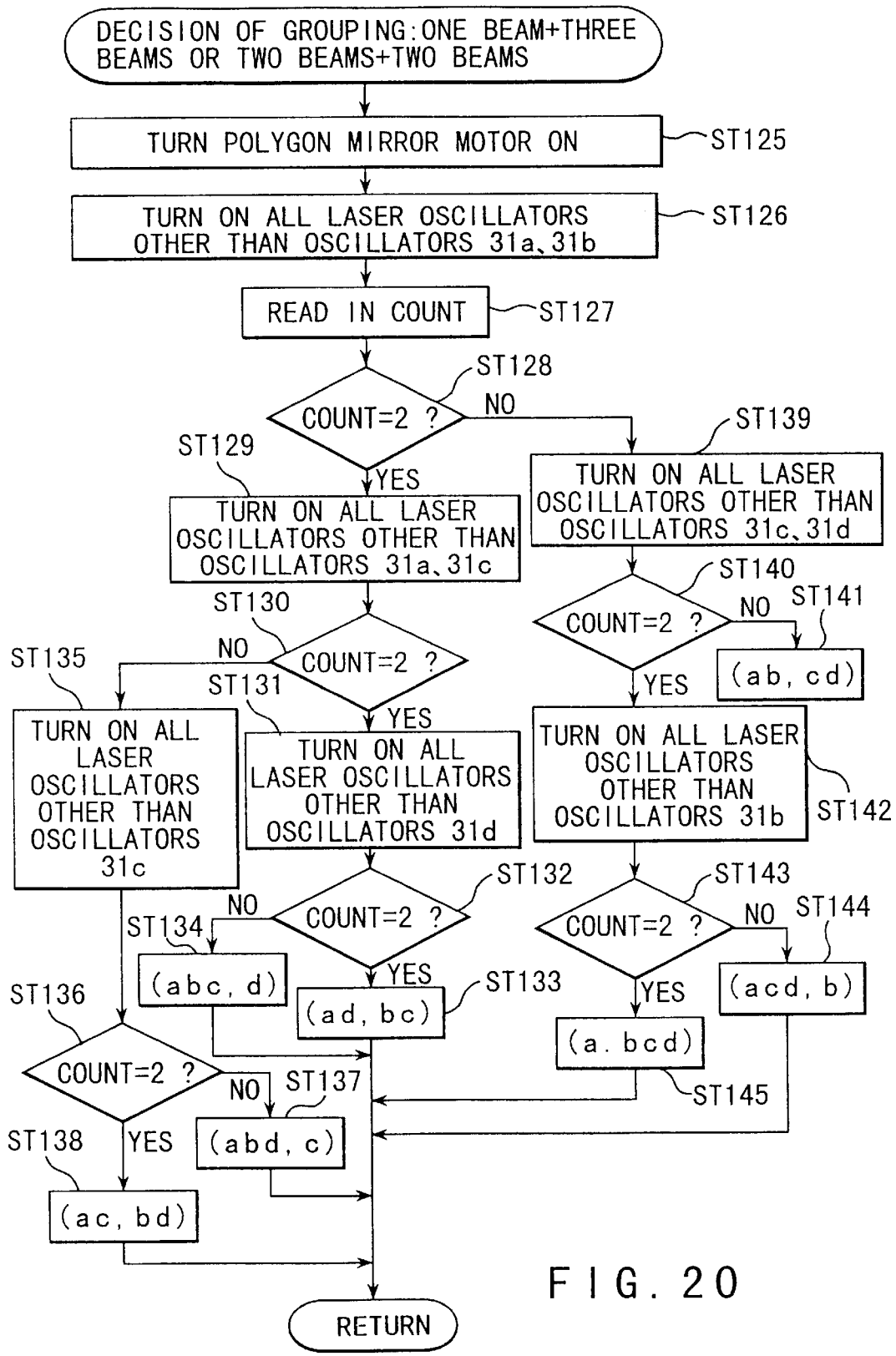
FIG. 20 is a flowchart for the light beam determination procedure.

Hereinafter, how to identify each combination will be described in detail with reference to a flowchart of FIG. 20.

The main controller 51 applies a rotation-on signal to the polygon mirror motor driver 37. Thereby, the polygon mirror motor 36 starts to rotate (step ST125). The main controller 51 then issues a forced emission signal to the laser drivers 32c and 32d to thereby force the laser oscillators 31c and 31d to emit light beams (step ST126).

The light beams c and d emitted by the laser oscillators 31c and 34d are deflected by the polygon mirror 35 to move across the light receiving pattern S3. In response to this, the pattern S3 provides light beam detect outputs S3OUT to the counter 60. The main controller 51 reads the count in the counter 60 (step ST127). Depending on the count in the counter 60, the following combinations may be considered (step ST128):

Count=2:(ac, bd) (ad, bc) (abd, c) (abc, d) Count=1:(ab, cd) (acd, b) (a, bcd)

When the count is two, the laser oscillators 31b and 31d are next forced to emit light beams (step ST129). The light detect outputs are counted. Depending on the count, the following combinations may be considered (step ST130):

Count=2: (ad, bc) (abc, d)

Count=1: (ac, bd) (abd, c)

Further, when the count is two, the laser oscillators 31a, 31b and 31c are forced to emit light beams (step ST131). Depending on the count, the following combinations may be considered (step ST132):

Count=2: (ad, bc) Count=1: (abc, d)

When the count is one in step ST128, on the other hand, the laser oscillators 31a and 34b are forced to emit light beams (step ST139). Depending on the count, the following combinations may be considered (step ST140):

Count=2: (acd, b) (a, bcd)

Count=1: (ab cd)

Further, when the count is two in step ST140, the laser oscillators 31a, 31c and 31d are forced to emit light beams (step ST142). Depending on the count, the following combinations may be considered (step ST143):

Count=2: (a, bcd)

Count=1: (acd, b)

The above procedure permits all combinations of two groups of light beams to be identified.

On termination of deciding the possible combinations of light beams, a decision regarding the order of arrival of the two groups is made next. In the overlapping group, one of two or three light beams is selected as the representative. This results in a decision regarding the order of arrival of two light beams. The procedure of this decision is exactly the same as that described previously in conjunction with FIG. 15 and its description is therefore omitted herein.

After that, the previously described sensor allocation is made for case 2.

By the above procedures, the sensor allocation for case 1 to case 4 is terminated.

When the sensor allocation is made for each light beam, a horizontal synchronization signal is determined for each light beam, allowing image forming position control in the main scanning direction to be performed as in the case of a single light beam (see FIGS. 21 and 22). Suppose, for example, that the following allocation is made:

The order of arrival of light beams: a, b, c, d

Light beam a: light receiving pattern S3

Light beam b: light receiving pattern S4

Light beam c: light receiving pattern S5

Light beam d: light receiving pattern S6

Figure 23:
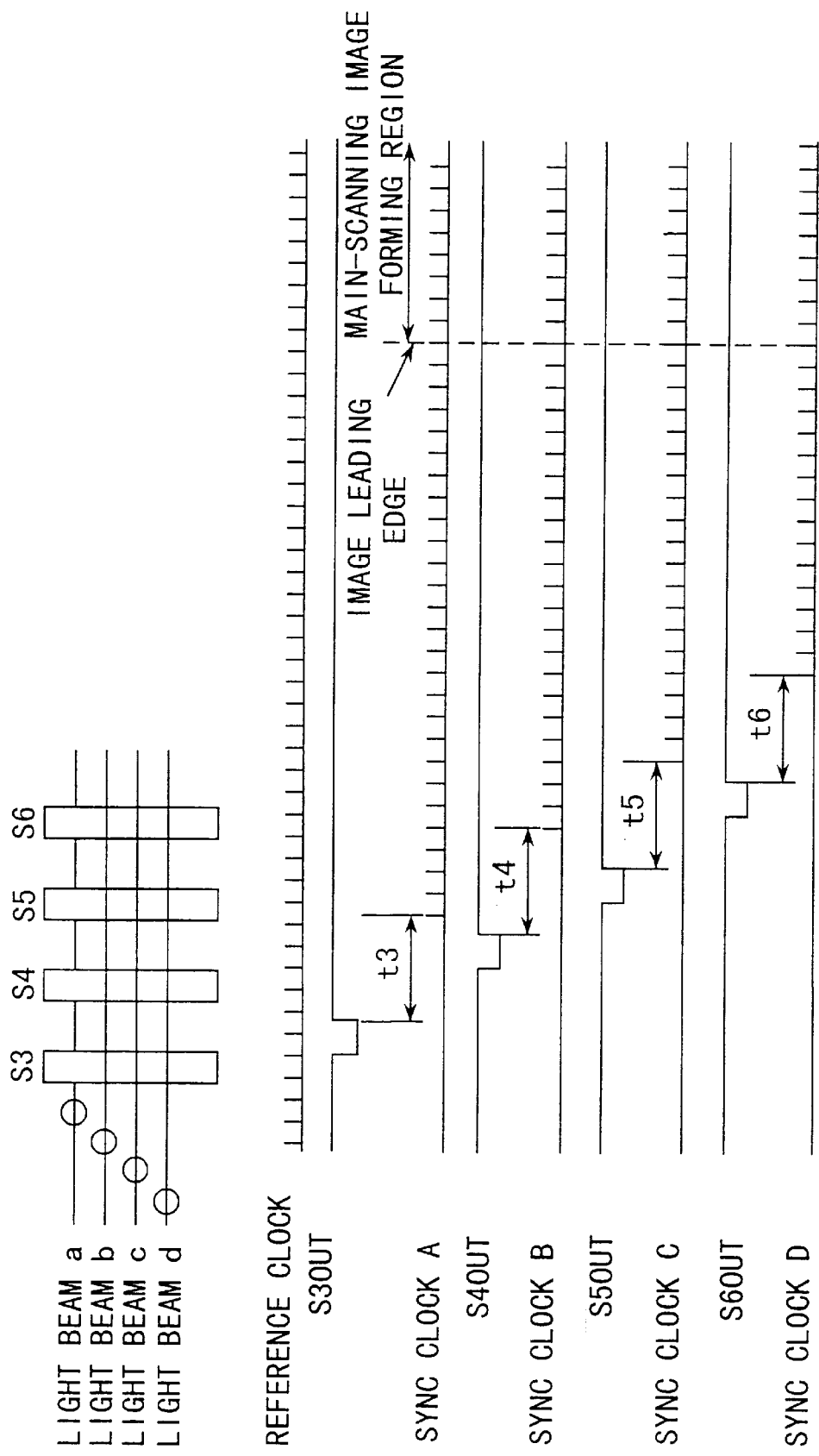
FIG. 23 is a timing diagram for use in explanation of the image forming position control in the main scanning direction when four beams of light are used.

Hereinafter, reference is made to FIG. 23. First, the main controller 51 turns on the polygon mirror motor 36 to rotate and causes all the laser oscillators 31a to 34d to emit light beams a to d. The light beams a to d deflected by the polygon mirror 35 move across the light receiving pattern S3 with the light beam a as the first one as it was decided. A light beam detect output S3OUT is produced, which becomes a horizontal synchronization signal for the light beam a.

When the light beam detect output S3OUT is produced, the main controller 51 turns off the laser oscillator 31a. The synchronization circuit 55 outputs sync clock pulses after a circuit-based delay of t3 from the trailing edge of the light beam detect output S3OUT. The counter 60 counts these sync clock pulses and outputs an end-of-count signal to the main controller 51 when a predetermined count (corresponding to the left margin) is reached. Upon receipt of the end-of-count signal, the main controller 51 outputs pixel clock pulses to the laser drivers 32a to 32d to thereby start image formation in the main scanning direction. When a predetermined count (corresponding to the right margin) is reached, the main controller stops outputting the pixel clock pulses, terminating the image formation in the main scanning direction.

When the light beam b moves across the light receiving pattern S4, a light beam detect output S4OUT is output, which causes the main controller 51 to turn off the laser oscillator 34b. The synchronization circuit 55 outputs sync clock pulses after a circuit-based delay of t4 from the trailing edge of the output S3 serving as a horizontal synchronization signal for the light beam. The counter 60 counts these sync clock pulses to perform image formation in the main scanning direction in the same manner as with the light beam a.

The above operation is likewise performed for the light beams c and d for image formation in the main scanning direction. A light beam detect output S5OUT serves as a horizontal synchronization signal for the light beam c, while a light beam detect output S6OUT serves as a horizontal synchronization signal for the light beam d.

To detect the times at which the light beams move across the light beam detector 38, the spacing P3 between the patterns S3 and S4, the spacing P4 between the patterns S4 and S5 and the spacing P5 between the patterns S5 and S6 are each set to an integral multiple of the distance over which a light beam travels in the scanning direction during one cycle period of the sync clock pulses output from the synchronization circuit 55. This will be described below.

In the present embodiment, assuming that the velocity of a light beam is VS and one cycle period of the sync clock pulses is TC, the spacings P3, P4 and P5 are set such that $P3 = VS \times TC \times n$ $P4 = VS \times TC \times n$ $P5 = VS \times TC \times n$ where n is an integer.

Here, problems will be described which arise when the spacing between each light receiving pattern is not an integral multiple of the distance over which a light beam travels in the scanning direction during one cycle period of the sync clock pulses from the synchronization circuit 55. In this case, the resolution is assumed to be a resolution 1 (P1).

FIGS. 24A and 24B show the condition of image forming position control in the main scanning direction when, for example, the spacing P3 between the patterns S3 and S4 is not an integral multiple of the distance over which a light beam travels in the scanning direction during one cycle period of the sync clock pulses. The spacing P3 corresponds to a distance of 5.3 dots when image formation is performed at the resolution 1 (P3=P1×5.3). In this figure, the light beams a and b generate the timing of image formation control in the main scanning direction (i.e., a horizontal sync signal) when they move across the patterns S3 and S4, respectively.

As shown in FIG. 24A, when the light beam a moves across the pattern S3, a light beam detect output S3OUT is produced from that pattern, which serves as a horizontal sync signal associated with the light beam a. In synchronism with the rising edge of the output S3OUT, the synchronization circuit 55 outputs sync clock pulses CLK3 after a circuit delay of t3. The counter 60 counts these clock pulses and issues an end-of-count signal to the main controller 51 when a predetermined count (a count of 10 in the figure) is reached. Upon receipt of this end-of-count signal, the main controller 51 provides pixel clock pulses to the corresponding laser driver to thereby start image formation.

On the other hand, when the light beam b moves across the pattern S4, a light beam detect output S4OUT is produced. In synchronism with the rising edge of this output, the synchronization circuit 55 outputs sync clock pulses CLK4 after a circuit delay of t4 (t3 and t4 are substantially equal to each other). The counter 60 counts these clock pulses and, when reaching a predetermined count (five in the figure), issues an end-of-count signal to the main controller 51. Upon receipt of the end-of-count signal, the main controller provides pixel clock pulses to the corresponding laser driver to thereby start image formation.

FIG. 24B shows scanning positions by the light beam a corresponding to the clock pulses CLK3 and scanning positions by the light beam b corresponding to the clock pulses CLK4. It should be noted here that, at the edge of the image, a phase difference is produced between the clock pulses CLK3 and CLK4. That is, the edge of the image formed by the light beam b is offset from that of the image by the light beam a in the main scanning direction (the offset amount is −VS×tb that corresponds to a distance of 0.3 dots).

That is, there is misalignment between the image forming region HA by the light beam a and the image forming region HB by the light beam b. This misalignment is noticeable at the leftmost and rightmost edges of the output image in the main scanning direction and can be recognized as the sway of a vertical line (i.e., the vertical line is not formed straight). A means for correcting the misalignment will be displacing the rightmost end of the image by the light beam b in the direction opposite to the main scanning direction. This will be achieved by counting a smaller number of the sync clock pulses CLK4 associated with the light beam b than the predetermined number. However, since the count can be varied only in units of one clock pulse (i.e., on a dot-by-dot basis), in the case of FIG. 24 the misalignment increases instead to +Vs×ta. Therefore, the misalignment between the images cannot be corrected after all and the misalignment within one dot is unavoidable.

The image forming position control in the direction of main scanning by the light beams a and b is referenced to the horizontal sync signals S3OUT and S4OUT. The time interval between these reference signals is independent of the sync clock pulses and hence that misalignment occurs.

In the present embodiment, therefore, the spacing between each light receiving pattern is set to an integral multiple of the distance over which the light beam travels during one cycle period of the sync clock pulses output from the synchronization circuit 55. This allows the misalignment to be minimized.

Hereinafter, the present embodiment will be described with reference to FIGS. 25A and 25B. In this figure, the spacing P3 between the light receiving patterns S3 and P4 is set to an integral multiple of the distance over which the light beam travels during one cycle period of the sync clock pulse output from the synchronization circuit 55 (i.e., P3=VS×TC×n). That is, the spacing P3 between the light receiving patterns S3 and S4 is D1×5, which corresponds to a distance of five dots when image formation is performed at a resolution of D1. As in FIG. 24, the light receiving patterns S3 and S4 control the timing of the image forming position control (horizontal synchronization) in the direction of main scanning by the light beams a and b, respectively.

As shown in FIG. 25A, when the light beam a traverses the pattern S3, the light beam detect output S3OUT (the horizontal sync signal for the light beam a) is output. The synchronization circuit 55 provides the sync clock pulses CLK3 after a circuit delay of t3 from the trailing (rising) edge of the light beam detect output S3OUT. The counter 60 counts these sync clock pulses and, when reaching a predetermined count (10 in the figure), outputs an end-of-count signal to the main controller 51. Upon receipt of the end-of-count signal, the main controller 51 outputs pixel clock pulses to the laser driver, thereby initiating image formation. The predetermined count is determined on the basis of a distance between the light receiving pattern S3 and a start point of the main scanning image forming region.

On the other hand, when the light beam b moves across the pattern S4, a light beam detect output S4OUT is produced. In response to the rising edge of this output, the synchronization circuit 55 outputs sync clock pulses CLK4 after a circuit delay of t4. The counter 60 counts these clock pulses and, when reaching a predetermined count (five in the figure), issues an end-of-count signal to the main controller 51. Upon receipt of the end-of-count signal, the main controller provides pixel clock pulses to the corresponding laser driver to thereby initiate image formation. The predetermined count is determined on the basis of a distance between the light receiving pattern S4 and a start point of the main scanning image forming region.

FIG. 25B shows the scanning positions of the light beam a corresponding to the clock pulses CLK3 and the scanning positions of the light beam b corresponding to the clock pulses CLK4. In this case, since the spacing P3 between the light receiving patterns S3 and S4 is set equal to a distance of five dots, no phase difference occurs between the sync clock pulses CLK3 and CLK4 and no misalignment occurs at the leftmost end of an image. That is, no misalignment occurs between the main scanning image forming region HA by the light beam a and the main scanning image forming region HB by the light beam b.

In a multiple-resolution image formation apparatus, the spacing between each light receiving pattern in the light beam detector 38 is set to an integral multiple of the least common multiple (LCM) of distances over which the light beam travels during one cycle period of multiple sync clocks output from the synchronization circuit 55. This will be described next.

Assume that the apparatus has two resolutions.
Then, the spacings P3, P4 and P5 are set such that $P3=L.C.M.(VS \times TC, VS \times TCC) \times n1$ $P4=L.C.M.(VS \times TC, VS \times TCC) \times n2$ $P5=L.C.M.(VS \times TC, VS \times TCC) \times n3$ where n1, n2 and n3 are each an integer, L.C.M. is the least common multiple of distances VS×TC and VS×TCC, TC is one cycle period of sync clock pulses for resolution 1, and TCC is one cycle period of sync clock pulses for resolution 2.

Figure 26:
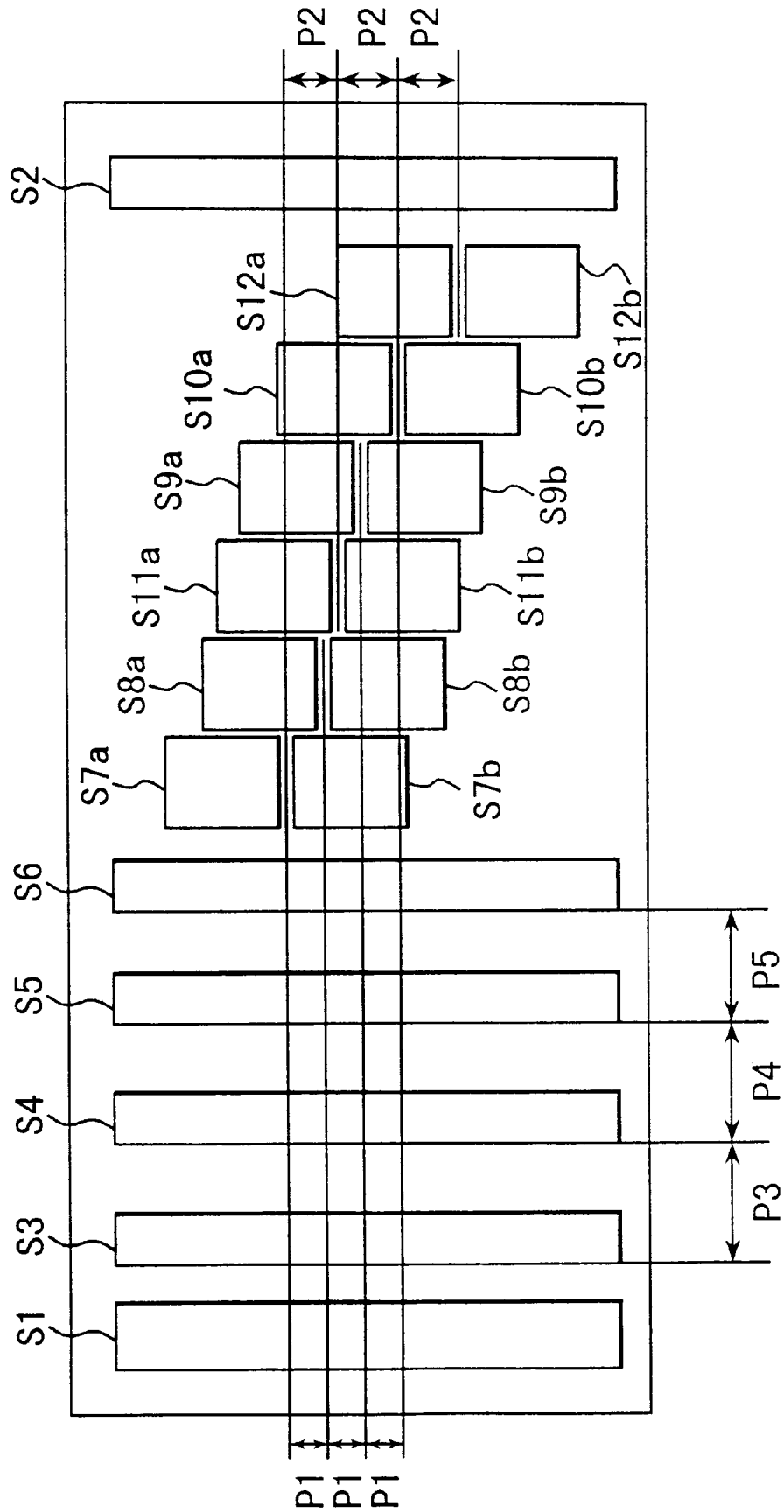
FIG. 26 is a schematic illustration of a light beam sensor adapted for two resolutions.

FIG. 26 shows a configuration of the light beam detector 38 adapted for two resolutions in the present embodiment. In this figure, like reference numerals are used to denote corresponding parts to those in FIG. 3. As shown, the light beam detector 38 is comprised of light receiving patterns S1 to S6 and S7a, S7b, S8a, . . . , S12a and S12b. The light receiving patterns S1 to S6 remain unchanged from those described in connection with FIG. 3.

The light receiving patterns S7a to S12b are adapted to detect the positions the four light beams traverse and six pairs of light receiving patterns that are arranged in the up-and-down direction (i.e., the sub-scanning direction) S7a and S7b, S8a and S8b, S11a and S11b, S9a and S9b, S10a and S10b, and S12a and S12b are arranged between the light receiving patterns S6 and S2 as shown.

In the present embodiment that is adapted for image information at resolutions 1 and 2, four pairs of light receiving patterns S7a and S7b, S8a and S8b, S9a and S9b, and S10a and S10b are adapted for resolution 1. In the four pairs, each pair is offset with respect to the adjacent one by P1 in the sub-scanning direction as shown.

The position the light beam a from the laser oscillator 31a traverses can be detected by making a comparison between the outputs of the respective light receiving patterns S7a and S7b, in a pair. Likewise, the position of the light beam b from the laser oscillator 34b can be detected by making a comparison between the outputs of the respective light receiving patterns S8a and S8b. The position of the light beam c from the laser oscillator 31c can be detected by making a comparison between the outputs of the respective patterns S9a and S9b and the position of the light beam d from the laser oscillator 31d can be detected by making a comparison between the outputs of the respective light receiving patterns S10a and S10b.

That is, if the outputs of each pair of light receiving patterns are at balance, then each light beam will move on the center line of the gap between the corresponding paired light receiving patterns. In this case, therefore, it will be seen that the spacing between each light beam path is kept as desired.

The light receiving patterns for resolution 2 are four pairs of patterns S7a and S7b, S11a and S11b, S10a and S10b, and S12a and S12b. In the four pairs, each pair is offset with respect to the adjacent one by P2 in the sub-scanning direction as shown. The principles of detecting the light beam paths and the spacing between each light beam path are the same as those for resolution 1.

The spacing between the adjacent light receiving patterns is set to an integral multiple of the resolution. In the present embodiment adapted for image formation at resolution 1 (P1) and resolution 2 (P2) (P2=P1×3/2), the spacing between the adjacent light receiving patterns is set to an integral multiple of the least common multiple of the resolutions, i.e., L.C.M(P1, P2)×2. This corresponds to a distance of six dots for image formation at resolution 1 or a distance of four dots for image formation at resolution 2.

Hereinafter, description will be given of problems that arise when the spacing between the adjacent light receiving patterns each of which detects the time at which the corresponding light beam traverses it is not an integral multiple of the distance over which the light beam travels during one cycle period of the sync clock pulses output from the synchronization circuit 55. It is assumed here that, as shown in FIG. 26, the image forming apparatus has two resolutions: resolution 1 and resolution 2.

Figure 27A:
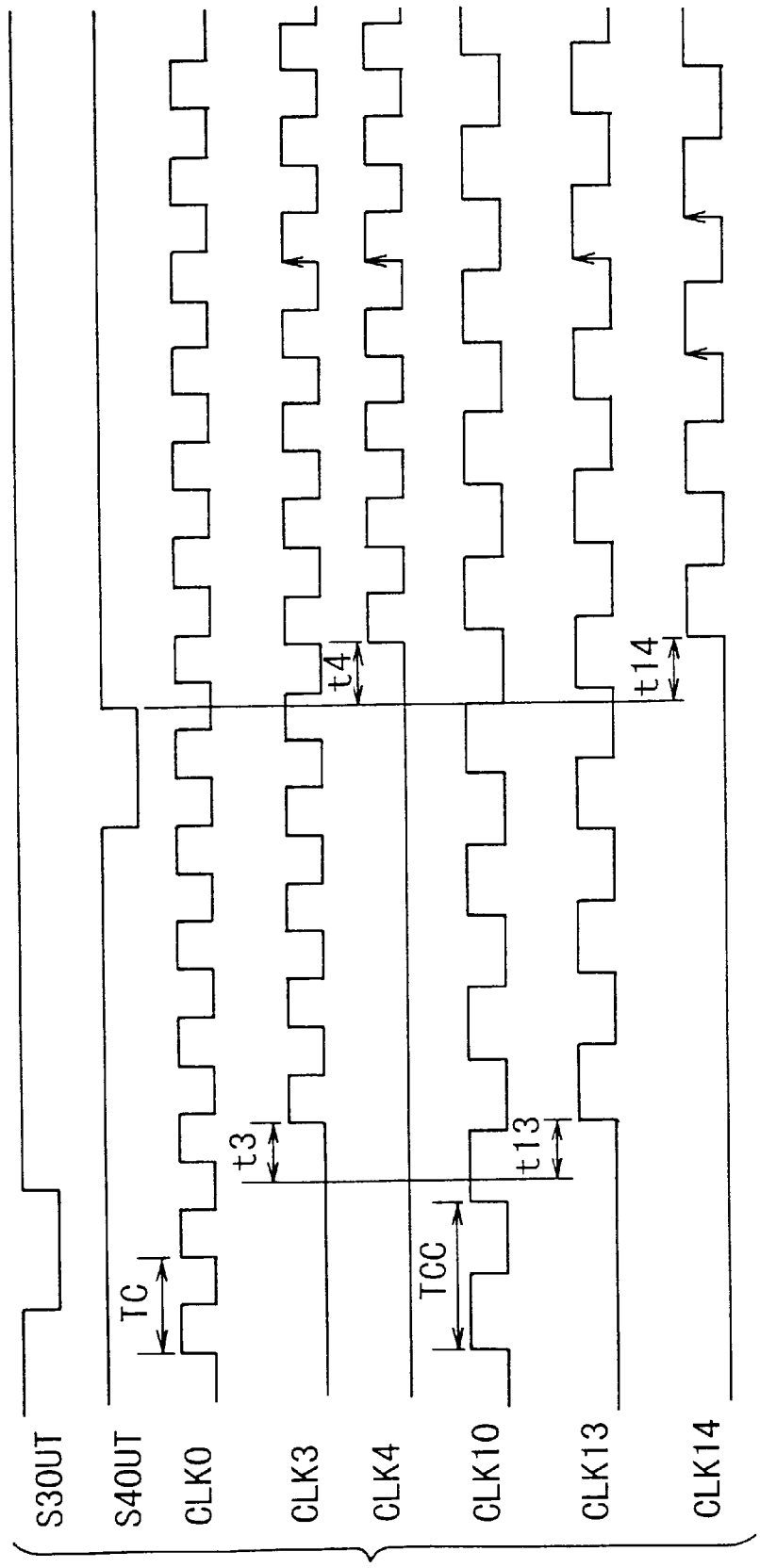
FIGS. 27A and 27B are timing charts for use in explanation of the image forming position control in the main scanning direction when the spacing between light receiving patterns for detecting times that light beams traverse them is not an integral multiple of the least common multiple of the distances over which the light beams which have two resolutions travel in the scanning direction during one cycle period of sync clock pulses output from the synchronization circuit.
Figure 27B:
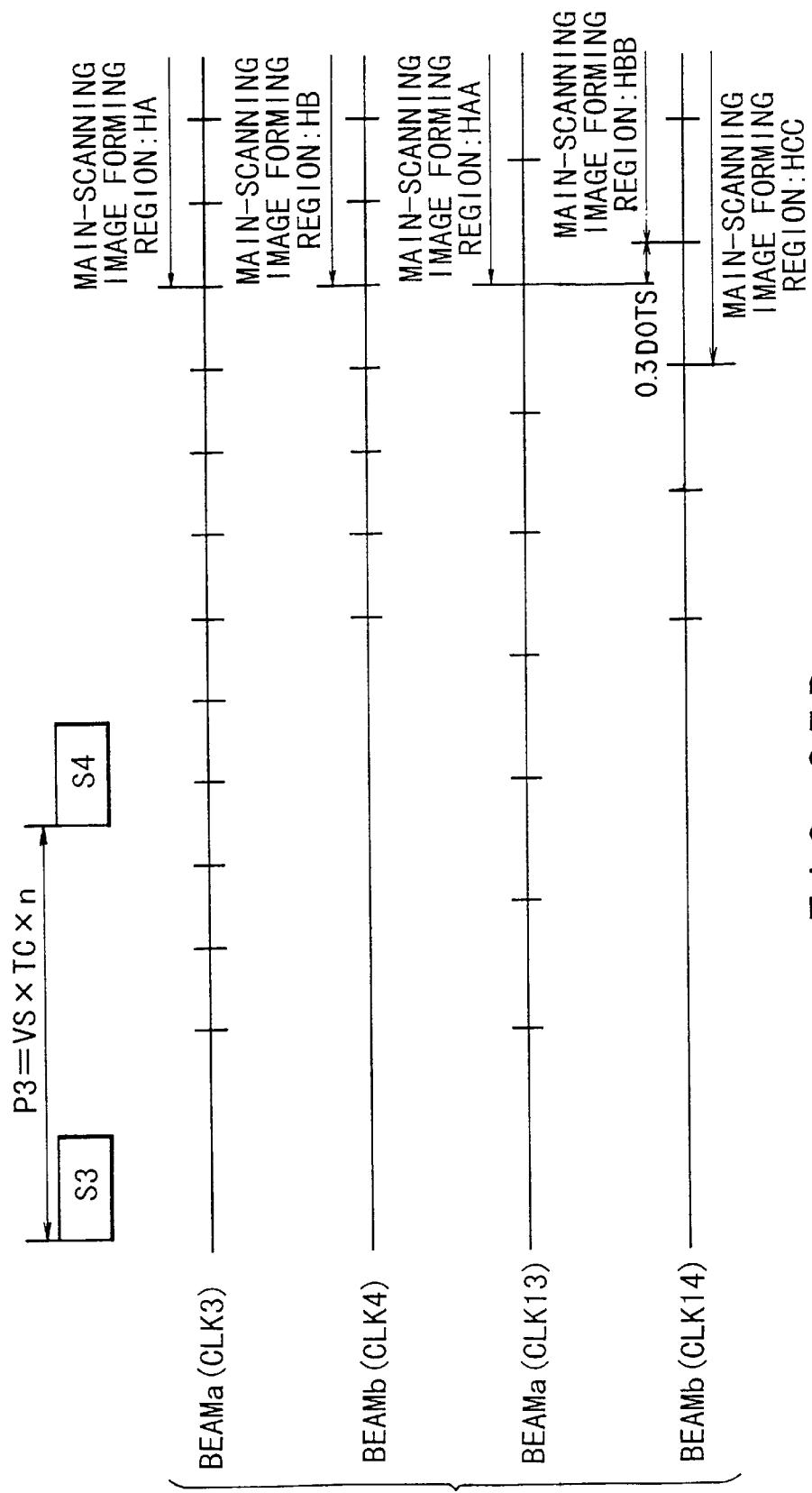

FIGS. 27A and 27B show the image forming position control in the main scanning direction when the spacing P3 between the light receiving patterns S3 and S4 is not an integral multiple of the least common multiple of distances over which the light beam travels during one cycle period of multiple clock pulses output from the synchronization circuit 55. The spacing P3 between the patterns S3 and S4 is selected to be D1×5, which corresponds to a distance of five dots in image formation at resolution 1 or a distance of about 3.3 dots in image formation at resolution 2.

In FIGS. 27A and 27B, the light beam a generates at the light receiving pattern S3 the timing of image forming position control in the main scanning direction (i.e., a horizontal sync signal). Likewise, the light beam b generates at the light receiving pattern S4 the timing of image forming position control in the main scanning direction. The periods of the reference clock pulses (i.e., clock pulses to which the sync clock pulses are referenced) corresponding to resolution 1 and resolution 2 are denoted by TC and TCC, respectively.

The image forming position control in the main scanning direction at resolution 1 has been described previously and its description is therefore omitted here.

The image forming control in the main scanning direction at resolution 2 will be described hereinafter.

As shown in FIG. 27A, when the light beam a moves across the pattern S3, a light beam detect output S3OUT is produced from that pattern. In response to the rising edge of the output S3OUT, the synchronization circuit 55 outputs sync clock pulses CLK13 after a circuit-based delay of t13 from that edge. The counter 60 counts these clock pulses CLK 13 and issues an end-of-count signal to the main controller 51 when a predetermined count (seven in the figure) is reached. Upon receipt of this end-of-count signal, the main controller 51 provides pixel clock pulses to the corresponding laser driver to thereby start image formation. On the other hand, when the light beam b moves across the pattern S4, a light beam detect output S4OUT is produced. In response to the rising edge of this output, the synchronization circuit 55 outputs sync clock pulses CLK14 after a circuit-based delay of t14 from that edge (t13, t14, t3 and t4 are substantially equal to each other). The counter 60 counts these clock pulses and, when reaching a predetermined count (four in the figure), issues an end-of-count signal to the main controller 51. Upon receipt of the end-of-count signal, the main controller provides pixel clock pulses to the corresponding laser driver to thereby start image formation.

FIG. 27B shows scanning positions by the light beam a corresponding to the clock pulses CLK13 and scanning positions by the light beam b corresponding to the clock pulses CLK14. In the case of resolution 1, no misalignment naturally occurs between the starting positions of image formation by the laser beams a and b. In the case of resolution 2, however, a phase difference is produced between the clock pulses CLK13 and CLK14. It will therefore be understood that the edge of the image formed by the light beam b is offset from that of the image by the light beam a in the main scanning direction (the offset amount is −VS×tbb which corresponds to a distance of about 0.3 dots).

That is, there is misalignment between the image forming region HAA by the light beam a and the image forming region HBB by the light beam b. This misalignment is recognized as the sway of a vertical line. A means for correcting the misalignment will be displacing the image forming region by the light beam b in the direction opposite to the main scanning direction by counting a smaller number of sync clock pulses CLK14 associated with the light beam b (three in the figure) than the predetermined one. However, since the count can be varied only in units of one clock pulse (i.e., on a dot-by-dot basis), the misalignment increases instead to +Vs×taa in the case of FIG. 27. Therefore, the misalignment between the images cannot be corrected after all and the misalignment within one dot is unavoidable.

The image forming position control in the direction of main scanning by the light beams a and b is referenced to the horizontal sync signals S3OUT and S4OUT. That misalignment occurs because the time interval between these reference signals is independent of the sync clock pulses for resolution 2.

In the present embodiment, therefore, the spacing between each light receiving pattern is set to an integral multiple of the least common multiple of distances over which the light beam travels during one cycle period of the multiple sync clock pulses output from the synchronization circuit 55. This allows the misalignment to be minimized.

Figure 28A:
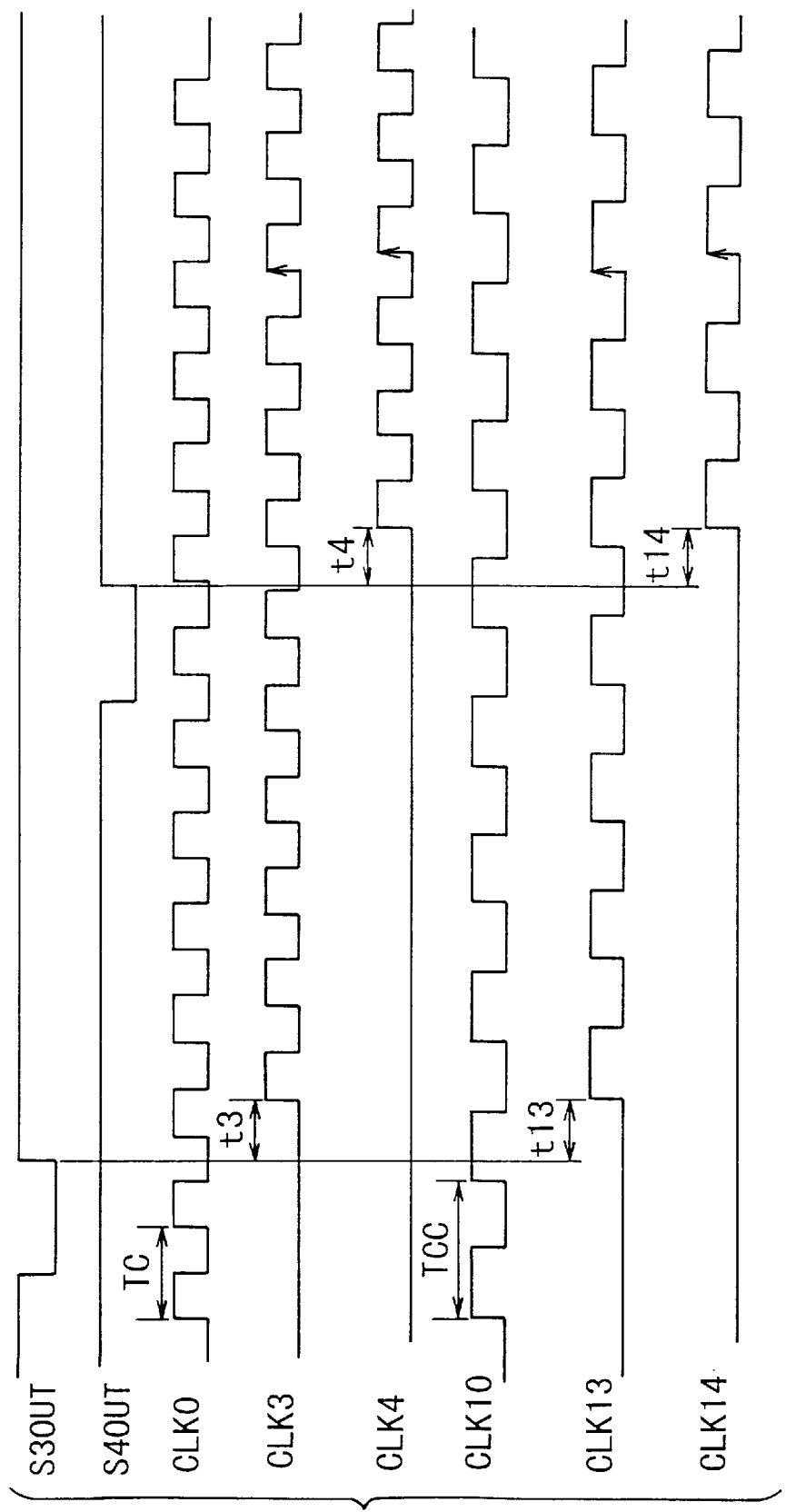
FIGS. 28A and 28B are timing charts for use in explanation of the image forming position control in the main scanning direction when the spacing between light receiving patterns for detecting times that light beam traverse them is an integral multiple of the least common multiple of the distances over which the light beams which have two resolutions travel in the scanning direction during one cycle period of multiple sync clock pulses output from the synchronization circuit.
Figure 28B:
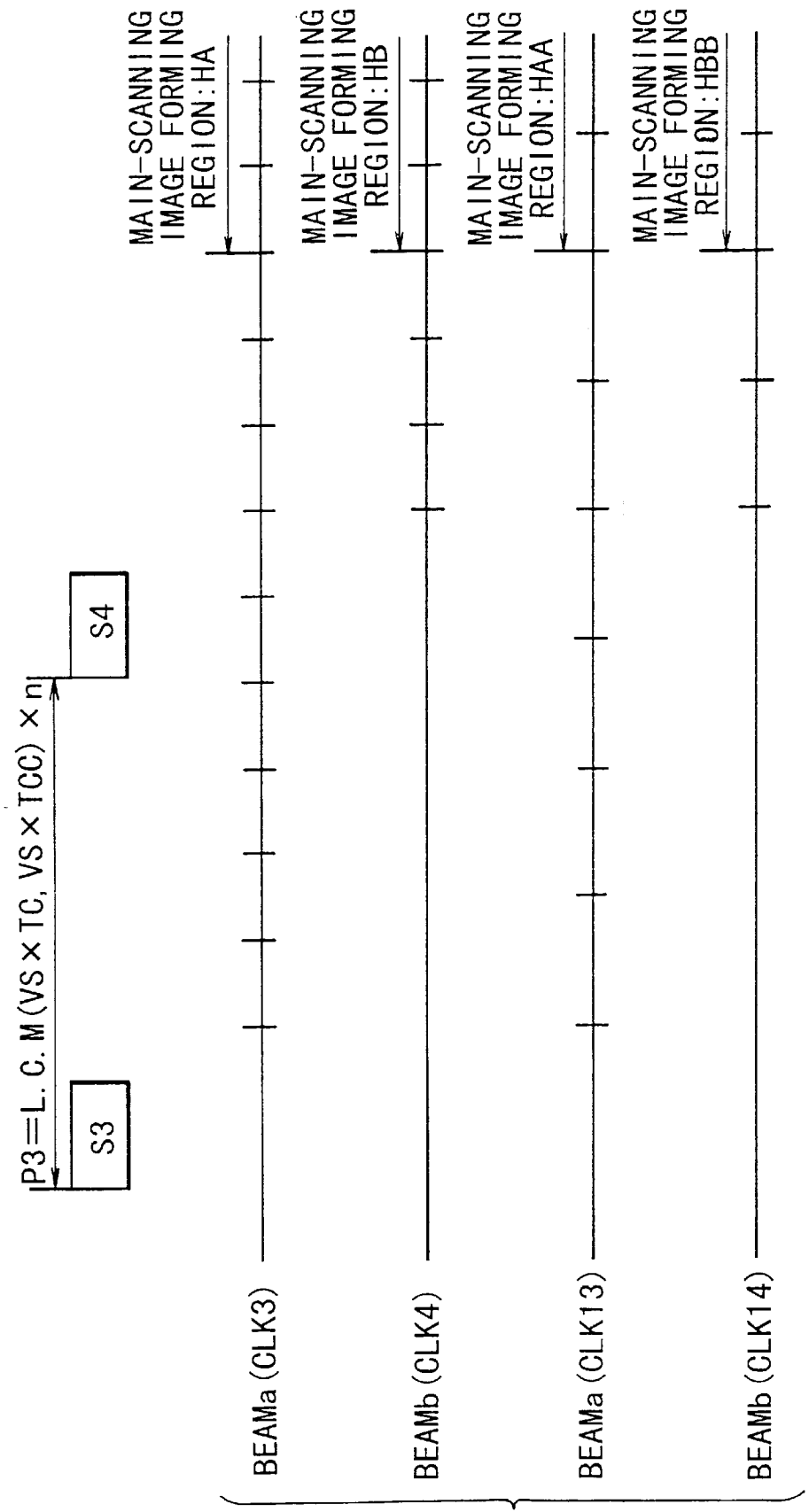

Reference will be made next to FIGS. 28A and 28B to describe the present embodiment. In this embodiment, the spacing P3 between the light receiving patterns S3 and S4 is set to an integral multiple of the least common multiple of the distance (P1) over which the light beam travels during one cycle period (TC) of sync clock pulses for resolution 1 and the distance (P2) over which the light beam travels during one cycle period (TCC) of sync clock pulses for resolution 2 (i.e., P3=L.C.M.(VS×TC=P1, VS×TCC=P2)×n1). That is, P3 corresponds to a distance of six dots in image formation at resolution 1 or a distance of four dots in image formation at resolution 2. As in FIG. 27, in FIG. 28, the light beams a and b respectively generate at the light receiving patterns S3 and S4 the timing of image forming position control in the main scanning direction.

First, the case of resolution 1 will be described.

As shown in FIG. 28A, when the light beam a moves across the pattern S3, a light beam detect output S3OUT is produced from that pattern. In response to the rising edge of the output S3OUT, the synchronization circuit 55 outputs sync clock pulses CLK3 after a circuit-based delay of t3 from that edge. The counter 60 counts these clock pulses CLK 13 and issues an end-of-count signal to the main controller 51 when a predetermined count (ten in the figure) is reached. Upon receipt of this end-of-count signal, the main controller 51 provides pixel clock pulses to the corresponding laser driver to thereby start image formation.

On the other hand, when the light beam b moves across the pattern S4, a light beam detect output S4OUT is produced. In response to the rising edge of this output, the synchronization circuit 55 outputs sync clock pulses CLK4 after a circuit-based delay of t4 from that edge. The counter 60 counts these clock pulses and, when reaching a predetermined count (four in the figure), issues an end-of-count signal to the main controller 51. Upon receipt of the end-of-count signal, the main controller provides pixel clock pulses to the corresponding laser driver to thereby start image formation.

FIG. 28B shows the scanning positions by the light beam a corresponding to the clock pulses CLK3 and CLK13 and the scanning positions by the light beam b corresponding to the clock pulses CLK4 and CLK14. In this case, since the spacing P3 between the patterns S3 and S4 corresponds to a distance of six dots in image formation at resolution 1, no phase difference is produced between the sync clock pulses CLK3 and CLK4 with the result that no misalignment occurs between the image forming regions HA and HB by the laser beams a and b.

The case of resolution 2 will be described next.

When the light beam a moves across the pattern S3, a light beam detect output S3OUT (a horizontal sync signal for image formation by the light beam a) is produced from that pattern. In response to the rising edge of the output S3OUT, the synchronization circuit 55 outputs sync clock pulses CLK13 after a circuit-based delay of t13 from that edge. The counter 60 counts these clock pulses CLK 3 and issues an end-of-count signal to the main controller 51 when a predetermined count (seven in the figure) is reached. Upon receipt of this end-of-count signal, the main controller 51 provides pixel clock pulses to the corresponding laser driver to thereby start image formation.

On the other hand, when the light beam b moves across the pattern S4, a light beam detect output S4OUT is produced. In response to the rising edge of this output, the synchronization circuit 55 outputs sync clock pulses CLK14 after a circuit-based delay of t14 from that edge. The counter 60 counts these clock pulses and, when reaching a predetermined count (three in the figure), issues an end-of-count signal to the main controller 51. Upon receipt of the end-of-count signal, the main controller provides pixel clock pulses to the corresponding laser driver to thereby start image formation.

In this case, as shown in FIG. 28B, since the spacing P3 between the patterns S3 and S4 corresponds to a distance of four dots in image formation at resolution 2, no phase difference is produced between the sync clock pulses CLK13 and CLK14 with the result that no misalignment occurs between the image forming regions HAA and HBB for the laser beams a and b.

In this way, according to the present embodiment, the image forming apparatus with multiple resolutions can form images of high quality without producing any misalignment between the image forming regions in the main scanning direction.

Next, light beam position control in the sub-scanning direction will be described.

Figure 29:
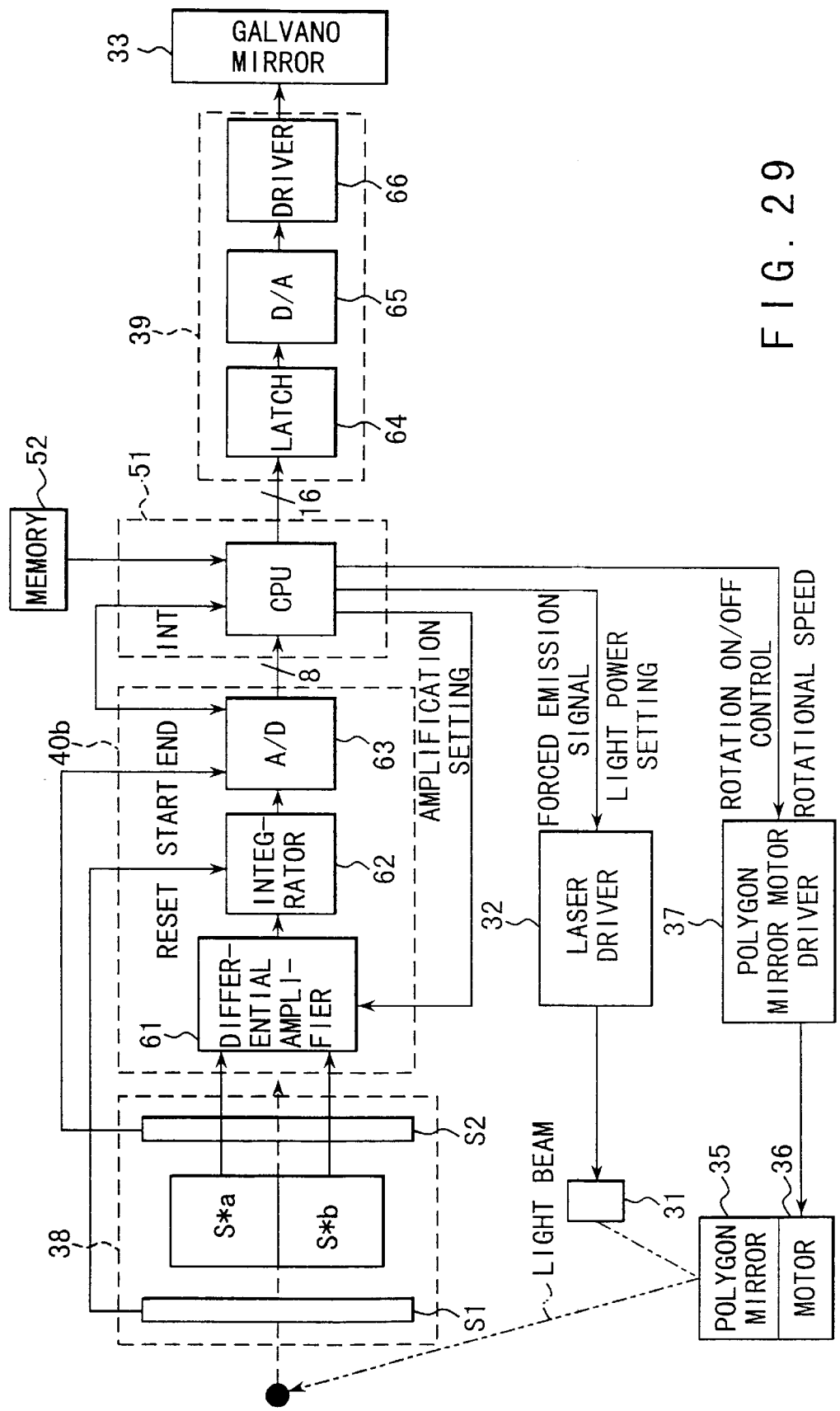
FIG. 29 is a block diagram for use in explanation of the light beam path position control.

FIG. 29 is a circuit block diagram for use in explanation of the light beam position control in the sub-scanning direction. In this figure, the portions related to the light beam position control in the sub-scanning direction are shown extracted from FIG. 4. In this example, the light beam detector 38 shown in FIG. 26 is used. Of course, the light beam detector shown in FIG. 26 can be used. In FIG. 29, the laser oscillator 31, the laser driver 32 and the light receiving pattern of the light beam detector 38 are each shown as consisting of a single one for the purpose of simplifying the description.

As has been explained above, passing positions of the light beams are obtained by comparing outputs from paired light receiving patterns in a light beam detector 38. In FIG. 29, paired light receiving patterns for detecting passing positions of light beams are denoted as S*a and S*b. Outputs from these two light receiving patterns S*a and S*b are inputted into a differential amplifier 61 provided in the light beam detector output processing circuit 40, and the difference between the two outputs is amplified. An output from the differential amplifier 61 is integrated by an integrator 62 and is sent to an A/D converter 63. The A/D converter 63 converts an output signal from the integrator 62 into a digital signal of 00H to FFH, for example.

When a light beam subjected to scanning by a rotating polygon mirror 35 enters into a light receiving pattern SI of the light beam detector 38, the light receiving pattern SI outputs a reset signal (RESET) to the integrator 62. The integrator 62 clears preceding integration information in response to the reset signal and newly starts integration operation.

The integrator 62 is inputted with an output from the differential amplifier 61, and the integrator 62 integrates the output of the differential amplifier 61 inputted when a light beam passes through the light receiving patterns S*a and S*b. Here, the integrator 62 functions to take in and integrate all the outputs of the light receiving patterns obtained while a light beam is passing through the light beam detector 38, thereby to obtain a stable output having an excellent S/N.

The A/D converter 63 is inputted with an output of the light receiving pattern S2. As for a signal outputted from the integrator 62, A/D conversion is started at a timing at which a light beam passes through the light receiving pattern S2. When the A/D conversion ends, an end signal (END) is supplied to the main control section (CPU) 51 from the A/D converter 63. The main control section 51 treats the end signal as an interruption signal, and recognizes that new light beam passing position information is inputted, and performs corresponding processing.

On the basis of the light beam passing position information thus obtained, the main control section 51 calculates the control amount for the galvano mirror 33. The calculation result is stored into the memory 52 if necessary. The main control section 51 sends the calculation result to the galvano mirror drive circuit 39.

The galvano mirror drive circuit 39 is provided with a latch 64 for latching the data, as shown in FIG. 29. Once the main control section 51 writes data, this section 51 maintains the value until the data is next updated. The data latched in the latch 64 is converted into an analogue signal (or voltage) by the D/A converter 65, and is inputted into the driver circuit 66 for driving the galvano mirror 33. The driver circuit 66 drives and controls the galvano mirror 33 in accordance with the analogue signal (voltage) inputted from the D/A converter 65.

In this manner, the passing position of a light beam is detected by the light beam detector 38. On the basis of the information of the passing position, the main control section 51 calculates the control amount for the galvano mirror 33. On the basis of the calculation result, the galvano mirror 33 is driven, and thus, control of the passing position of each light beam is enabled.

Note that the passing positions of light beams slightly differ between surfaces of the polygon mirror 35 due to beveling of the polygon mirror 35 in many cases. In order to eliminate influences therefrom, it is desirable that light beam passing information should be obtained and calculated for a number of times equal to the number of surfaces of the polygon mirror of the optical system or equal to a multiple of the number of the surfaces by an integer, and that the galvano mirrors should be controlled on the basis of the average of the light beam passing information.

Figure 30:
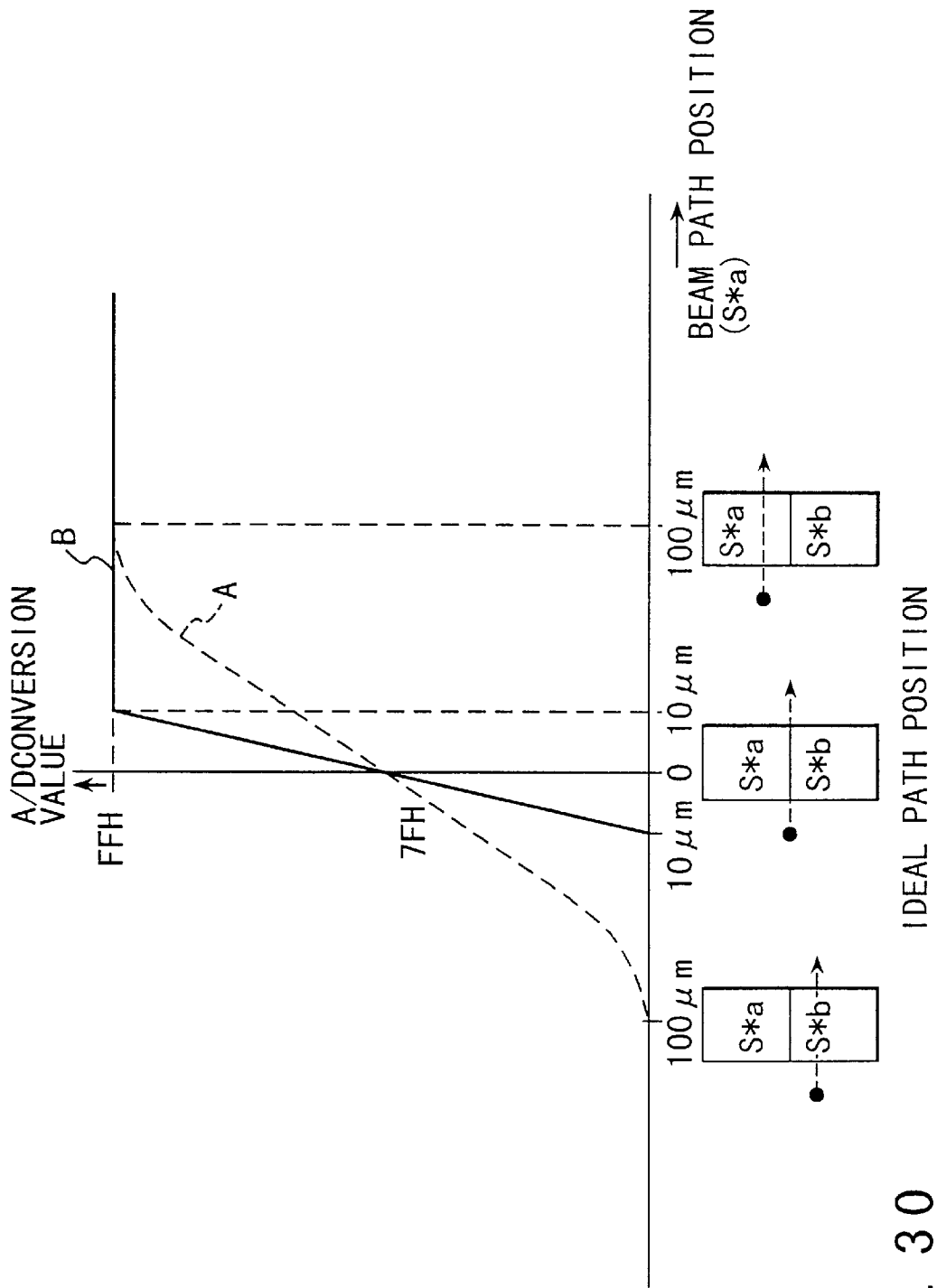
FIG. 30 is a graph showing a relation between the light beam path position and the A/D converter output.
Figure 33:
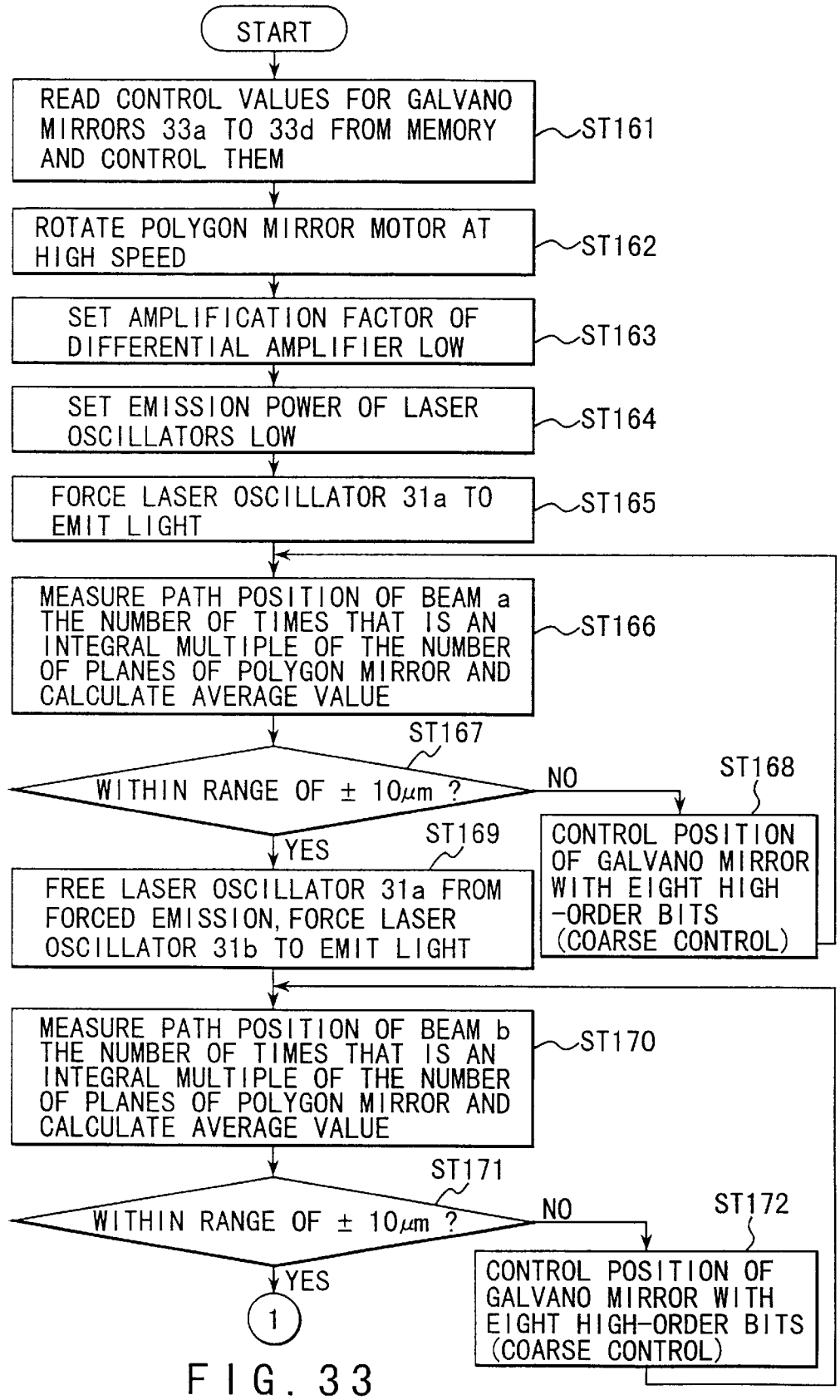
FIGS. 33, 34, 35 and 36 form a flowchart for the light beam path position control routine.
Figure 34:
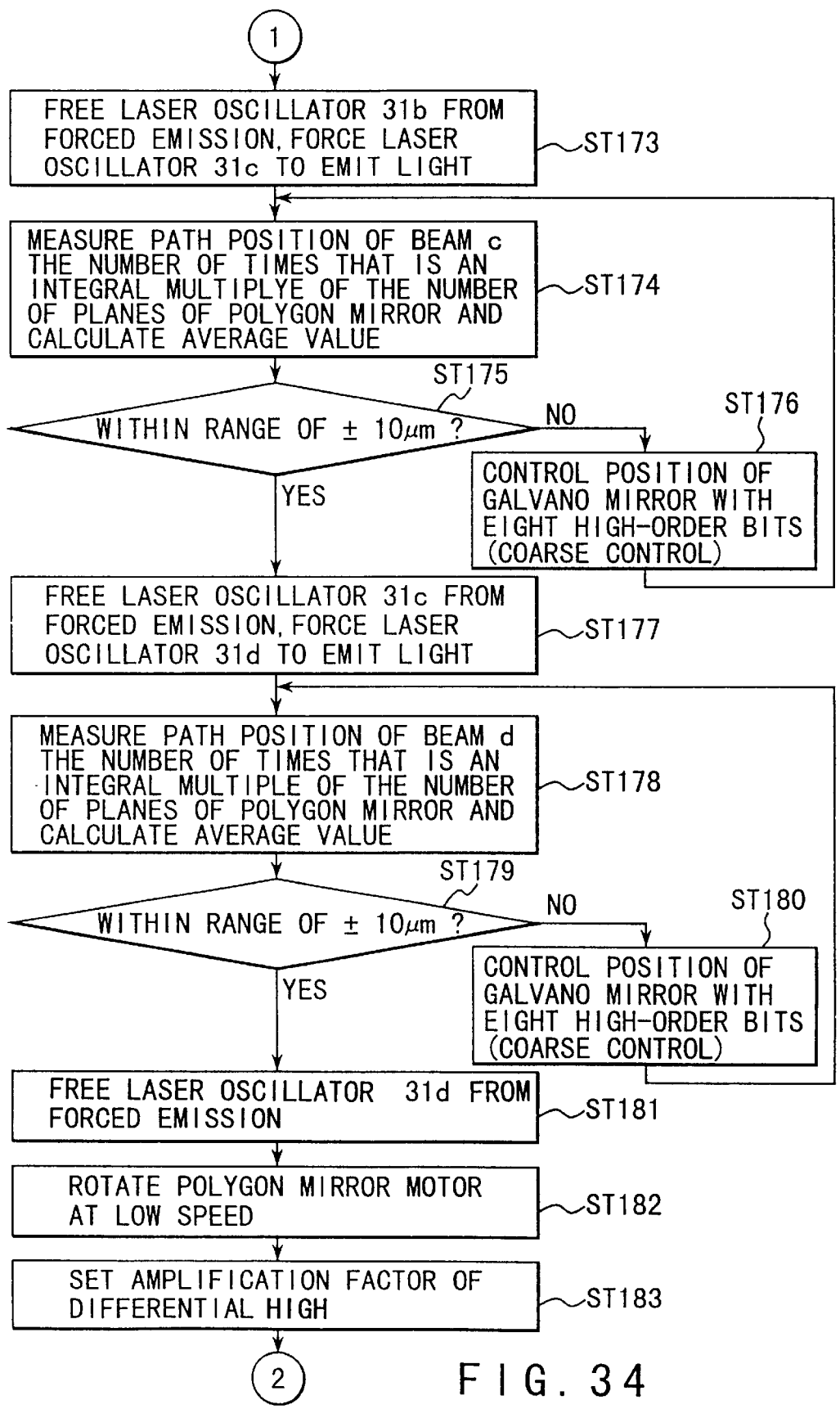
Figure 35:
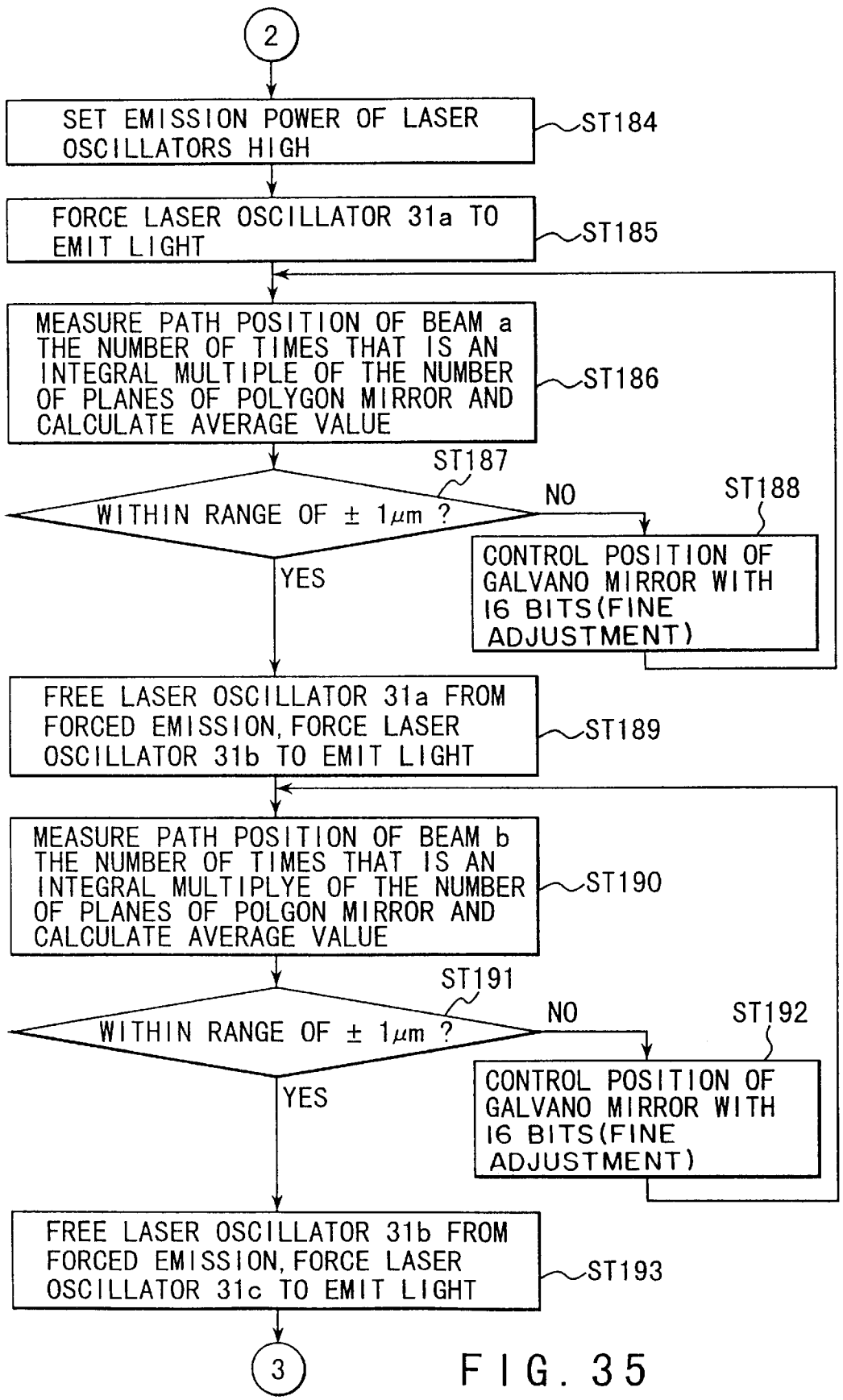
Figure 36:
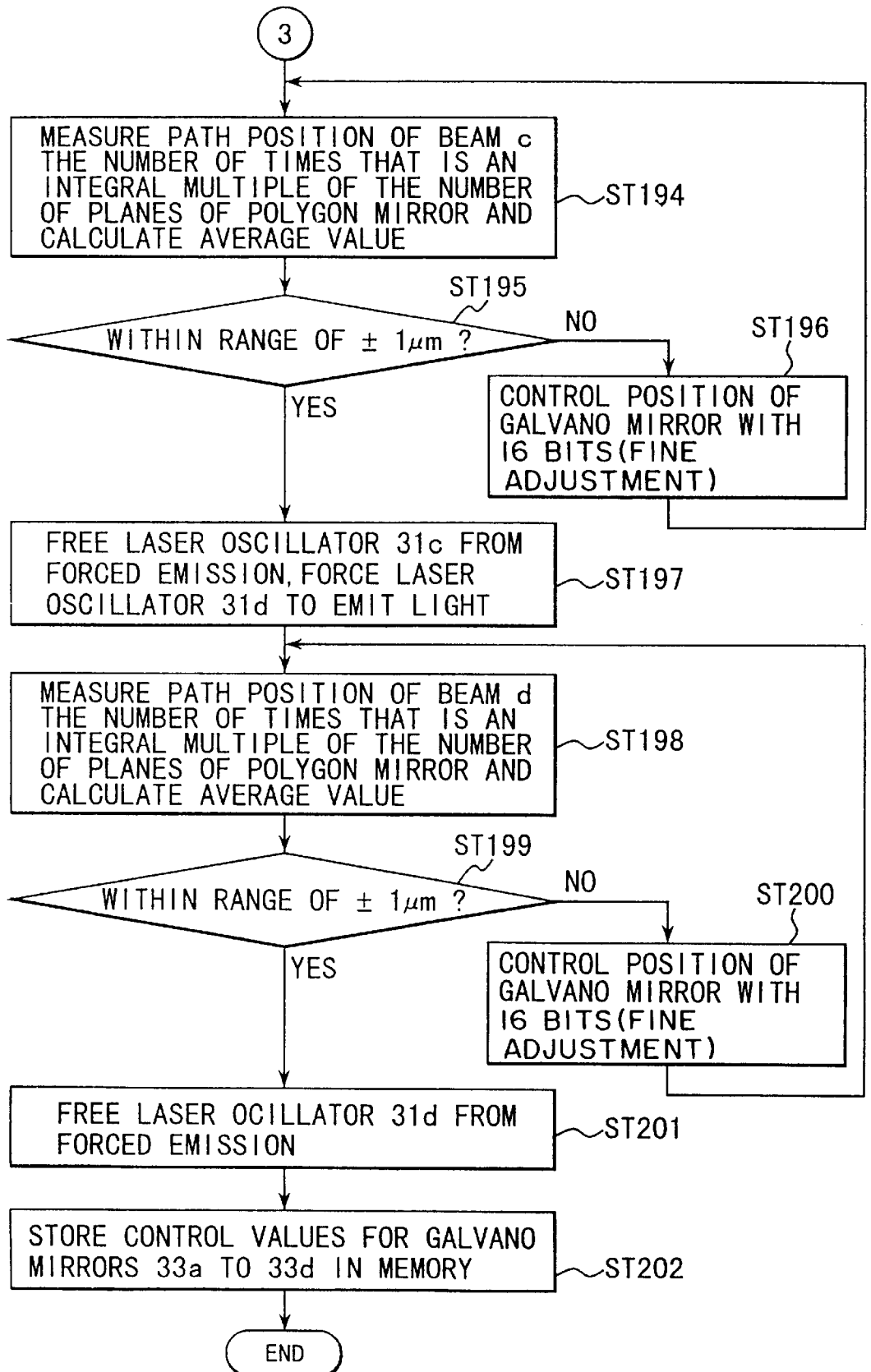

FIG. 30 is a graph showing a relationship between a passing position of a light beam and an output of the A/D converter 63. The lateral axis of the graph represents the passing position of the light beam and exemplarily shows the passing position of the light beam with respect to light receiving patterns S*a and S*b. Specifically, the center of the lateral axis means that the passing position of a light beam exists in the center between the light receiving patterns S*a and S*b as described above. The left-hand side of the lateral axis means that the passing position of a light beam exists in the light receiving pattern S*b side. On the contrary, the right-hand side of the lateral axis means that the passing position of a light beam exists in the light receiving pattern S*a side.

A curve A indicated by a broken line means the output value of the A/D converter 63 with respect to a passing position of a light beam where the power of a light beam, the rotation speed of the polygon mirror 35, and the amplification factor of the differential amplifier 61 are set to certain values. Under this condition, the passing position of a light beam changes within a range of about 100 μm in each of S*a and S*b sides from an ideal position (i.e., the center of the paired light receiving patterns). The change teaches that the curve is substantially linear when the passing position is in the area near the ideal position, but the linearity of the curve becomes lower as the passing position of the light beam is deviated more far away from the center.

This is because the light beam has an elliptic or substantially circular cross section so that the change of the area where the light beam crosses the light receiving patters decreases as the light beam is deviated more far away from the center. Another factor is that the energy distribution of a light beam is normally a Gaussian distribution in which the energy is largest at the center of the light beam and the energy level decreases toward the periphery of the light beam. Therefore, the change ratio of the energy becomes smaller as the distance from the center of the light beam becomes larger.

In contrast, a curve B indicates a case where the power of a light beam is raised, the rotation speed of the polygon mirror 35 is reduced, and the amplification factor of the differential amplifier 61 is raised in comparison with the condition described above. This curve B has a sharper inclination than the curve A, and is substantially linear within a range of ±10 μm from the ideal passing position. This means that the output of the light beam detector 38 is increased and the output of the differential amplifier 61 greatly oscillates with respect to an equal dislocation of the light beam from the ideal position, for example, when the power of the light beam is raised.

When the rotation speed of the polygon mirror 35 is reduced, the time period for which the light receiving patterns are exposed with a light beam is increased, so that the output of the light beam detector 38 is raised, resulting in the same phenomenon as described above. Also, in case where the amplification factor of the differential amplifier 61 is raised, the output of the light beam detector 38 itself does not change but the same phenomenon as described above appears as a result.

Such characteristics as described above can be adopted to detect a passing position of a light beam, in the following manner. Specifically, the characteristic A indicated by a broken line in FIG. 30 is selected when performing coarse control, while the characteristic B indicated by a continuous line in FIG. 30 is selected when performing fine control.

For example, in case where the passing position of a light beam is to be controlled in a state in which the passing position of the light beam cannot be estimated at all, like in an initial operation where the power of the present copying machine is turned on, the passing position of a light beam can be roughly controlled efficiently by setting the power of light beams, the rotation speed of the polygon mirror 35, and the amplification factor of the differential amplifier 61 in compliance with the condition which provides the characteristic A of the broken line of the graph in FIG. 30.

Under this condition, the A/D conversion value changes when the passing position of a light beam is within a range of ±100 μm. Therefore, the passing position of the light beam can easily be set within a range of ±100 μm from the ideal position if only the main control section varies the passing position of the light beam in units each consisting of 100 μm or so. If the movable range of a galvano mirror 33 is, for example, equivalent to a movement range of about 2 mm of a light beam on an image surface, the passing position of the light beam can fall in the aimed range by making a passing position correction for twenty times at worst.

The passing position of the light beam can thus fall within the range of ±100 μm, and then, the passing position of the light beam can be approximately estimated from the A/D conversion value at this time. If the galvano mirror 33 is controlled on the basis of this value, the passing position of the light beam can be rapidly controlled although the control attains relatively low accuracy. Here, the word "approximately" is used since the characteristic A of the broken line in FIG. 30 is not linear but is loosely curved.

Meanwhile, the passing position of a light beam can be controlled finely the characteristic B indicated by a continuous line of the graph in FIG. 30. In the example of the continuous line in FIG. 7, the passing position of the light beam changes from 00 H to FFH within a range of ±10 μm from the ideal position, and this change is substantially linear. Therefore, in theory, the main control section 51 is capable of detecting the passing position of a light beam with an accuracy of about 0.08 μm.

Consequently, the passing positions of light beams can be controlled very accurately if galvano mirrors 33 are controlled with a detection accuracy raised by correcting one or all of the power of light beams, the rotation speed of the polygon mirror 35, and the amplification factor of the differential amplifier 61 after the control of the position of a light beam is carried out as described above.

FIG. 31 shows an arrangement of the sub-scanning control circuit 40b in the light beam detector output processing circuit 40. A current flowing through each of the light receiving patterns (photodiodes) S*a and S*b is converted by its associated resistors RP1 and RL1 (RP2 and RL2) to a voltage, which, in turn, is amplified by a corresponding one of voltage amplifiers A3 and A4. The outputs of the voltage followers A3 and A4 are applied to the differential amplifier 61 which is comprised of resistors R1 to R4 and an operational amplifier A5.

The output of the differential amplifier 61 is sent to the integrator 62 which is comprised of resistors R5 to R7, an integrating capacitor C, analog switches SW1 and SW2 for resetting the integrator, and an operational amplifier A6. The output of the integrator 62 is amplified by a voltage follower A7 and then output as an integrator output VO.

Next, an image forming routine according to the present embodiment will be described with reference to a flowchart shown in FIG. 32.

When an image formation start command is input, a sub-scanning-direction light beam position control routine is carried out first to place each of the light beams a to d in position. That is, the spacing between paths of the light beams is kept at resolution P1. Each of the light beams is kept positioned on its predetermined path until image formation is terminated. Upon termination of the light beam position control in the sub-scanning direction, the above-described main-scanning-direction image forming position control routine is carried out and at the same time the image formation is started (the image forming position control in the main scanning direction is carried out throughout image formation) (steps ST159 and ST160).

Next, the sub-scanning-direction light beam position control routine in FIG. 32 will be described with reference to a flowchart formed by FIGS. 33 through 36.

The main control section 51 reads the latest galvano mirror drive values from the memory 52, and makes galvano mirrors 33a, 33b, 33c, and 33d be driven on the basis of the values (step ST161). In the next, the control section 51 makes the polygon motor 36 rotate at a high speed (step ST162), sets the amplification factor of the differential amplifier 61 to be low (step ST163), and sets the emission powers of the laser oscillators 31a, 31b, 31c, and 31d to be low (step ST164), so that the characteristic A (or relationships between the passing positions of light beams and the A/D conversion values) is obtained thereby to approximately grasp the positions of light beams. In this state, the rotation speed of the polygon motor 36 and the powers of the laser oscillators 31a to 34d are equal to the conditions where an image is formed with a resolution of 600 DPI.

By selecting the setting described above, the A/D conversion value changes within a range of ±100 μm from an aimed light beam passing position as has been explained before, and hence, light beam passing positions can be approximately detected.

In this state, the laser oscillator 31a is forcedly operated to emit a light beam a (step ST165), at first, and the passing position of the light beam a is measured for a number of times equal to a multiple of the number of surfaces of the polygon mirror 35 by an integer. The average of measured passing positions is taken as the passing position of the light beam a (step ST166).

In the case of the present embodiment, since the polygon mirror 35 has eight surfaces as shown in FIG. 2, passing position information is obtained sequentially for 16 times and is averaged as the passing position of the light beam a. Thus, data is obtained for a number of times equal to a multiple of the number of surfaces of the polygon mirror 35 and is then averaged, for the reason that deviation components of the surfaces and the axis which appear in cycle of one rotation of the polygon mirror 35 can be eliminated and an averaged passing position of a light beam can be obtained.

On the basis of the light beam passing position information thus obtained, whether or not the averaged passing position of the light beam a is within an aimed range of ±10 μm is determined (step ST167). If the averaged passing position of the light beam a is not within the aimed range of ±10 μm, the position of the galvano mirror 33a is controlled (step ST168) so as to fall in the range, with use of higher 8 bits of a 16-bit control signal for the galvano mirror drive circuit 39a (by coarse adjustment), and the passing position of the light beam a is measured again (step ST166).

If the averaged passing position is determined as being within the range of ±10 μm from the aimed passing position in the step ST167, forced emission of the laser oscillator 31a is released, and then, the laser oscillator 31b is forcedly operated to emit a light beam.

Subsequently, like in the case of the light beam a, an averaged passing position of the light beam b is measured and calculated, and the galvano mirror 33b is controlled in accordance with the calculation result, so that the passing position of the light beam b falls in the range of ±10 μm from an aimed passing position (step ST170 to ST172).

Further, passing positions of light beams c and d are controlled in the same manner as described above, so that each of the passing positions falls in a range of ±10 μm from an aimed passing position (step ST173 to ST181).

In this manner, each of passing positions of four light beams a, b, c, and d is controlled (coarse adjustment) so as to fall in a range of ±10 μm from its own target position.

In the next, the main control section raises the detection accuracy for passing positions of the light beams, and carries out passing position control more accurately.

Specifically, the rotation speed of the polygon motor 36 is reduced to be lower than that adopted for forming an image (step ST182), and the amplification factor of the differential amplifier 61 is set to be high (step ST183). Further, the emission powers of the laser oscillators 31a, 31b, 31c, and 34d are set to be higher than those adopted for forming an image (step ST184). In this manner, the detection accuracy for passing positions of the light beams are arranged so as to comply with the characteristic B indicated by a continuous line in FIG. 30.

Now, when light beam passing position is detected, it is enough that at least one of the processes of step ST182, step ST183, step ST184—for raising the detection accuracy in appearance—is performed. If one of the three processes or two combination of them are performed, an effect of raising detection accuracy is gained by a certain degree.

In this state, the laser oscillator 31a is forcedly operated to emit a light beam a (step ST185), and the passing position of the light beam a is measured for a number of times equal to a multiple of the number of surfaces of the polygon mirror 35 by an integer. An averaged value of the measured passing positions is calculated and the passing position of the light beam a is obtained (step ST185).

Here, the light beam passing position is measured with a higher accuracy than in the above-described measuring (for the coarse adjustment), and therefore, it is ideal that the averaged position should be obtained on the basis of data equivalent to five or more rotations of the polygon mirror 35, i.e., data obtained by measuring the passing position for 40 or more times.

On the basis of light beam passing position information thus obtained, whether or not the averaged passing position is within a range of ±1 μm from an aimed position is determined like in the above case of coarse adjustment (step ST187). If the averaged passing position of the light beam a is not within the range of ±1 μm from the aimed position, as a result of this determination, the position of the galvano mirror 31a is controlled (fine adjustment) so as to fall in the range (step ST188), with use of all the 16 bits of a 16 bit control signal for the galvano mirror drive circuit 39a, and the passing position of the light beam a is measured again (step ST186).

If the averaged passing position is determined as being within a range of ±1 μm from the aimed passing position in the step ST187, the force emission of the laser oscillator 31a is released, and then, the laser oscillator 31b is forcedly operated to emit a light beam b (step ST189).

Subsequently, like in the case of the light beam a, an averaged passing position of the light beam b is measured and calculated, and the galvano mirror 33b is controlled in accordance with the calculation result, so that the passing position of the light beam b falls in the range of ±1 μm from an aimed passing position (step ST190 to ST192).

Further, passing positions of light beams c and d are controlled in the same manner as described above, so that each of the passing positions falls in a range of ±1 μm from an aimed passing position (step ST193 to ST201).

In this manner, each of passing positions of four light beams a, b, c, and d is controlled (fine adjustment) so as to fall in a range of ±1 μm from its own target position, and control values for the galvano mirror drive circuits 33a to 33d in this control are stored into the memory 52 (step ST202).

Next, correction of an error (offset) between the light beam path position obtained from the outputs of the light beam detector 38 and the target light beam path position will be described.

As shown in FIG. 37, the light receiving patterns S7a, S7b, and S8a, S8b for detecting the path positions of the light beams a and b involves a pitch error e. That is, with the light beam path position control using the light receiving patterns, the spacing between the light beam paths will be d ±e (which is e larger than the design value d at maximum or e smaller than the design value d at minimum).

In FIG. 37, S7a and S7b, denote light receiving patterns adapted to detect the path position of the light beam a, which is controlled to move along the center line of the gap between the patterns S7a and S7b. S8a and S8b denote light receiving patterns adapted to detect the path position of the light beam b, which is likewise controlled to move along the center line of the gap between the patterns S8a and S8b. d corresponds to the design resolution value and is, for example, 25.4/600 [μm] in the case of 600 DPI.

FIG. 38A shows an example where the light receiving pattern pitch is larger than the design value d by e. In FIG. 38A, S7a and S7b, denote light receiving patterns for detecting the path position of the light beam a, S8a and S8b light receiving patterns for detecting the path position of the light beam b, d the resolution (design value), e the pitch error, and d+e the pitch of the light receiving patterns which is larger than the design value d by e.

In light beam path position control, the light beams a and b are controlled so that their spacing becomes d +e. That is, when the light beam path position control is performed using the light receiving patterns, the spacing between lines formed by the light beams a and b becomes d +e.

FIG. 38B shows light receiving pattern outputs (sensor outputs), an output of the differential amplifier, and an output of the integrator when the spacing between the path positions of the light beams a and b is d with the light receiving patterns of FIG. 38A used.

When the path position of the light beam b is displaced by e with respect to the center line of the gap between the light receiving patterns S8a and S8b to the side of the pattern S8a, the spacing between the paths of the light beams a and b becomes d. At this point, the output of the processing circuit becomes Vi. Since the light beam path position control is performed such that the processing circuit output becomes 0V, the path position of the light beam b will be displaced by e.

In FIG. 38B, the sensor output A of the light receiving pattern S8a is the output of the voltage follower A3 of FIG. 31, the sensor output B of the light receiving pattern S8b the output of the voltage follower A4 of FIG. 31, –Vd the differential output of the patterns S8a and S8b, or the output of the operational amplifier A5 of FIG. 31, and Vi the integrator output, or the output of the operational amplifier A6 of FIG. 31.

FIG. 39A shows an example where the light receiving pattern pitch is smaller than the design value d by e. In FIG. 39A, S7a and S7b, denote light receiving patterns for detecting the path position of the light beam a, S8a and S8b light receiving patterns for detecting the path position of the light beam b, d the design resolution value, e the pitch error, and d–e the pitch of the light receiving patterns in this example, which is smaller than the design value d by e.

In light beam path position control, the light beams a and b are controlled so that their path spacing becomes d–e. That is, when the light beam path position control is performed using the light receiving patterns the pitch of which is d–e, the spacing between lines formed by the light beams a and b becomes d–e.

FIG. 39B shows light receiving pattern outputs (sensor outputs), an output of the differential amplifier, and an output of the integrator when the spacing between the path positions of the light beams a and b is d with the light receiving patterns of FIG. 39A used.

When the path position of the light beam b is displaced by e with respect to the center line of the gap between the light receiving patterns S8a and S8b toward the side of the pattern S8b, the spacing between the paths of the light beams a and b becomes d. At this point, the output of the processing circuit becomes –Vi. Since the light beam path position control is performed such that the processing circuit output becomes 0V, the path position of the light beam b will be displaced by e.

Figure 40:
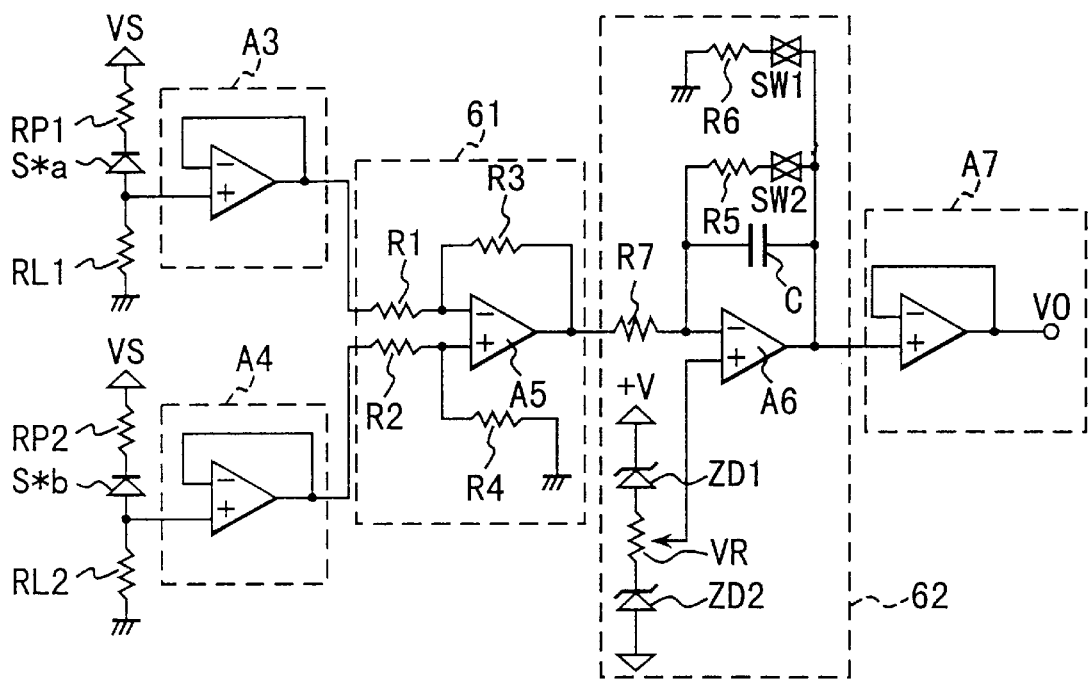
FIG. 40 shows an arrangement of the subscanning circuit of the light beam sensor output processing circuit having a function of correcting the error.

FIG. 40 shows an arrangement of the sub-scanning control circuit 40b in the light beam detector output processing circuit 40 which has a function of correcting the pitch error (offset). The circuit 40b of FIG. 40 is distinct from the arrangement of FIG. 31 only in that, to adjust the reference voltage (the voltage input to the non-inverting input terminal) of the operational amplifier A6 in the integrator 62, zener diodes ZD1 and ZD2 and a variable resistor VR are added.

By adjusting the reference voltage of the operational amplifier A6, the light receiving pattern pitch error can be corrected.

FIG. 41 shows an example where the sub-scanning control circuit 40b of FIG. 40 is applied to the light receiving patterns of FIG. 38 (the light receiving pattern pitch is larger than the design value d by e). In this example, the path position of the light beam b is controlled so that it is displaced with respect to the center line of the gap between the light receiving patterns S8a and S8b by e in the direction of the pattern S8a and the spacing between the paths of the light beams a and b reaches the resolution d.

Figure 41A:
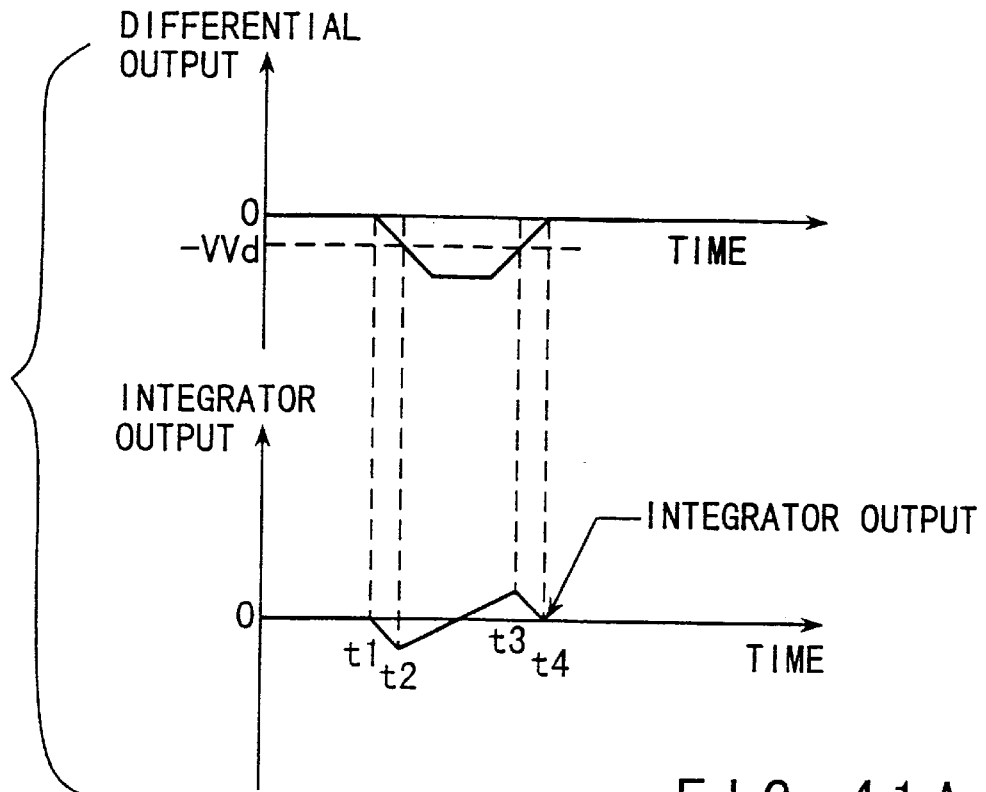
FIGS. 41A and 41B are timing diagrams for use in explanation of the operation of the subscanning circuit of FIG. 40.

FIG. 41A shows the outputs of the differential amplifier and the integrator when the path of the light beam b is displaced with respect to the center line of the gap between the light receiving patterns S8a and S8b by e in the direction of the pattern S8a. At this point, the integrating reference voltage is set to –VVd.

t1–t2: since differential output >–VVd, the differential output is integrated in the negative direction.

t2–t3: since differential output <–VVd, the differential output is integrated in the positive direction.

t3–t4: since differential output >–VVd, the differential output is integrated in the negative direction.

That is, in this case the integrator output becomes zero.

Figure 41B:
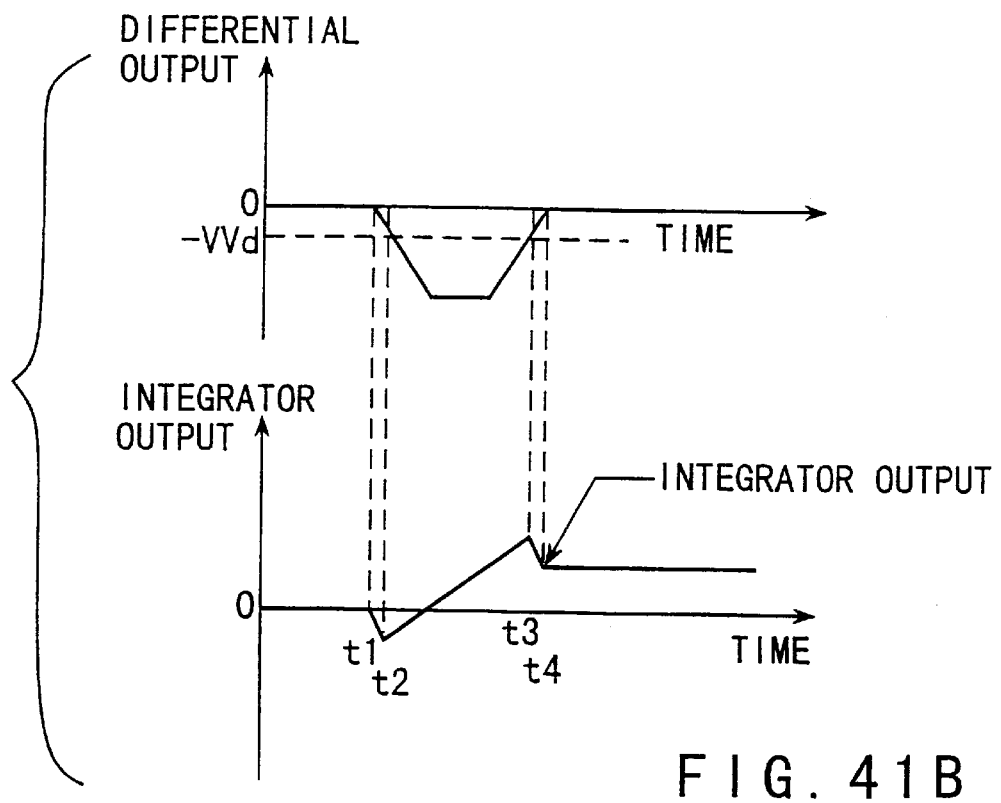

FIG. 41B shows the outputs of the differential amplifier and the integrator when the path of the light beam b is further displaced in the direction of the pattern S8a than with FIG. 41A.

t1–t2: since differential output >–VVd, the differential output is integrated in the negative direction.

t2–t3: since differential output <–VVd, the differential output is integrated in the positive direction.

t3–t4: since differential output >–VVd, the differential output is integrated in the negative direction.

That is, in this case there is produced an integrator output corresponding to the displacement of the light beam path.

Next, the detection of the slant of the light beam scanning direction relative to the light beam detector will be described.

Figure 42:
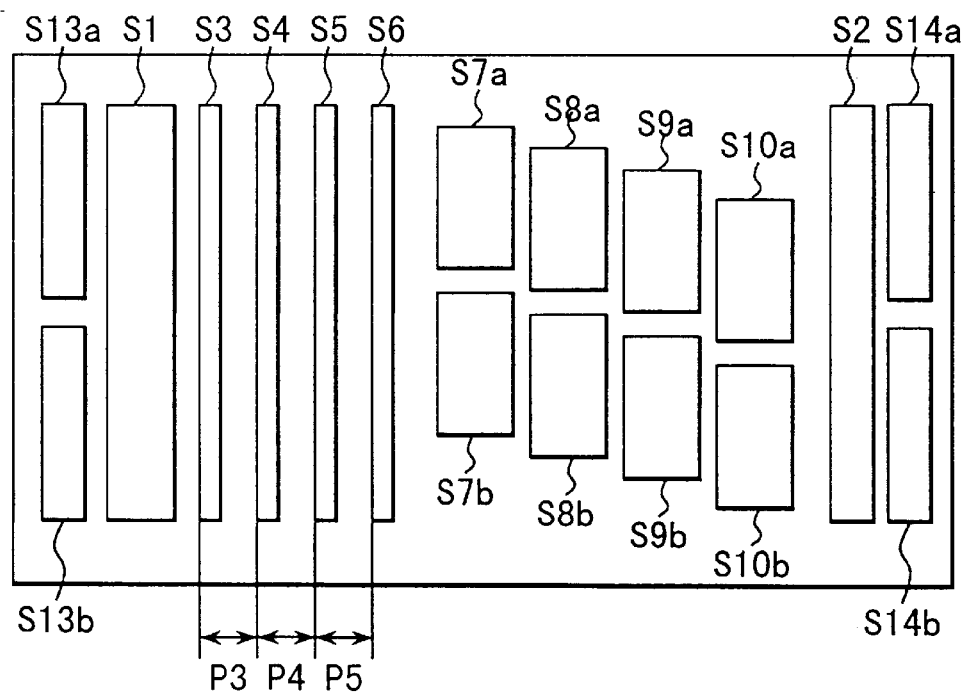
FIG. 42 is a schematic illustration of a light beam sensor having a slant detecting function.

FIG. 42 shows an arrangement of the light beam detector 38 which has a function of detecting the slant of the light beam scanning direction relative to the light beam detector. In addition to the arrangement of FIG. 3 this light beam detector has two pairs of slant detecting light receiving patterns S13a, S13b; and S14a, S14b which are placed immediately on the outside of the light receiving patterns S1 and S2.

The paired light receiving patterns S13a and S13b; S14a and S14b are arranged vertically as with the above-described pairs of light receiving patterns S7a to S10b for detecting the light beam path positions in the sub-scanning direction. However, the center line of the gap between the patterns S13a and S13b and the center line of the gap between the patterns S14a and S14b are aligned with each other. That is, unlike the pairs of light receiving patterns S7a to S10b, the pairs of the light receiving patterns S13a to S14b are not displaced with respect to each other in the sub-scanning direction.

Figure 43:
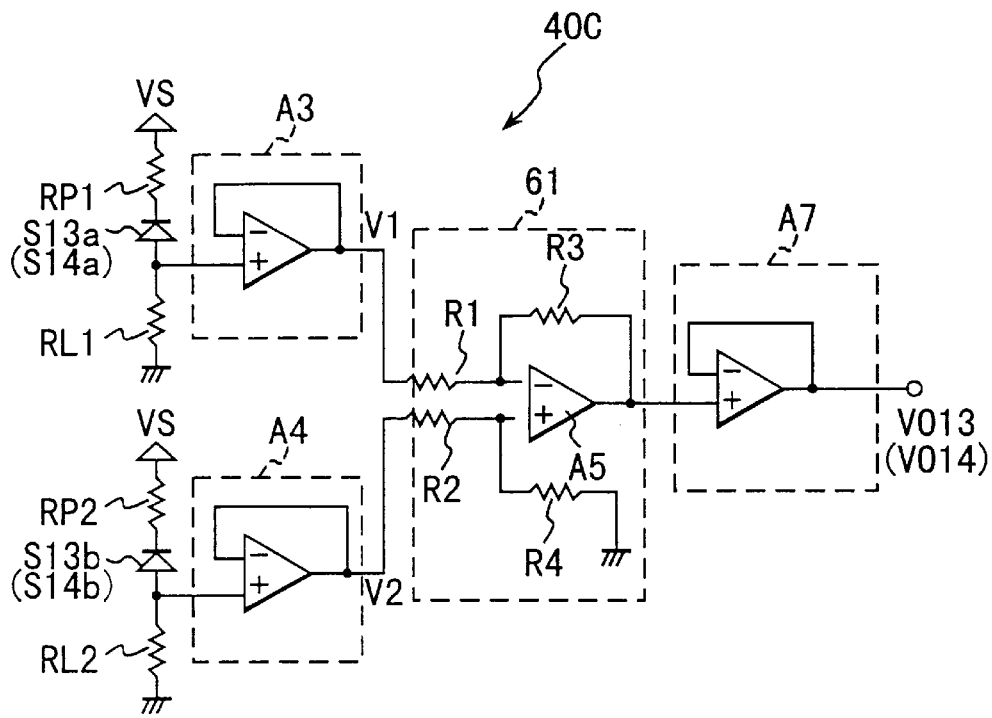
FIG. 43 shows an arrangement of a slant detecting circuit in the light beam sensor output processing circuit.

The outputs of the respective light receiving patterns S13a, S13b, S14a and S14b are processed by a slant detecting circuit 40c in the light beam detector output processing circuit 40 shown in FIG. 43 and then output as light beam path position information. The slant detecting circuit is distinct from the sub-scanning control circuit 40*b* shown in FIG. 31 only in that the integrator 62 is excluded and thus its description is deemed unnecessary.

According to this slant detecting circuit 40*c*, since the gap between the patterns S13*a* and S13*b* and the gap between the patterns S14*a* and S14*b* are aligned with each other, the slant of light beams relative to the light beam detector can be detected by the light beam path position information obtained from the light receiving patterns S13*a*, S13*b*, S14*a* and S14*b*. That is, if light beam path position information from the patterns S13*a* and S13*b* and light beam path position information from the patterns S14*a* and S14*b* are equal to each other, there is no slant; otherwise, there is some slant.

Figure 44:
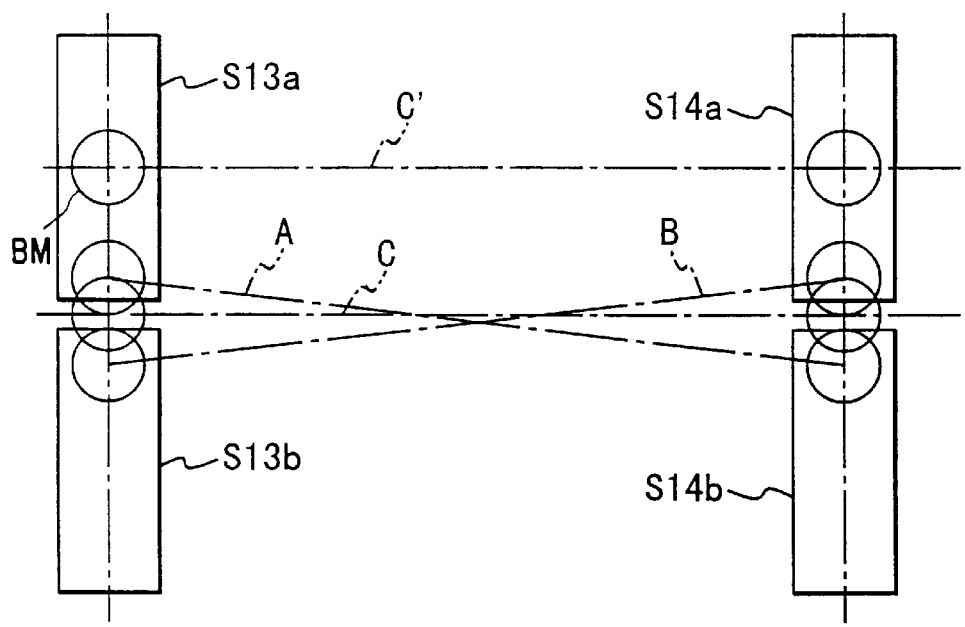
FIG. 44 is a diagram for use in explanation of the slant states.

FIG. 44 is a diagram for use in explanation of slant. In this figure, only the light receiving patterns S13*a* to S14*b* are shown extracted from FIG. 42 and the light receiving patterns S2 to S6 and S7*a* to S10*b* are omitted. In FIG. 44, state A indicates that there is a slant, state B that there is a slant (in the opposite direction to A), and states C and C' that there is no slant. In FIG. 44, BM indicates a light beam.

This embodiment is arranged to decide the slant of a light beam with respect to the detector on the basis of light beam path position information when it moves across the patterns S13*a*, S13*b*, S14*a* and S14*b*.

Figure 45A:
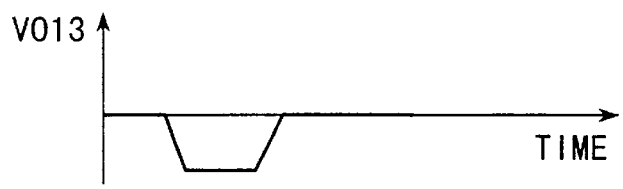
FIGS. 45A, 45B and 45C show an example of light beam position information for the state A in FIG. 44.
Figure 45B:
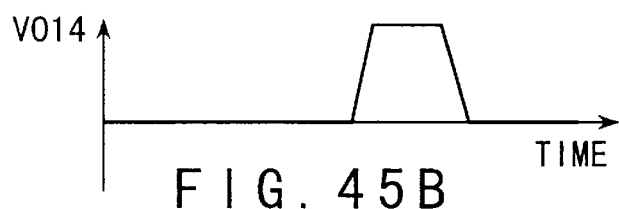
Figure 45C:
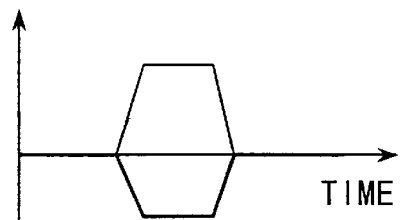

FIG. 45 shows an example of light beam position information (outputs VO13 and VO14 in FIG. 43) when the light beam is in the state A in FIG. 44. FIG. 45A shows the light beam position information (VO13) based on the light receiving patterns S13*a* and S13*b*, FIG. 45B the light beam position information (VO14) based on the light receiving patterns S14*a* and S14*b*, and FIG. 45C a comparison between VO13 and VO14. In this case, since VO13 and VO14 differ from each other, it will be decided that there is a slant. When V013<V014, the light beam path slants in the state A.

Figure 46A:
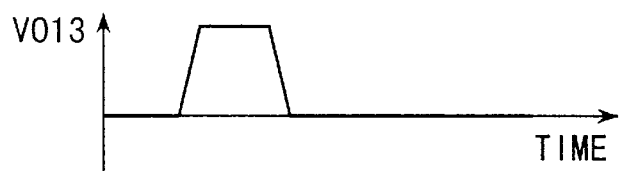
FIGS. 46A, 46B and 46C show an example of light beam position information for the state B in FIG. 44.
Figure 46B:
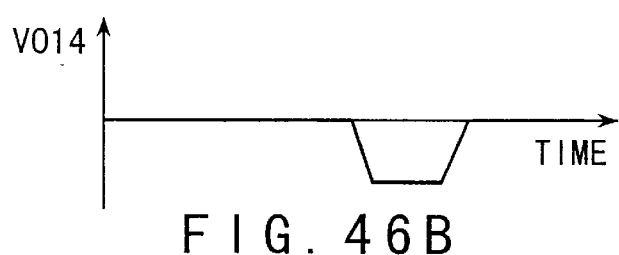
Figure 46C:
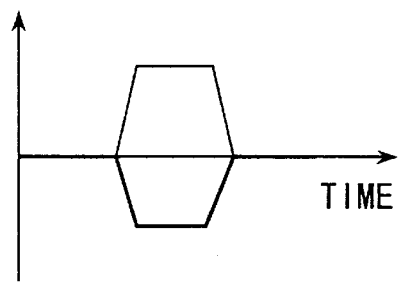

FIG. 46 shows an example of light beam position information (outputs VO13 and VO14 in FIG. 43) in the state B in FIG. 44. FIG. 46A shows the light beam position information (VO13) based on the light receiving patterns S13*a* and S13*b*, FIG. 46B the light beam position information (VO14) based on the light receiving patterns S14*a* and S14*b*, and FIG. 46C a comparison between VO13 and VO14. In this case, since VO13 and VO14 differ from each other, it will be decided that there is a slant. When VO13>VO14, the light beam path slants in the state B.

Figure 47A:
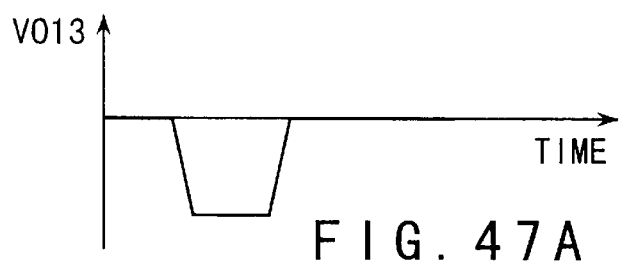
FIGS. 47A, 47B and 47C show an example of light beam position information for the state C' in FIG. 44.
Figure 47B:
Figure 47C:
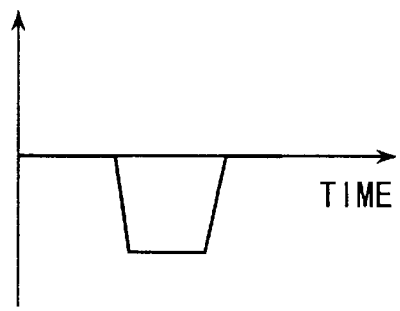
Figure 50A:
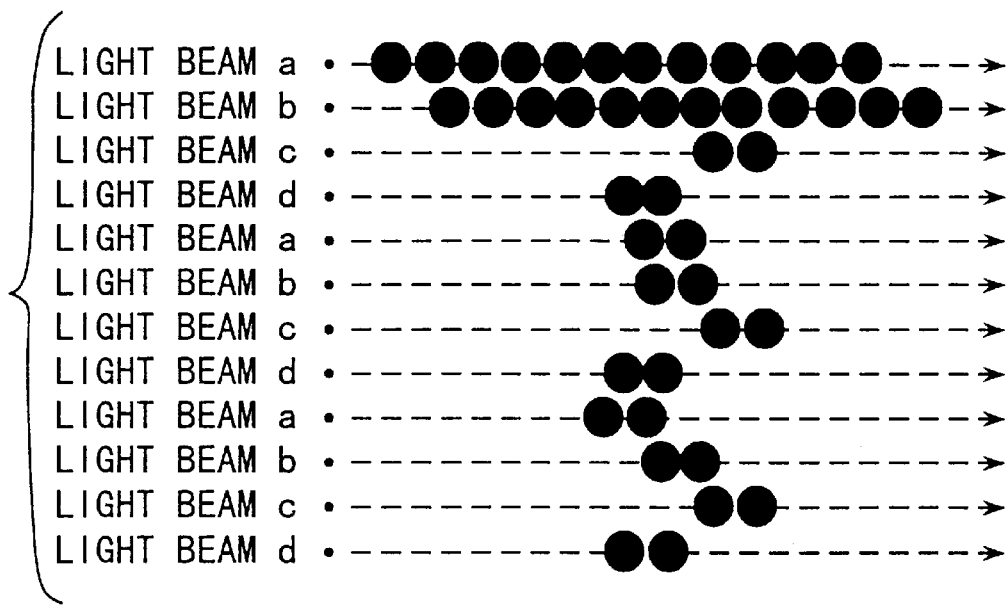
FIGS. 50A and 50B are diagrams for use in explanation of an image of poor quality which may be produced when beams of light displaced in position are used to form an image.
Figure 50B:
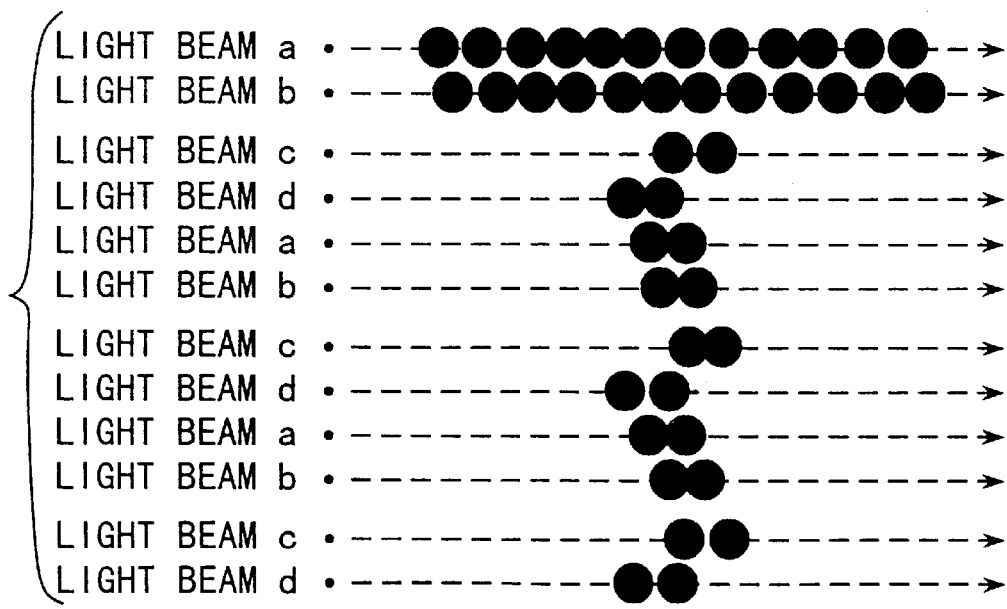

FIG. 47 shows an example of light beam position information (outputs VO13 and VO14 in FIG. 43) when the light beam is in the state C' in FIG. 44. FIG. 47A shows the light beam position information (VO13) based on the light receiving patterns S13*a* and S13*b*, FIG. 47B the light beam position information (VO14) based on the light receiving patterns S14*a* and S4*b*, and FIG. 47C a comparison between VO13 and VO14. In this case, since VO13 and VO14 are equal to each other, it will be decided that there is no slant.

FIG. 48 shows a specific example of means for adjusting the slant of the light beam detector 38. The light beam detector 38 is fixedly mounted to a substrate 91 on which, though not shown, the light beam detector output processing circuit 40 is mounted in the form of an integrated circuit. The substrate 91 is fixed to a θ stage 92. By rotating this stage, the slant of the light beam detector 38 can be adjusted. The stage 92 is attached to a pulse motor through a gear head, both of which are not shown. By controlling the rotation of the pulse motor in accordance with the result of a comparison between V013 and V014, the slant of a light beam with respect to the light beam detector can be adjusted with high precision.

According to the present embodiment of the present invention, in a digital copying machine using a multi-beam optical system, the order of arrival of multiple beams at light receiving patterns in a light beam detector are decided in advance prior to image formation. On the basis of the result of that decision, a combination of each light beam and a light receiving pattern that detects the time at which that light beam traverses it. The light beam position control in the main scanning direction is performed on the basis of such combinations, thereby permitting the positional relation among the light beams on the photosensitive drum surface to be controlled ideally at all times without need for special precision and adjustment in setting up the optical system and regardless of changes in the optical system due to environmental variations and secular changes. Therefore, high-quality images with no dot displacement in the main scanning direction can be obtained at all times.

In addition, the position where each light beam moves across is detected by the light beam detector placed on the extension of the surface of the photosensitive drum. On the basis of the results of this detection, the path control amount is calculated to adjust the path position of each light beam on the photosensitive drum surface in the sub-scanning direction. By controlling the angle of the galvano mirror to change the path position of each light beam on the drum surface in accordance with the calculated path control amount, the path position of each light beam in the sub-scanning direction is controlled.

Thereby, the positional relationship among the light beams on the drum surface can be controlled ideally at all times in both the main scanning and the sub-scanning direction.

Therefore, high-quality images with no dot displacement in the main scanning direction and no pitch displacement in the sub-scanning direction can be obtained at all times.

Moreover, by having means for correcting the error between the path position of each light beam detected by the light beam detector and its ideal path position, light beam path position detection can be made with higher precision.

Furthermore, since means is provided which detects the slant of the light beam path relative to the light beam detector, the slant can be adjusted easily.

Although the present invention was described as being applied to a digital copying machine with a multi-beam optical system, this is not restrictive. The present invention may be applied to a single-beam type digital copying machine. Further, the present invention can likewise be applied to an image forming apparatus other than a digital copying machine.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

We claim:

1. A light beam scanning apparatus comprising:
    a plurality of light beam generating means for generating light beams in response to beam emission signals for emitting beams;
    scanning means for reflecting the light beams emitted by the light beam generating means onto a surface to be scanned to scan the scanned surface with the light beams;

a plurality of light beam detecting means at least placed on the extension of the scanned surface for detecting a passing of the light beams scanned by the scanning means to produce detection signals, the light beam detecting means being provided in a main scanning direction of the light beams in a row;

allocation means responsive to detection signals produced by one of the plurality of light beam detecting means for determining the order in which the light beams move across the light beam detecting means and allocating each light beam to a corresponding light beam detecting means by making a passing order correspond to a positional order of the light beam detecting means;

timing means for supplying the detection signals produced when the light beams allocated to respective light beam detecting means pass the respective light beam detecting means, as timing signals for the allocated light beams;

synchronization means responsive to the timing signals produced by the timing means for generating sync clocks for each light beam corresponding to a respective one of the timing signals; and signal supply means, in synchronism with the sync clocks produced by the synchronization means, for supplying the beam emission signals to the plurality of the light beam generating means.

2. The apparatus according to claim 1, wherein the plurality of light beam detecting means are spaced at intervals of a distance that is an integral multiple of the size of one pixel formed by each light beam on the scanned surface.

3. The apparatus according to claim 1, wherein the light beam generating means are equal in number to the light beam detecting means.

4. The apparatus according to claim 1, wherein the allocation means has means for determining the order in which the light beams move across the light beam detecting means by turning off at least one of the beam generating means.

5. The apparatus according to claim 1, wherein the signal supply means includes means responsive to each of the timing signals for interrupting the beam generation by a corresponding respective one of the light beam generating means and means for supplying image data to each of the beam generating means after a corresponding one of the sync clocks is counted by a number set for that light beam generating means.

6. The apparatus according to claim 1, wherein the apparatus has multiple resolutions, and wherein the plurality of the light beam detecting means are spaced at intervals of a distance that is an integral multiple of the least common multiple of the sizes of pixels formed by a light beam on the scanned surface that correspond to the resolutions.

7. The apparatus according to claim 1, wherein the light beam detecting means includes detecting means for detecting the position of the path of a light beam in the sub-scanning direction on the scanned surface, and wherein the scanning means includes a deflecting means for the light beam and means responsive to the result of the detection by the detecting means for driving the deflecting means to adjust properly the position of the path of the light beam in the sub-scanning direction on the scanned surface.

8. The apparatus according to claim 7, wherein the detecting means includes a pair of light sensors, a differential amplifier for amplifying the difference between outputs of the light sensors, and an integrator for integrating an output of the differential amplifier.

9. The apparatus according to claim 8, wherein the detecting means includes means for adjusting the output of the integrator to zero when the position of the path of the light beam in the sub-scanning direction is proper.

10. The apparatus according to claim 1, wherein the light beam detecting means includes two pairs of light sensors for detecting the slant of the light beam relative to the light beam detector in the main scanning direction, and wherein the apparatus further comprises means responsive to outputs of the two pairs of light sensors for adjusting the slant of the light beam relative to the light beam detector.

11. An image forming apparatus comprising:

image reading means for reading an original image to generate image data corresponding to the image;

a plurality of light beam generating means for generating light beams in response to the image data generated by said reading means;

scanning means for reflecting the light beams emitted by the light beam generating means onto a surface to be scanned to scan the scanned surface with the light beams;

a plurality of light beam detecting means at least placed on the extension of the scanned surface for detecting a passing of the light beams scanned by the scanning means to produce detection signals, the light beam detecting means being provided in a main scanning direction of the light beams in a row;

allocation means responsive to detection signals produced by one of the plurality of light beam detecting means for determining the order in which the light beams move across the light beam detecting means and allocating each light beam to a corresponding light beam detecting means by making a passing order correspond to a positional order of the light beam detecting means;

timing means for supplying the detection signals produced when the light beams allocated to respective light beam detecting means pass the respective light beam detecting means, as timing signals for the allocated light beams;

synchronization means responsive to the timing signals provided by the timing means, for generating sync clocks for each light beam corresponding to a respective one of the timing signals;

image data supply means, in synchronism with the sync clocks generated by the synchronization means, for supplying image data input by the image reading means to the plurality of the light beam generating means; and image forming means for forming a visual image corresponding to the original image, using the surface scanned by the light beams.

12. The apparatus according to claim 11, wherein the plurality of light beam detecting means are spaced at intervals of a distance that is an integral multiple of the size of one pixel formed by each light beam on the scanned surface.

13. The apparatus according to claim 11, wherein the image data supply means includes means responsive to each of the timing signals for interrupting the beam generation by a corresponding respective one of the light beam generating means and means for supplying image data to each of the beam generating means after a corresponding one of the sync clocks is counted by a number set for that light beam generating means.

14. The apparatus according to claim 11, wherein the apparatus has multiple resolutions, and wherein the plurality of the light beam detecting means are spaced at intervals of a distance that is an integral multiple of the least common multiple of the sizes of pixels formed by a light beam on the scanned surface that correspond to the resolutions.

15. A light beam scanning method comprising:

a generating step of generating a plurality of light beams using a laser apparatus in response to beam emission signals for emitting beams;

a scanning step of reflecting the light beams emitted by the generating step onto a surface to be scanned to scan the scanned surface with the light beams;

a light beam detecting step of detecting that each light beam has passed one of a plurality of photo-sensors at least provided in line in a main scanning direction of a light beam and at extension points of the scanned surface to produce detection signals;

an allocating step, responsive to the detection signals produced by the light beam detecting step, of determining the order in which the plurality of light beams move across the photo-sensors and allocating each light beam to a corresponding photo-sensor by making a passing order correspond to a positional order of the light beam detecting step;

a timing signal supply step of supplying the detection signals produced when the light beams allocated to respective photo-sensors pass the respective photo-sensor, as timing signals for the allocated light beams;

synchronization step, responsive to the timing signals produced by the timing signal supplying step, of generating sync clocks each of which corresponds to a respective one of the timing signals; and a beam emission signal supply step of supplying the beam emission signal for each of the light beams to the laser apparatus in response to a corresponding one of the sync clocks generated by the synchronization step.

* * * * *